US008237931B2

(12) United States Patent
Sangawa et al.

(10) Patent No.: US 8,237,931 B2
(45) Date of Patent: Aug. 7, 2012

(54) OPTOACOUSTIC CONVOLVER

(75) Inventors: Ushio Sangawa, Nara (JP); Masahiko Hashimoto, Osaka (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 13/246,082

(22) Filed: Sep. 27, 2011

(65) Prior Publication Data
US 2012/0075637 A1 Mar. 29, 2012

Related U.S. Application Data

(63) Continuation of application No. PCT/JP2011/001436, filed on Mar. 11, 2011.

(30) Foreign Application Priority Data

Mar. 12, 2010 (JP) ................................. 2010-055708
Mar. 12, 2010 (JP) ................................. 2010-055709
Mar. 12, 2010 (JP) ................................. 2010-055710

(51) Int. Cl.
*G01B 9/02* (2006.01)
*G01N 21/41* (2006.01)
*G01N 21/43* (2006.01)

(52) U.S. Cl. ......................... 356/450; 356/477; 356/517
(58) Field of Classification Search ................. 356/35.5, 356/433, 450, 477, 517
See application file for complete search history.

(56) References Cited

U.S. PATENT DOCUMENTS

| 4,866,660 | A | 9/1989 | Merkelo et al. | |
| H1370 | H * | 11/1994 | Wolch et al. | 356/491 |
| 5,600,440 | A * | 2/1997 | Bendall | 356/450 |
| 5,694,216 | A * | 12/1997 | Riza | 356/485 |
| 6,128,080 | A * | 10/2000 | Janik et al. | 356/491 |
| 6,714,306 | B1 * | 3/2004 | Chovan et al. | 356/484 |
| 2006/0256346 | A1 * | 11/2006 | Hill | 356/498 |
| 2008/0152349 | A1 | 6/2008 | Weitzel | |

FOREIGN PATENT DOCUMENTS

| JP | 57-090613 A | 6/1982 |
| JP | 59-201020 A | 11/1984 |
| JP | 61-175619 A | 8/1986 |

(Continued)

OTHER PUBLICATIONS

Alippi, A. et al. "Lensless Acousto-Optical Convolver". Electronics Letters, vol. 14, No. 16, Aug. 3, 1978, pp. 525-526.*
Riza, Nabeel. "Space Integrating Interferometric Acousto-Optic Convolver". IEEE Photonics Technology Letters, vol. 7, No. 3, Mar. 1995, pp. 339-341.*

*Primary Examiner* — Michael A Lyons
(74) *Attorney, Agent, or Firm* — Renner, Otto, Boisselle & Sklar, LLP

(57) ABSTRACT

An optoacoustic convolver includes: a light source; a first acoustic waveguide filled with a light-transmissive first acoustic medium; a second acoustic waveguide filled with a light-transmissive second acoustic medium; an optical system whereby light emitted from the light source is split into a first light beam and a second light beam, the first light beam entering the first acoustic waveguide, and the second light beam entering the second acoustic waveguide, thereby generating interference light between the first light beam having passed through the first acoustic waveguide and the second light beam having passed through the second acoustic waveguide; a light-receiving section for receiving the interference light and outputting an electric signal based on an intensity of the received light; and a correlation determination section for determining whether the received signal is correlated with the reference signal by observing the electric signal output from the light-receiving section.

13 Claims, 36 Drawing Sheets

FOREIGN PATENT DOCUMENTS

| | | |
|---|---|---|
| JP | 62-229118 A | 10/1987 |
| JP | 02-042424 A | 2/1990 |
| JP | 03-029927 A | 2/1991 |
| JP | 11-264765 A | 9/1999 |

* cited by examiner

OPTOACOUSTIC CONVOLVER

This is a continuation of International Application No. PCT/JP2011/001436, with an international filing date of Mar. 11, 2011, which claims priority of Japanese Patent Application Nos. 2010-055708, 2010-055709 and 2010-055710, filed on Mar. 12, 2010, the contents of which are hereby incorporated by reference.

BACKGROUND OF THE INVENTION

1. Field of the Invention

The present invention relates to an optoacoustic convolver for detecting a correlation between two signals by converting two signals to be correlated to acoustic compressional waves which propagate through light-transmissive acoustic media and then observing interference light between the two light beams which have passed through the light-transmissive acoustic media.

2. Description of the Related Art

Communication systems using radio waves and ultrasonic waves are currently incorporated and used in various sensors. One of the most important requirements of these sensors is the system-wise smallness, i.e., the small load on the system in which the sensor is incorporated, not to mention the physical smallness.

Some communication systems use signals that are modulated/demodulated with spreading codes for increasing the functionality, e.g., ensuring the communication quality and increasing the efficiency of information transfer. In the transmitter/receiver (primarily the receiver) of such a communication system, a convolver for detecting a correlation between a signal received (received signal) and a signal generated by the transmitter/receiver based on a spreading code (reference signal) is an indispensable component.

Typically, the correlation process in the receiver using such a communication scheme is performed by a digital filter or a convolver implemented on a computer as a program, after the received radio or ultrasonic signal is converted to a digital signal by an analog/digital converter. The amount of computation required for these processes is large, and a high-speed computer is required in order to keep the signal delay to a minimum. Therefore, it is an objective for realizing a high-functionality communication device to satisfy both this and the requirement of a sensor described above.

Regarding this objective, Japanese Patent Application Laid-Open Publication No. S59-201020 (see FIG. 3, in particular) for example discloses an optoacoustic convolver which utilizes light and acoustic waves, which is small system-wise, and which is capable of high-speed operations. The optoacoustic convolver first converts two signals to be correlated to amplitude-modulated signals corresponding to carrier waves (sinusoidal waves) each having an intended frequency. That is, two signals are upconverted to carrier wave frequencies as amplitude-modulated signals. These amplitude-modulated signals are converted to elastic waves (compressional waves) and propagated through different acoustic media, thereby producing two gradient refractive index diffraction gratings (GRIN gratings). The intensities of diffracted light which have been diffracted through the diffraction gratings are measured, thereby obtaining a correlation signal between the two signals.

FIG. 37 shows a configuration of a conventional optoacoustic convolver described in Japanese Patent Application Laid-Open Publication No. S59-201020. In FIG. 37, carrier wave generation circuits 151a and 151b generate sinusoidal waves (carrier waves) having frequencies that coincide with resonance frequencies of piezoelectric oscillators 1510a and 1510b. The two signals generated by the signal generation circuits 152a and 152b are converted by modulators 153a and 153b, respectively, so that time variations of amplitude values of the sinusoidal waves are in proportion to the time waveforms of the two signals. That is, the two signals are upconverted to amplitude-modulated signals whose frequencies are equal to the carrier wave frequencies.

The amplitude-modulated carrier waves are amplified by amplifiers 154a and 154b and then input to the piezoelectric oscillators 1510a and 1510b, respectively. The piezoelectric oscillators 1510a and 1510b propagate elastic waves based on the input signals through acoustic media 159a and 159b, respectively. These elastic waves induce refractive index distributions in the acoustic media 159a and 159b. The elastic waves generated in the acoustic media 159a and 159b are sinusoidal waves whose frequencies are equal to the resonance frequencies of the piezoelectric oscillators 1510a and 1510b, respectively, and whose amplitude values vary over time based on the input signal. Therefore, the refractive index distributions induced by the acoustic media 159a and 159b each become a gradient refractive index diffraction grating which has a grating pitch equivalent to the one wavelength of the elastic wave and which propagates at an elastic wave propagation velocity.

A laser light source 151 emits laser light toward two gradient refractive index diffraction gratings through which elastic waves propagate in opposite directions. The laser light emitted from the laser light source 151 is enlarged by an optical system 155 to a sufficient beam diameter, and enters the acoustic media 159a and 159b. As a result, a diffracted light beam having various orders of diffraction is generated. The diffracted light beam is condensed through a condensing optical system 156 to form a plurality of bright spots on a space filter 158. Only a bright spot corresponding to diffracted light of an intended order is extracted by the space filter 158, and the optical intensity thereof is output by a light-receiving element 157 as an electric signal.

In order to operate as a convolver, it is necessary to observe a bright spot of diffracted light that is not corresponding to the $0^{th}$-order diffraction in the gradient refractive index diffraction gratings. The diffracted light intensity is in proportion to the square of the contrast of the refractive index distribution in the gradient refractive index diffraction grating ($\propto$ refractive index variation range/average refractive index). Therefore, the intensity of the electric signal output from the light-receiving element 157 is in proportion to the square of the product between the contrasts of the gradient refractive index diffraction gratings produced in the acoustic media 159a and 159b. The contrasts of the gradient refractive index diffraction gratings are generally in proportion to the intensities of the signals generated in the signal generation circuits 152a and 152b. Therefore, the intensity of the electric signal output from the light-receiving element 157 at a certain point in time is in proportion to the square of the product between the intensities of the two signals at the point in time, ignoring the time delay in signal processes.

Therefore, by obtaining the square root of the intensity of the electric signal, it is possible to obtain the correlation signal between the signals (corresponding to the "product" of these signals in this case). This is the operation of the conventional optoacoustic convolver described in Japanese Patent Application Laid-Open Publication No. S59-201020.

As described above, the conventional optoacoustic convolver described in Japanese Patent Application Laid-Open Publication No. S59-201020 has no analog/digital conversion means and no digital signal processing means, and is small system-wise. In addition, the convolver is advantageous in that it is fast and has a small influence due to delay because all correlation processes are passively performed. Thus, a device such as an ultrasonic sensor having an optoacoustic convolver disclosed in Japanese Patent Application Laid-Open Publication No. S59-201020 is advantageous in that it has a small load on the whole system in which it is incorporated (e.g., a robot having an ultrasonic sensor).

However, with the configuration disclosed in Japanese Patent Application Laid-Open Publication No. 559-201020, a physically large optical system is needed in order to desirably capture diffracted light of a necessary order, and an ultrasonic sensor having the same will have a large physical size.

For example, where a carrier wave whose frequency is 100 MHz is used with an acoustic medium having an elastic wave propagation velocity of 1000 m/s (which corresponds generally to a propagation velocity of a dynamically hard substance with a high refractive index which is necessary for obtaining a sufficient diffracted light intensity), the elastic wave wavelength is 10 μm. Assuming that the extent of a bright spot of scattered light attenuates sufficiently over a radius of 2.5 mm, a bright spot of $1^{st}$-order diffraction needs to appear at a distance of 5 mm or more from a bright spot of $0^{th}$-order diffraction. Therefore, when laser light having a wavelength of 600 nm is output, the distance from an acoustic medium 159b to the space filter 158 that is necessary for a bright spot of $1^{st}$-order diffraction through one gradient refractive index diffraction grating to appear at a distance of 5 mm from a bright spot of $0^{th}$-order diffraction therethrough is about 83.3 mm. Therefore, the size of a device such as an ultrasonic sensor incorporating therein an optoacoustic convolver of the conventional configuration inevitably increases.

With current communication systems using radio waves and ultrasonic waves, code spreading is sometimes used as the signal modulation/demodulation scheme with the aim of increasing the functionality, as described above. In this case, the correlation process between two signals is not performed for the instantaneous values of the signals, but it is necessary to measure the correlation between the time waveforms of the two signals for a certain period of time.

However, with the conventional configuration, in order to measure the correlation between the time waveforms of the two signals for a certain period of time, the sizes of the acoustic media 159a and 159b need to be very large.

For example, in order to perform a correlation process for a signal whose time interval is 0.07 msec using an acoustic medium having an elastic wave propagation velocity of 1000 m/s, at least an elastic wave with an amplitude variation that corresponds to the time interval's worth of a signal needs to be entirely present in the acoustic media 159a and 159b. In this case, the length necessary for the acoustic media 159a and 159b is 70 mm. Since the opening diameters of the optical system 155 and the condensing optical system 156 need to be about the same as the length of the acoustic media 159a and 159b, a device incorporating the conventional optoacoustic convolver will be large.

The present invention has been made to solve the problems described above, and an object thereof is to provide an optoacoustic convolver that not only is small system-wise but also is capable of high-speed operations and physically small.

SUMMARY OF THE INVENTION

An optoacoustic convolver of the present invention includes: a light source; a first acoustic waveguide filled with a light-transmissive first acoustic medium through which a first compressional wave based on a received signal is propagated; a second acoustic waveguide filled with a light-transmissive second acoustic medium through which a second compressional wave based on a predetermined reference signal is propagated; an optical system whereby light emitted from the light source is split into a first light beam and a second light beam, the first light beam entering the first acoustic waveguide in a direction crossing a direction of propagation of the first compressional wave, and the second light beam entering the second acoustic waveguide in a direction crossing a direction of propagation of the second compressional wave, thereby generating interference light between the first light beam having passed through the first acoustic waveguide and the second light beam having passed through the second acoustic waveguide; a light-receiving section for receiving the interference light and outputting an electric signal based on an intensity of the received light; and a correlation determination section for determining whether the received signal is correlated with the reference signal by observing the electric signal based on the interference light output from the light-receiving section.

Another optoacoustic convolver of the present invention includes: a light source; an acoustic waveguide filled with a light-transmissive acoustic medium through which a first compressional wave based on a received signal and a second compressional wave based on a predetermined reference signal are propagated in directions opposite to each other; an optical system whereby light emitted from the light source is split into a first light beam and a second light beam, the first light beam entering the acoustic waveguide in a direction crossing the first compressional wave and the second compressional wave, and the second light beam not entering the acoustic waveguide, thereby generating interference light between the first light beam having passed through the acoustic waveguide and the second light beam; a light-receiving section for receiving the interference light and outputting an electric signal based on an intensity of the received light; and a correlation determination section for determining whether the received signal is correlated with the reference signal by observing the electric signal based on the interference light output from the light-receiving section.

Still another optoacoustic convolver of the present invention includes: a light source; a first acoustic waveguide filled with a light-transmissive first acoustic medium through which a first compressional wave based on a received signal is propagated; a second acoustic waveguide filled with a light-transmissive second acoustic medium through which a second compressional wave based on a predetermined reference signal is propagated; an optical system whereby light emitted from the light source is split into a first light beam and a second light beam, the first light beam entering each of the first acoustic waveguide and the second acoustic waveguide in a direction crossing a direction of propagation of the first compressional wave and a direction of propagation of the first compressional wave, and the second light beam not entering the first acoustic waveguide or the second acoustic waveguide, thereby generating interference light between the first light beam having passed through the first acoustic waveguide and the second acoustic waveguide and the second light beam; a light-receiving section for receiving the interference light and outputting an electric signal based on an intensity of the received light; and a correlation determination section for determining whether the received signal is correlated with the reference signal by observing the electric signal based on the interference light output from the light-receiving section.

In one embodiment, the correlation determination section determines that the received signal and the reference signal are correlated with each other when the intensity of the interference light is greater than or equal to a predetermined threshold value.

In one embodiment, the optical system is configured so that the intensity of the interference light is at maximum at time $t=t0$ at which $F(x,t0)=R(x,t0)$ holds, where $F(x,t)$ is a refractive index distribution of the first compressional wave, and $R(x,t)$ is a refractive index distribution of the second compressional wave, where a coordinate whose origin is a point where the first compressional wave is generated and whose positive direction is the direction of propagation of the first compressional wave, and a coordinate whose origin is a point where the second compressional wave is generated and whose positive direction is the direction of propagation of the second compressional wave, are both denoted as x, and time is denoted as t.

In one embodiment, the optical system is configured so that the intensity of the interference light is at maximum at time $t=t0$ at which $F(x,t0)=-R(x,t0)$ holds, where $F(x,t)$ is a refractive index distribution of the first compressional wave, and $R(x,t)$ is a refractive index distribution of the second compressional wave, where a coordinate whose origin is a point where the first compressional wave is generated and whose positive direction is the direction of propagation of the first compressional wave is denoted as x, and time is denoted as t.

In one embodiment, the optical system is configured so that the intensity of the interference light is at maximum at time $t=t0$ at which $F(x,t0)=-R(x,t0)$ holds, where $F(x,t)$ is a refractive index distribution of the first compressional wave, and $R(x,t)$ is a refractive index distribution of the second compressional wave, where a coordinate whose origin is a point where the first compressional wave is generated and whose positive direction is the direction of propagation of the first compressional wave, and a coordinate whose origin is a point where the second compressional wave is generated and whose positive direction is the direction of propagation of the second compressional wave, are both denoted as x, and time is denoted as t.

In one embodiment, the optical system includes a beam splitter for splitting the light emitted from the light source into the first light beam and the second light beam, and a reflecting mirror for reflecting at least one of the first light beam and the second light beam split by the beam splitter.

In one embodiment, the light source emits monochromatic light; and the correlation determination section varies an optical path length over which at least one of the first light beam and the second light beam travels to reach the light-receiving section by oscillating the reflecting mirror, and determines whether the electric signal has exceeded a predetermined threshold value, thereby determining whether the received signal is correlated with the reference signal.

In one embodiment, the correlation determination section oscillates the reflecting mirror with an amplitude that is ½ or more of a wavelength of the monochromatic light.

In one embodiment, the light source emits two light beams whose planes of polarization are orthogonal to each other and which have different frequencies from each other; and the optical system includes a polarizing beam splitter for splitting the two light beams into the first light beam and the second light beam based on the respective planes of polarization, and a polarization plate for making a plane of polarization of the first light beam and a plane of polarization of the second light beam coincide with each other.

In one embodiment, wave front shapes of the first light beam and the second light beam change as the first light beam and the second light beam pass through the first acoustic waveguide and the second acoustic waveguide, respectively, and the correlation determination section determines whether the received signal is correlated with the reference signal based on the electric signal generated based on a difference between the wave front shape of the first light beam and the wave front shape of the second light beam.

In one embodiment, a wave front shape of the first light beam changes as the first light beam passes through the acoustic waveguide, and the correlation determination section determines whether the received signal is correlated with the reference signal based on the electric signal generated based on a difference between the wave front shape of the first light beam and the wave front shape of the second light beam.

In one embodiment, a wave front shape of the first light beam changes as the first light beam passes through the first acoustic waveguide and the second acoustic waveguide, and the correlation determination section determines whether the received signal is correlated with the reference signal based on the electric signal generated based on a difference between the wave front shape of the first light beam and the wave front shape of the second light beam.

In one embodiment, the optical system has a configuration of an interferometer of a Michelson-Morley type.

In one embodiment, the optical system has a configuration of an interferometer of a Mach-Zehnder type.

In one embodiment, the optical system has a configuration of an interferometer of a Fizeau type.

In one embodiment, the directions of propagation of the first compressional wave and the second compressional wave are parallel to each other.

In one embodiment, the directions of propagation of the first compressional wave and the second compressional wave are parallel to each other and are facing the same direction.

In one embodiment, the first light beam and the second light beam do not pass through an atmospheric air before the first light beam and the second light beam interfere with each other.

With the optoacoustic convolver of the present invention, it is possible to realize a receiver that is both system-wise and physically small.

Other features, elements, processes, steps, characteristics and advantages of the present invention will become more apparent from the following detailed description of preferred embodiments of the present invention with reference to the attached drawings.

Figure 6:
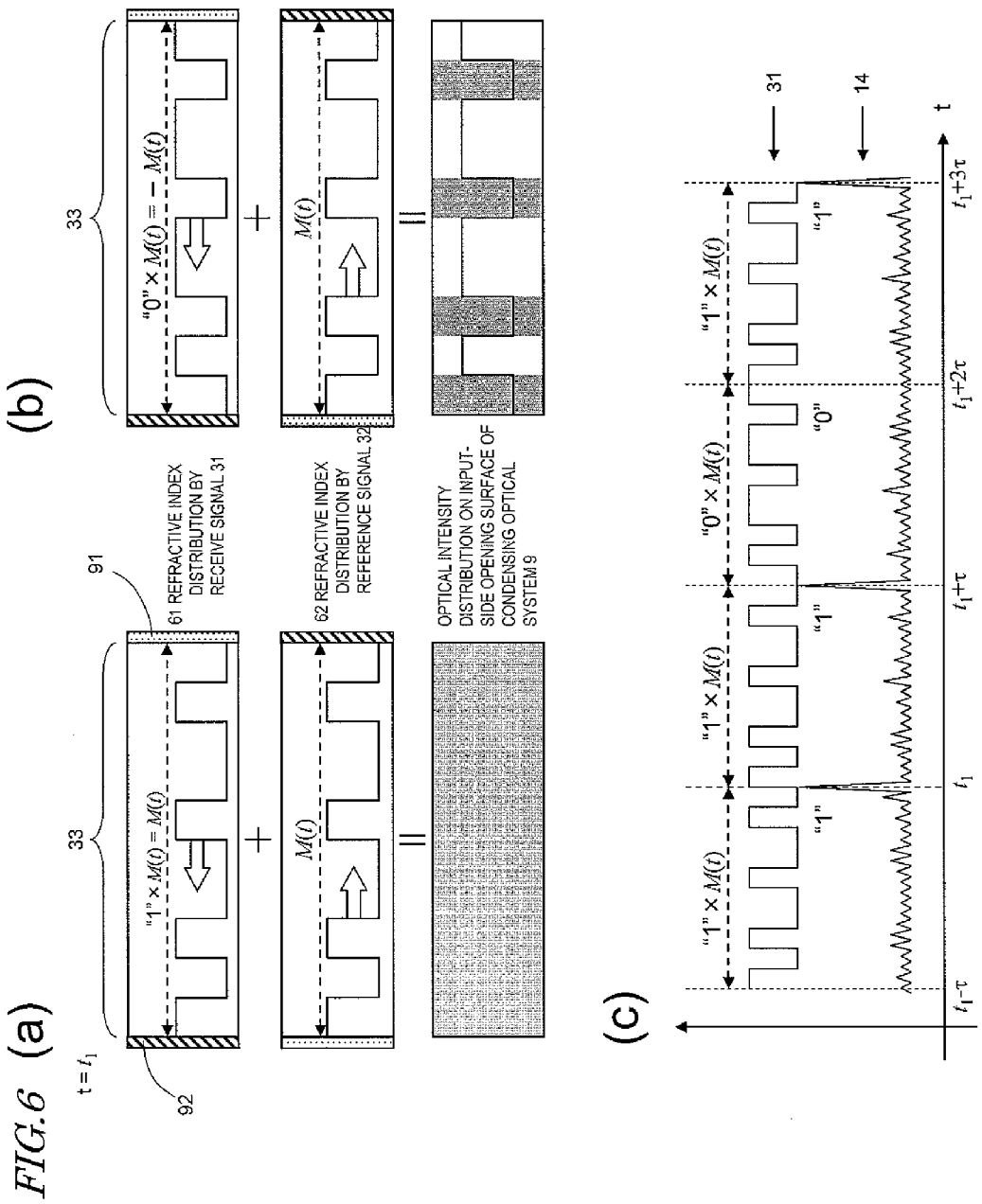

Portion (a) of FIG. 6 is a schematic diagram showing how "1" is reproduced by de-spreading a code string in a code-spread signal 43 that corresponds to "1", Portion (b) of FIG. 6 is a schematic diagram showing how "0" is reproduced by de-spreading a code string in the code-spread signal 43 that corresponds to "0", and Portion (c) of FIG. 6 is a time waveform diagram showing how four bits' worth of a received signal 31 is output from a light-receiving element 10 as a demodulated signal.

Figure 7:
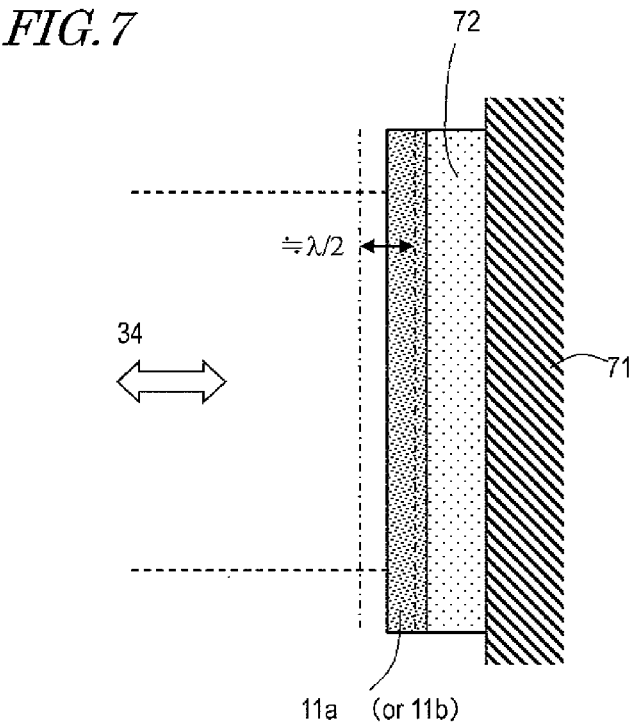

FIG. 7 is a general device configuration diagram showing a method for oscillating a reflecting mirror in a direction parallel to the light beam traveling direction.

Figure 8:
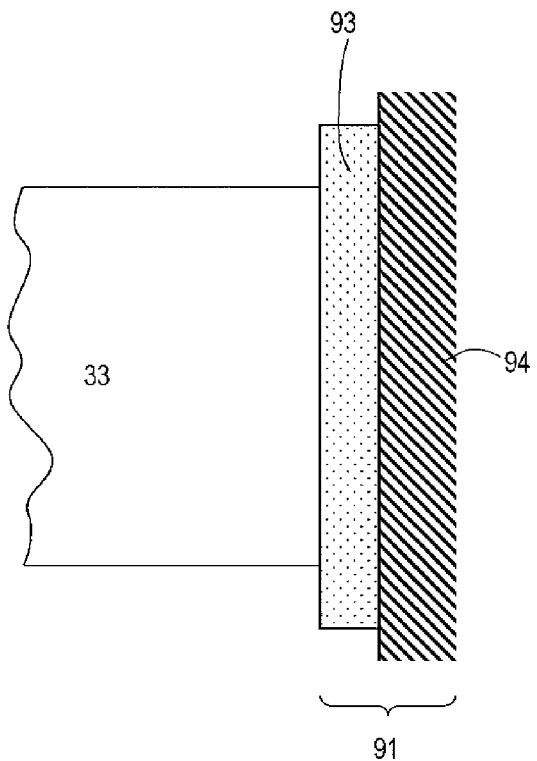

FIG. 8 is a cross-sectional view showing a detailed structure of a compressional wave generation section 91 provided at an end of acoustic waveguides 3a and 3b.

Figure 9A:
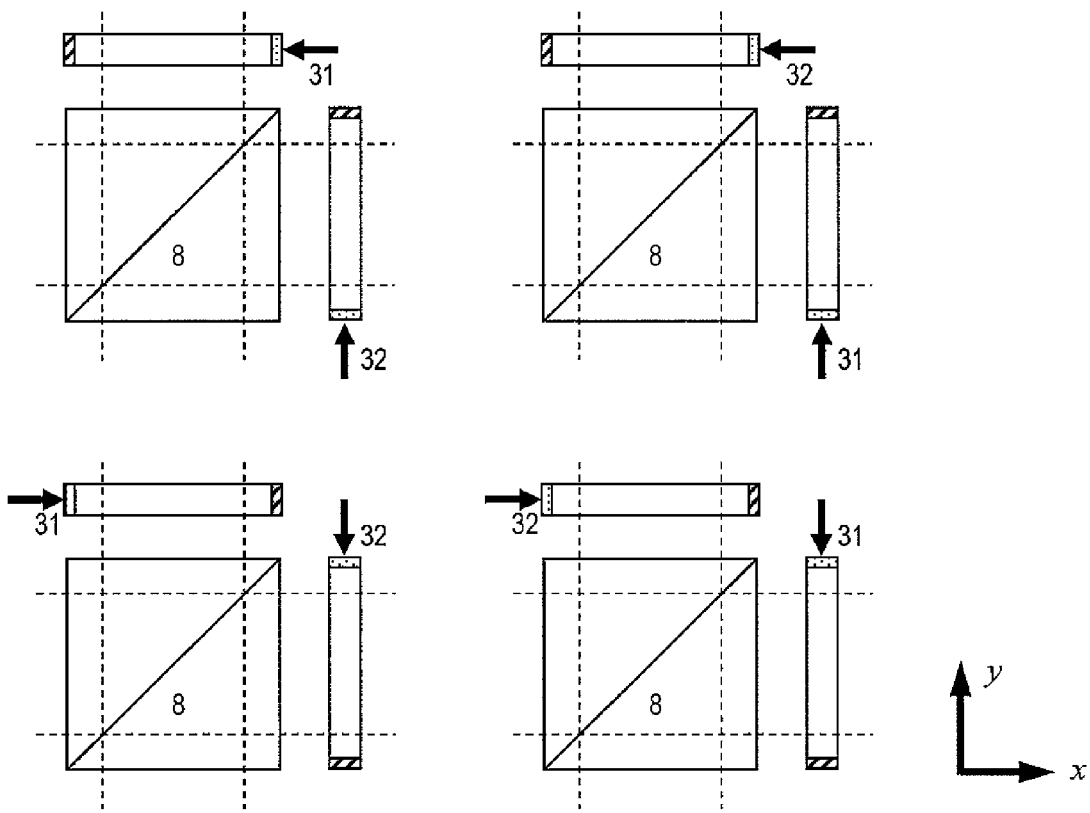

FIG. 9A is a top view showing possible configurations of the acoustic waveguides 3a and 3b of an optoacoustic convolver according to Embodiment 1.

Figure 9B:
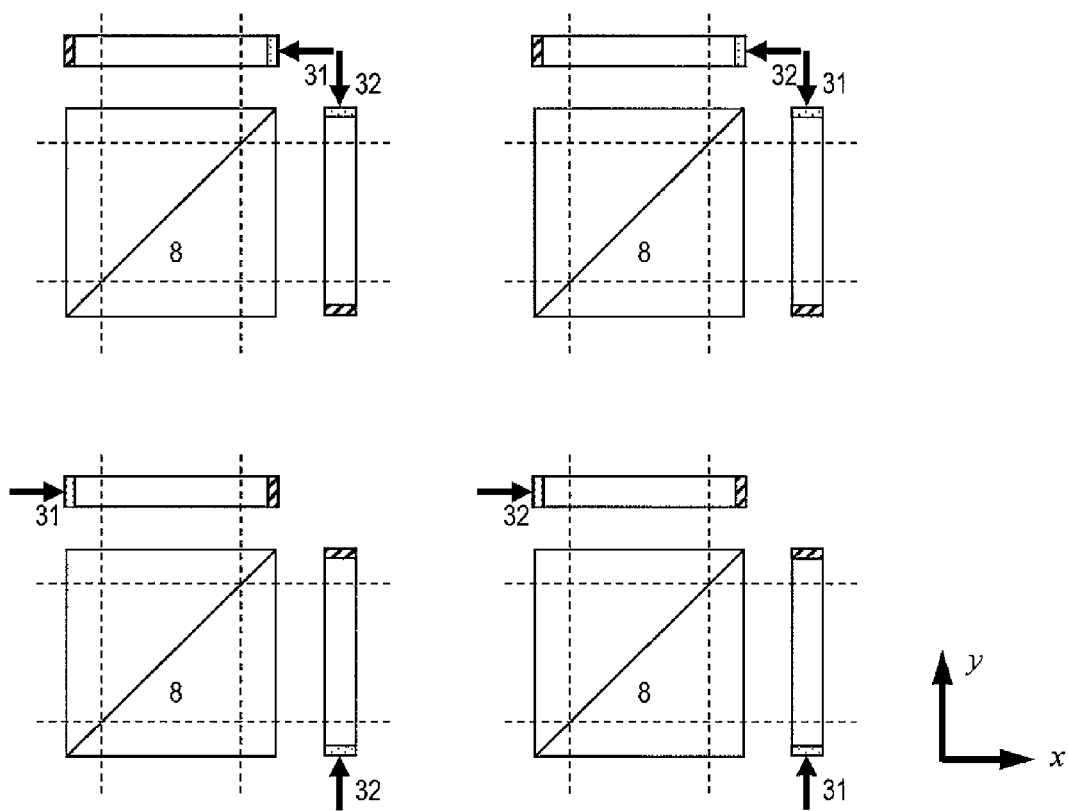

FIG. 9B is a top view showing other possible configurations of the acoustic waveguides 3a and 3b of an optoacoustic convolver according to Embodiment 1.

Figure 10:
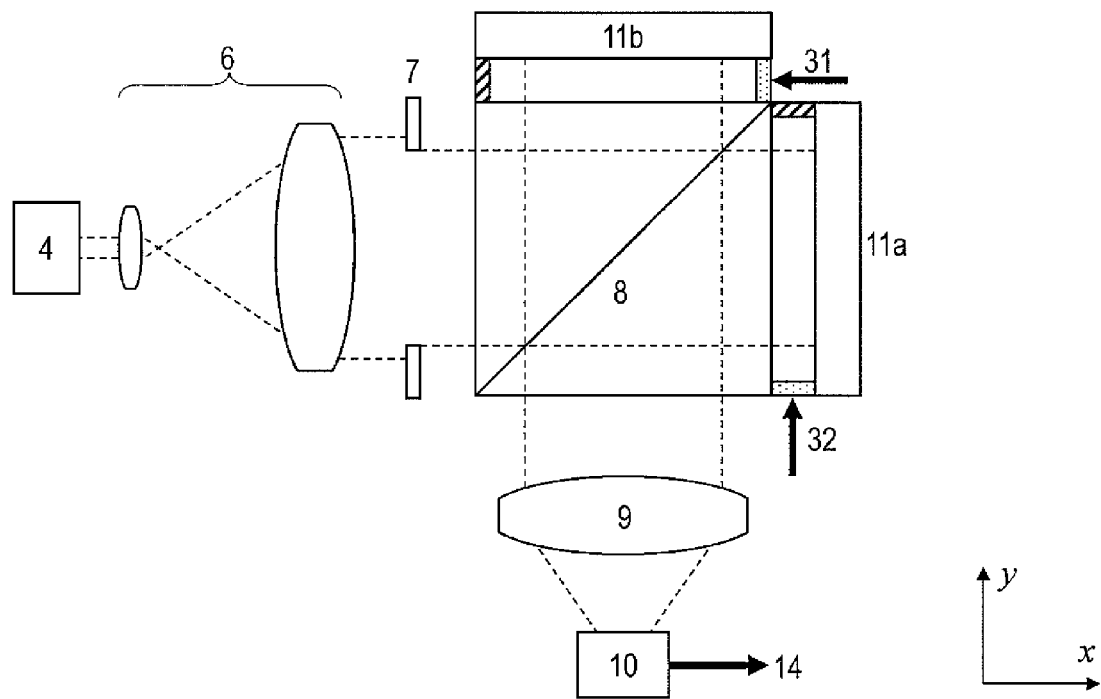

FIG. 10 is a schematic device configuration diagram showing another possible configuration example of an optoacoustic convolver according to Embodiment 1.

Figure 11:
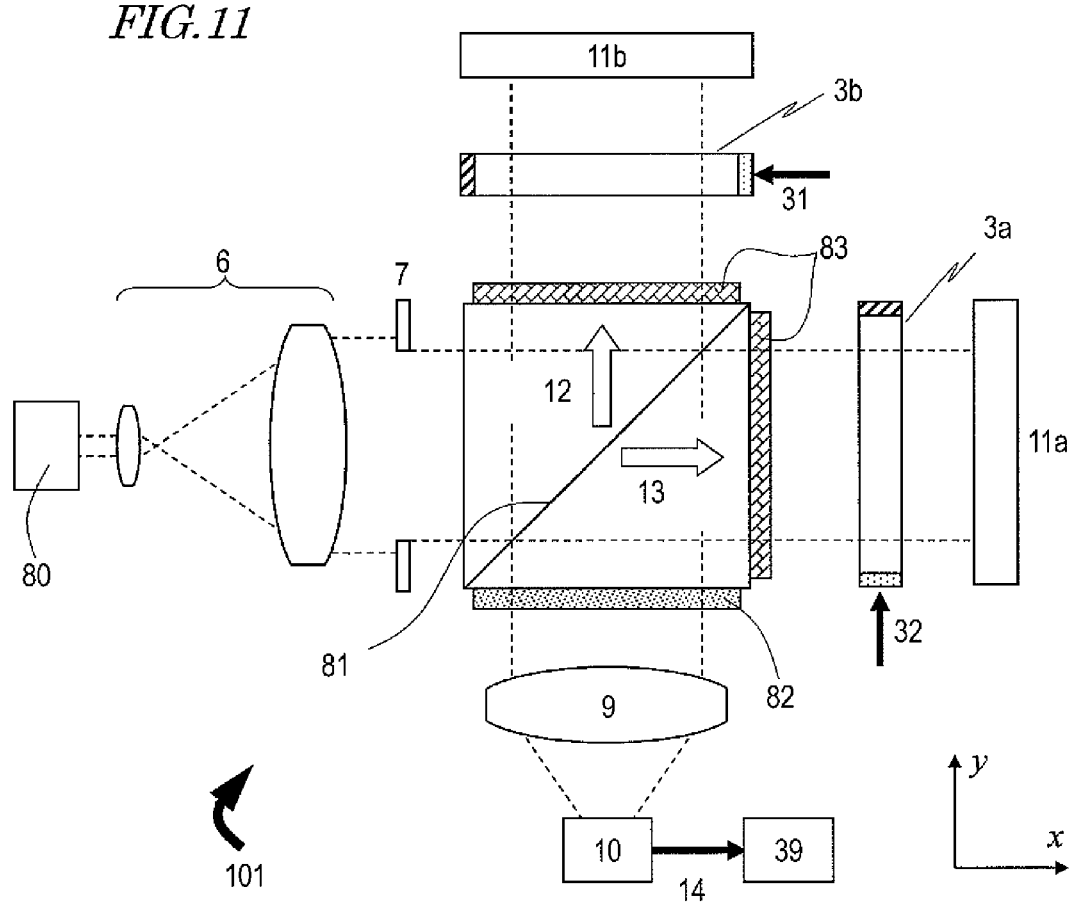

FIG. 11 is a schematic device configuration diagram showing an optoacoustic convolver in Embodiment 2 for performing optical heterodyne detection.

Figure 12:
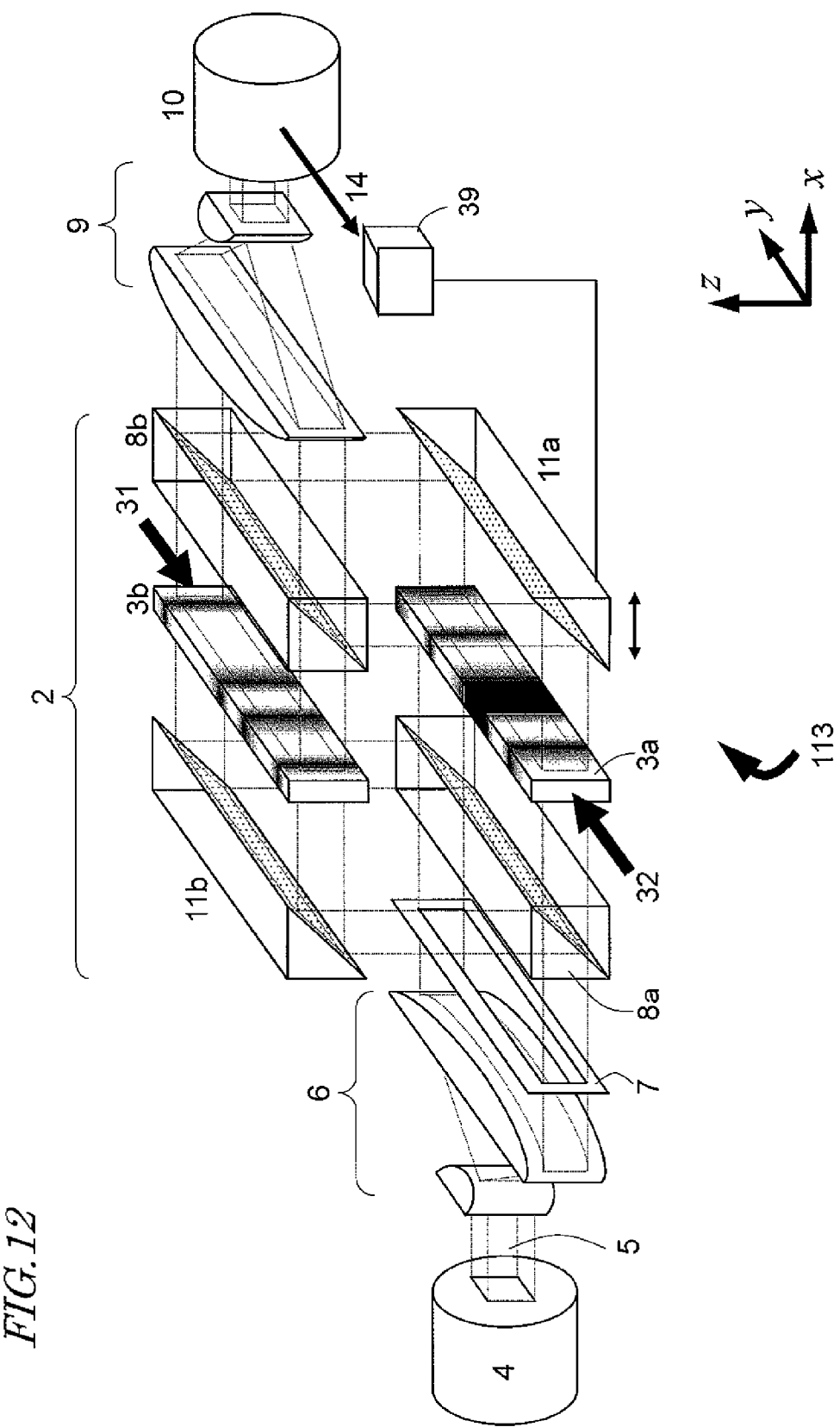

FIG. 12 is a perspective view showing a general device configuration of an optoacoustic convolver of Embodiment 3.

Figure 13A:
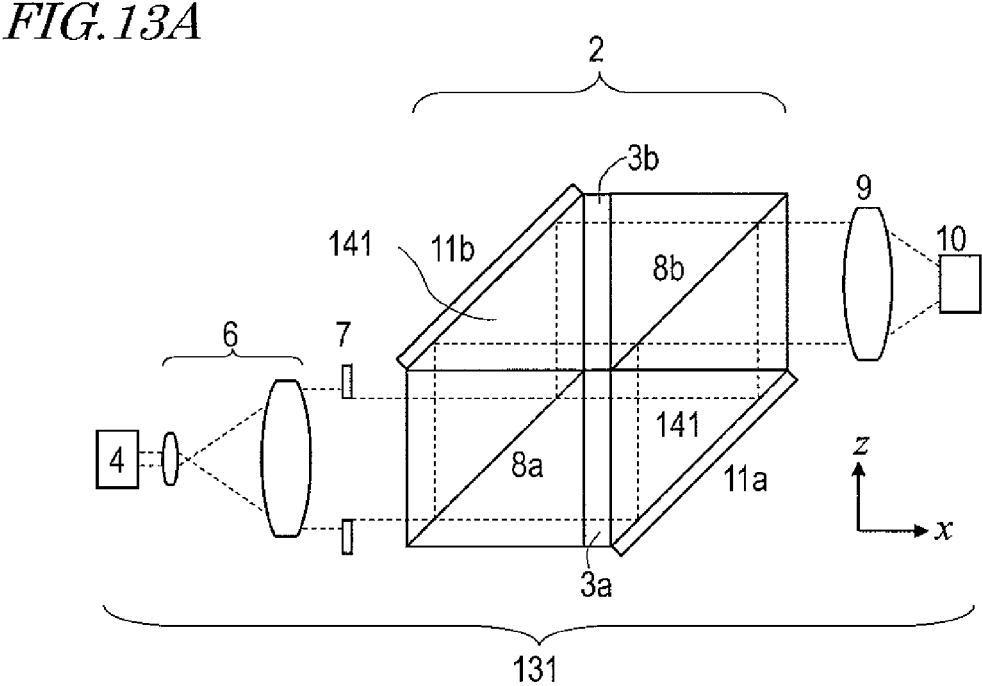

FIG. 13A is a schematic device configuration diagram showing another possible configuration example of an optoacoustic convolver according to Embodiment 3

Figure 13B:
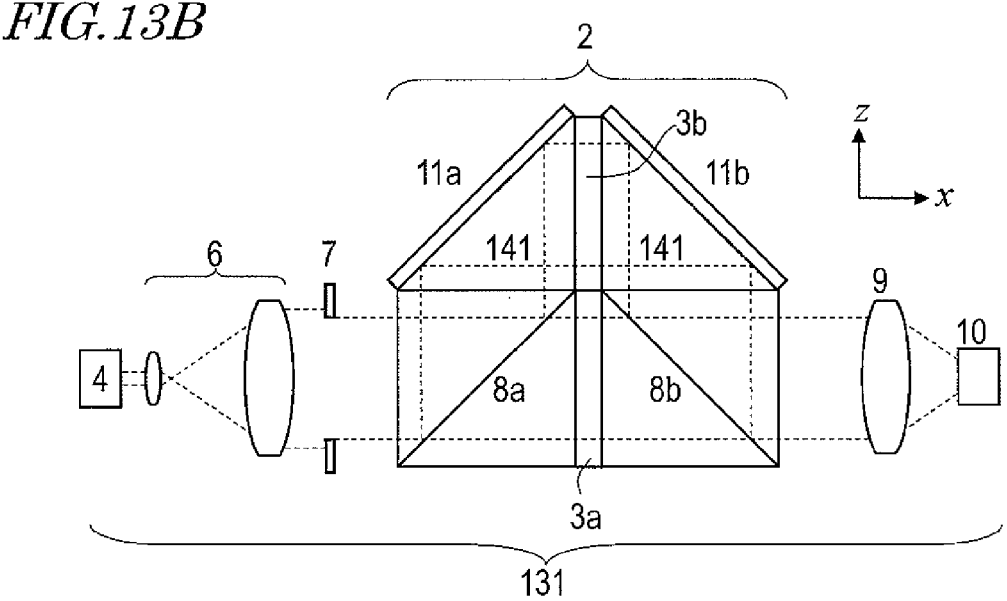

FIG. 13B is a schematic device configuration diagram showing still another possible configuration example of an optoacoustic convolver according to Embodiment 3.

Figure 14:
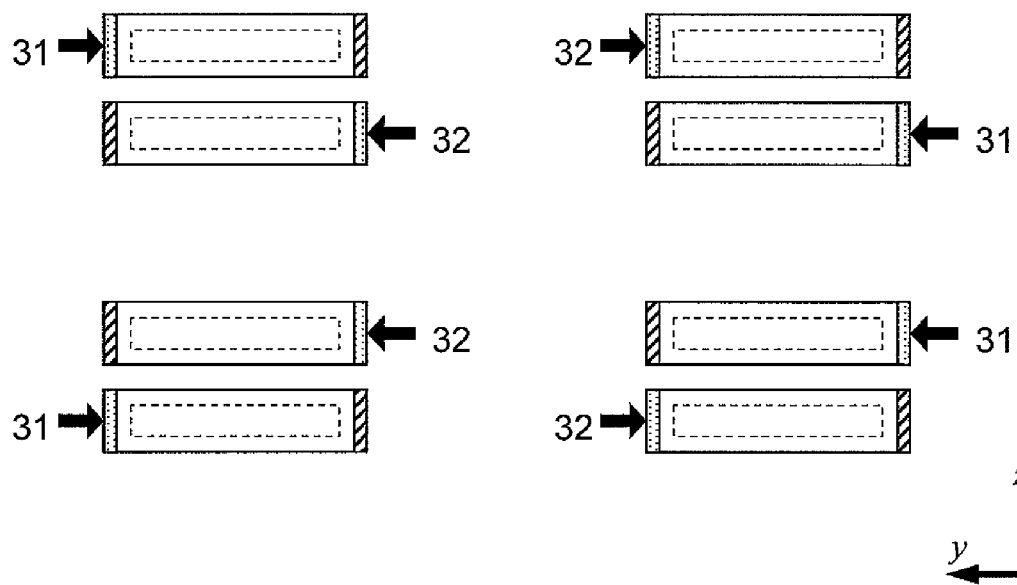

FIG. 14 is a top view showing a possible configuration of the acoustic waveguides 3a and 3b of an optoacoustic convolver according to Embodiments 1, 2 and 3.

Figure 15:
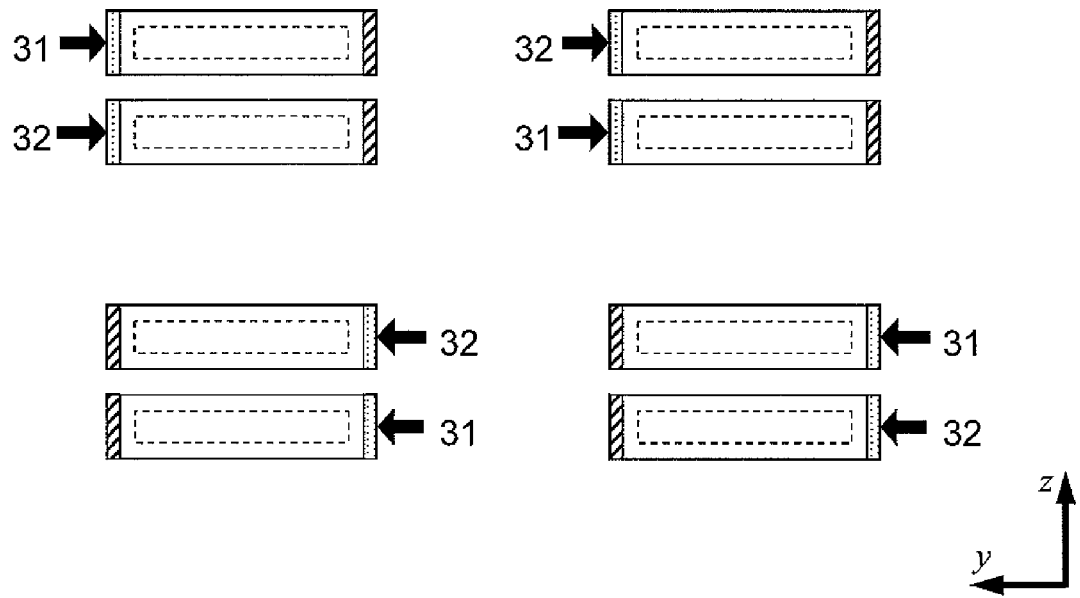

FIG. 15 is a top view showing another possible configuration of the acoustic waveguides 3a and 3b of an optoacoustic convolver according to Embodiments 1, 2 and 3.

Figure 16:
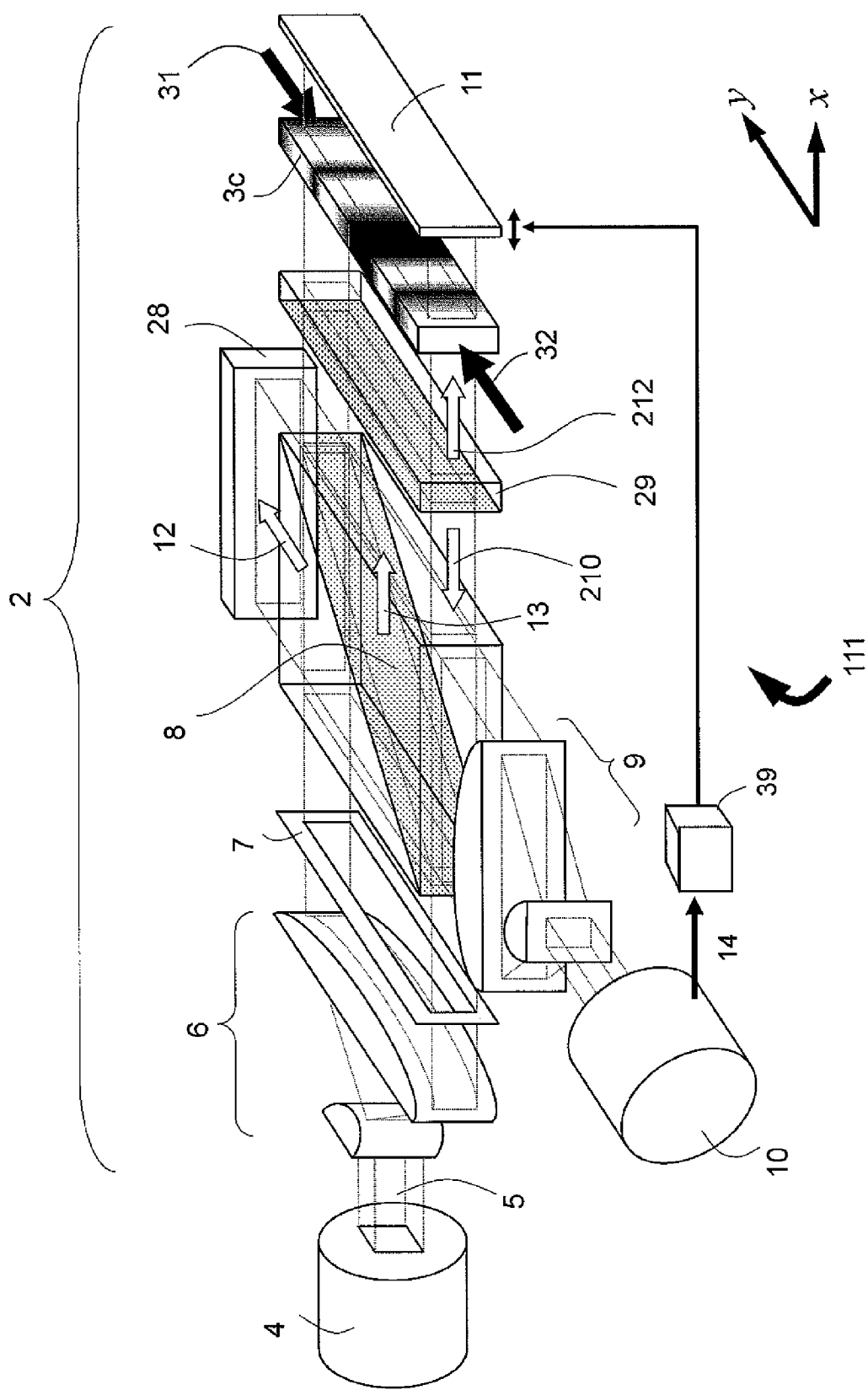

FIG. 16 is a perspective view showing a device configuration of an optoacoustic convolver according to Embodiment 4.

Figure 17:
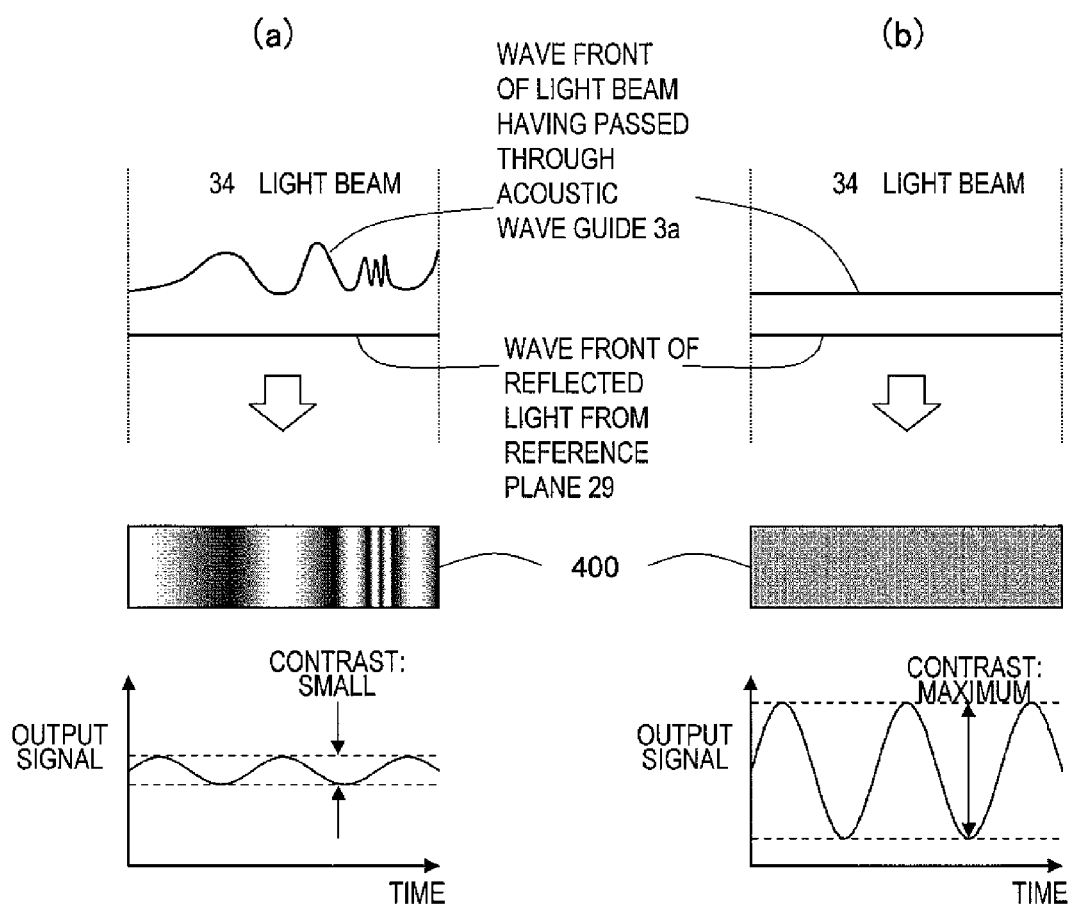

FIG. 17 is a diagram illustrating that a disturbance of the wave front of a light beam appears as an interference fringe in Embodiment 4.

Figure 18:
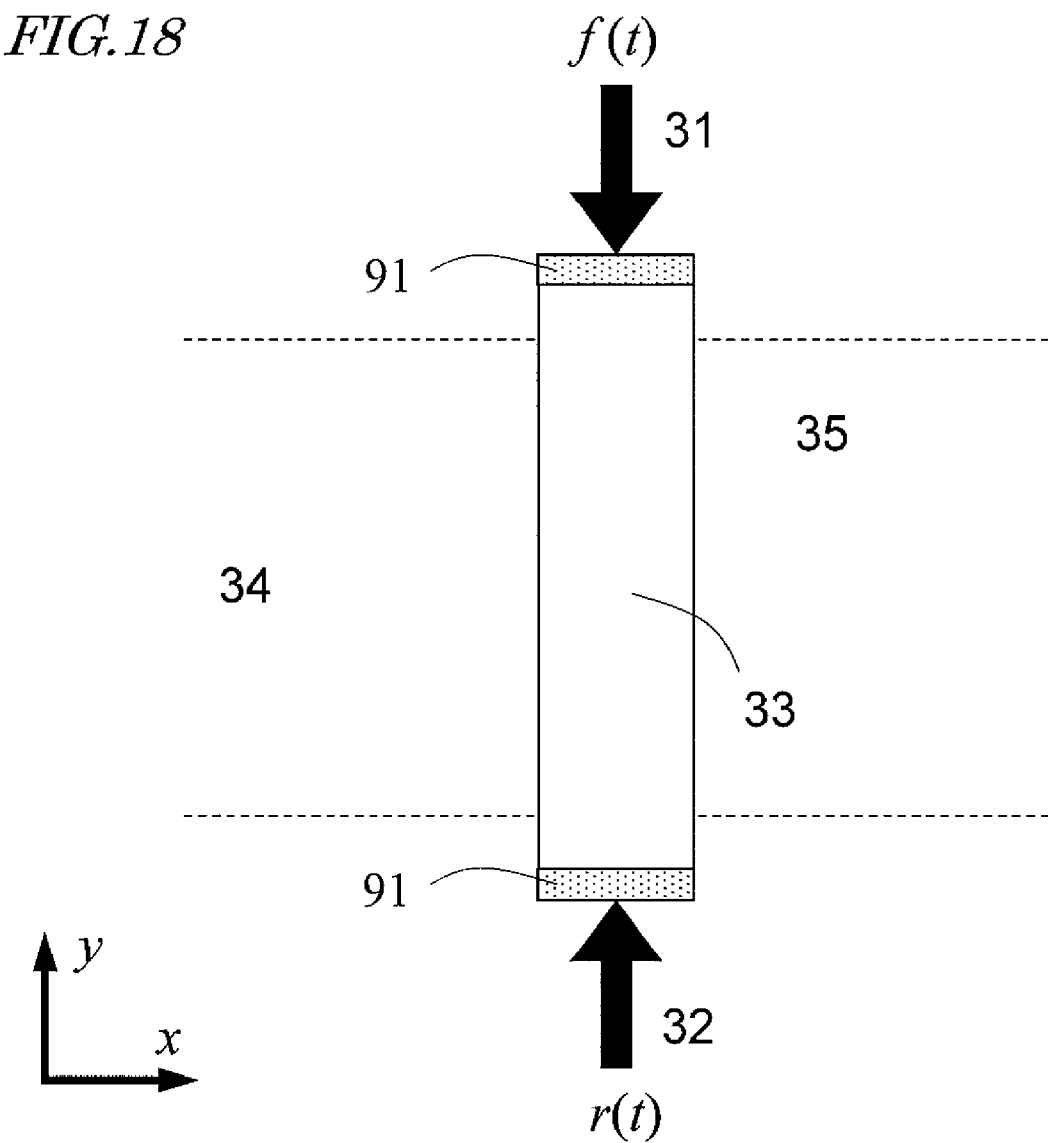

FIG. 18 is a top view showing a general configuration of an acoustic waveguide according to Embodiment 4.

Figure 19:
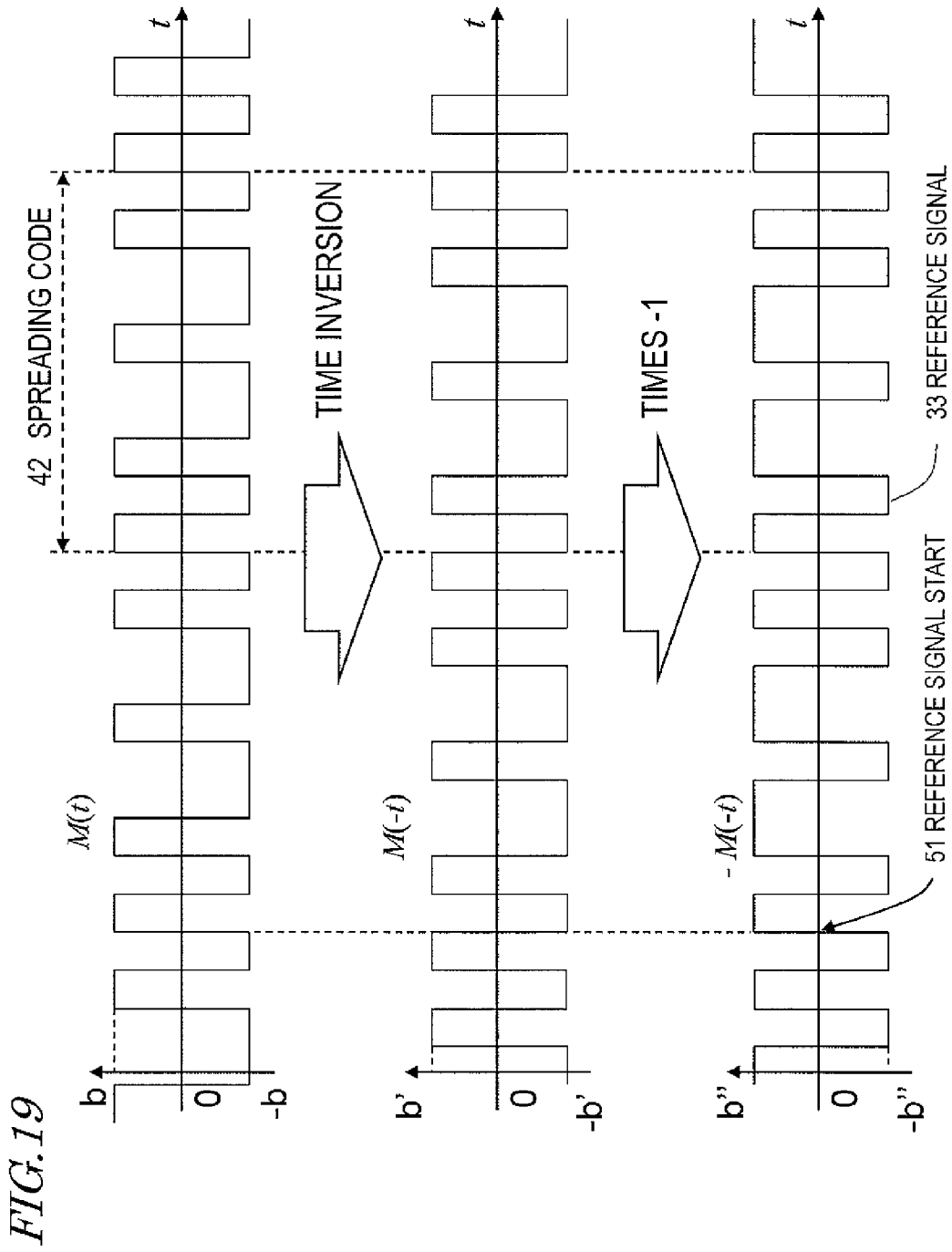

FIG. 19 is a diagram showing how a reference signal is reproduced from a spreading code in a receiver.

Figure 20:
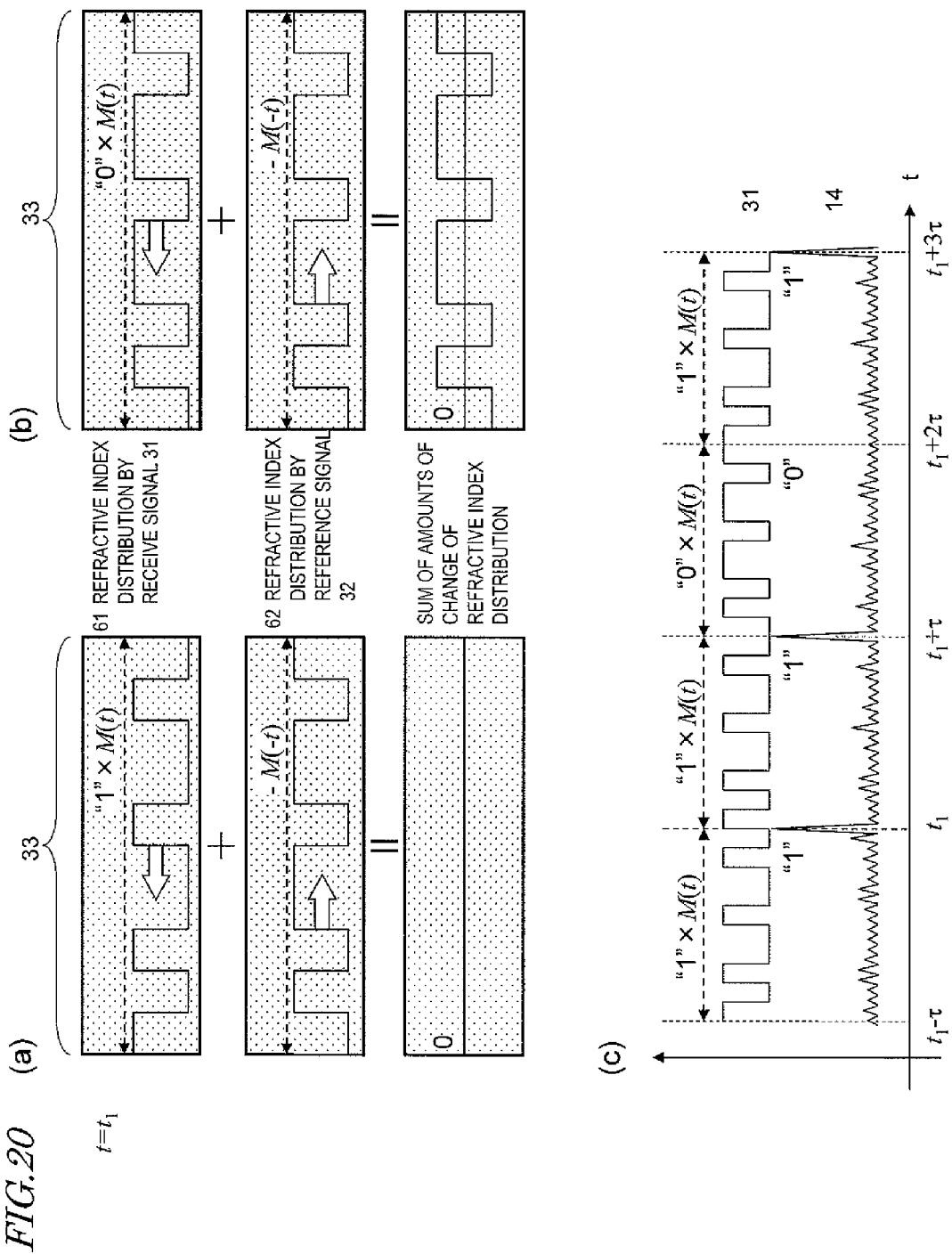

Portion (a) of FIG. 20 is a schematic diagram showing how "1" is reproduced by de-spreading a code string in the code-spread signal 43 that corresponds to "1", Portion (b) of FIG. 20 is a schematic diagram showing how "0" is reproduced by de-spreading a code string in the code-spread signal 43 that corresponds to "0", and Portion (c) of FIG. 20 is a time waveform diagram showing how four bits' worth of the received signal 31 is output from the light-receiving element 10 as a demodulated signal.

Figure 21:
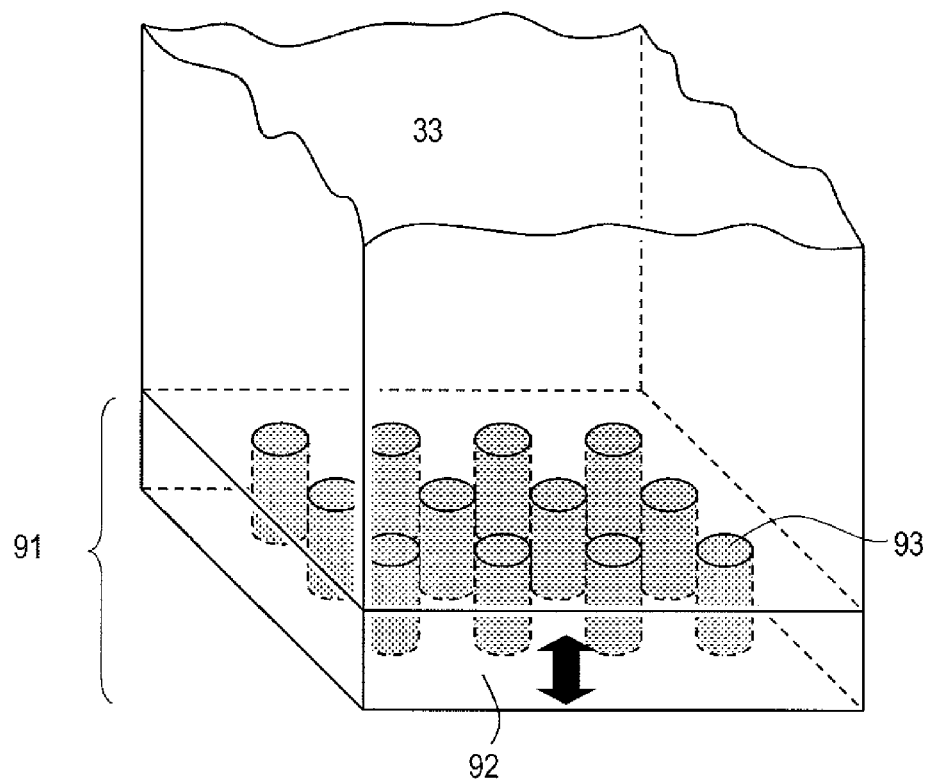

FIG. 21 is a perspective view showing a detailed structure of a compressional wave generation section provided at an end of an acoustic waveguide.

Figure 22:
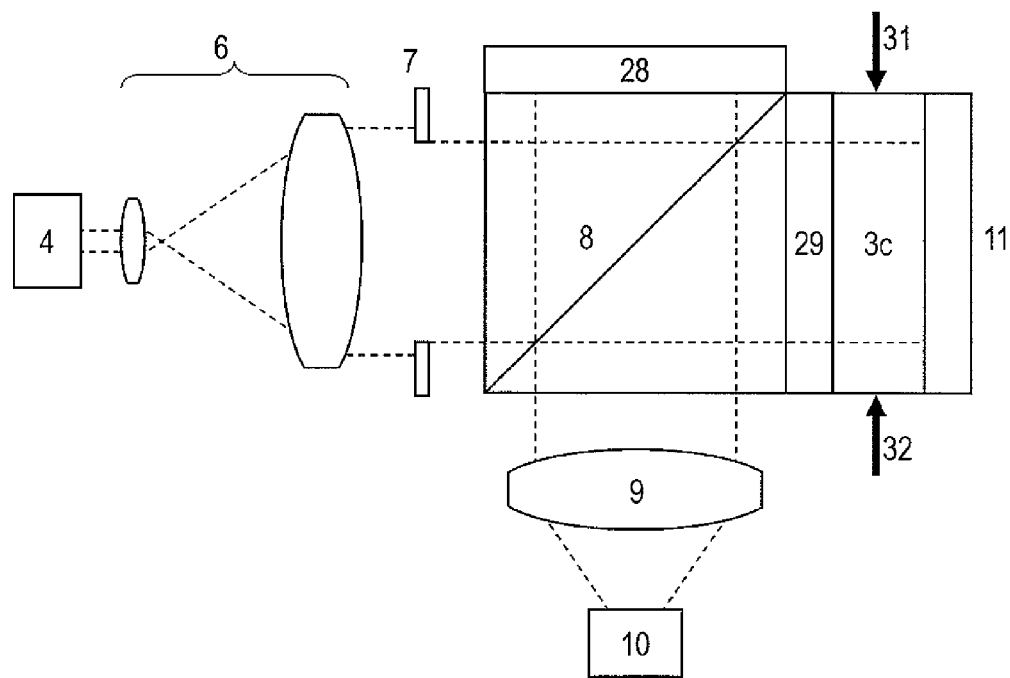

FIG. 22 is a diagram showing another configuration example of an optoacoustic convolver according to Embodiment 4.

Figure 23:
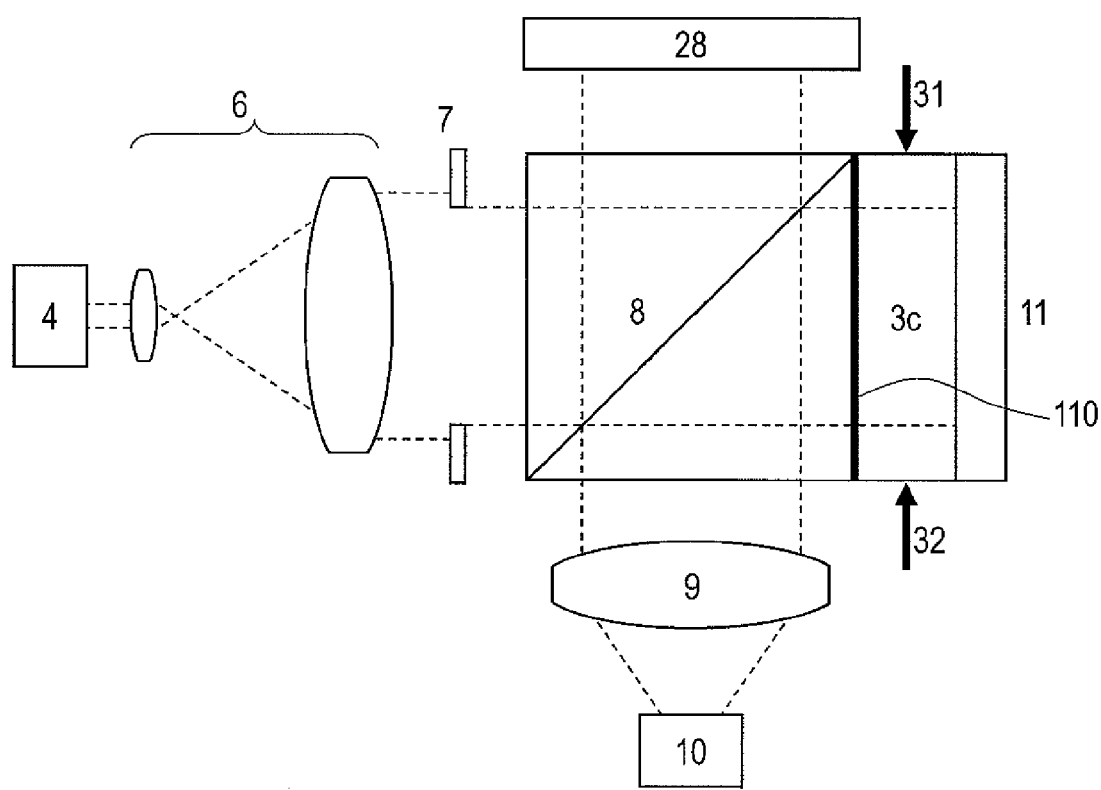

FIG. 23 is a diagram showing still another configuration example of an optoacoustic convolver according to Embodiment 4.

Figure 24:
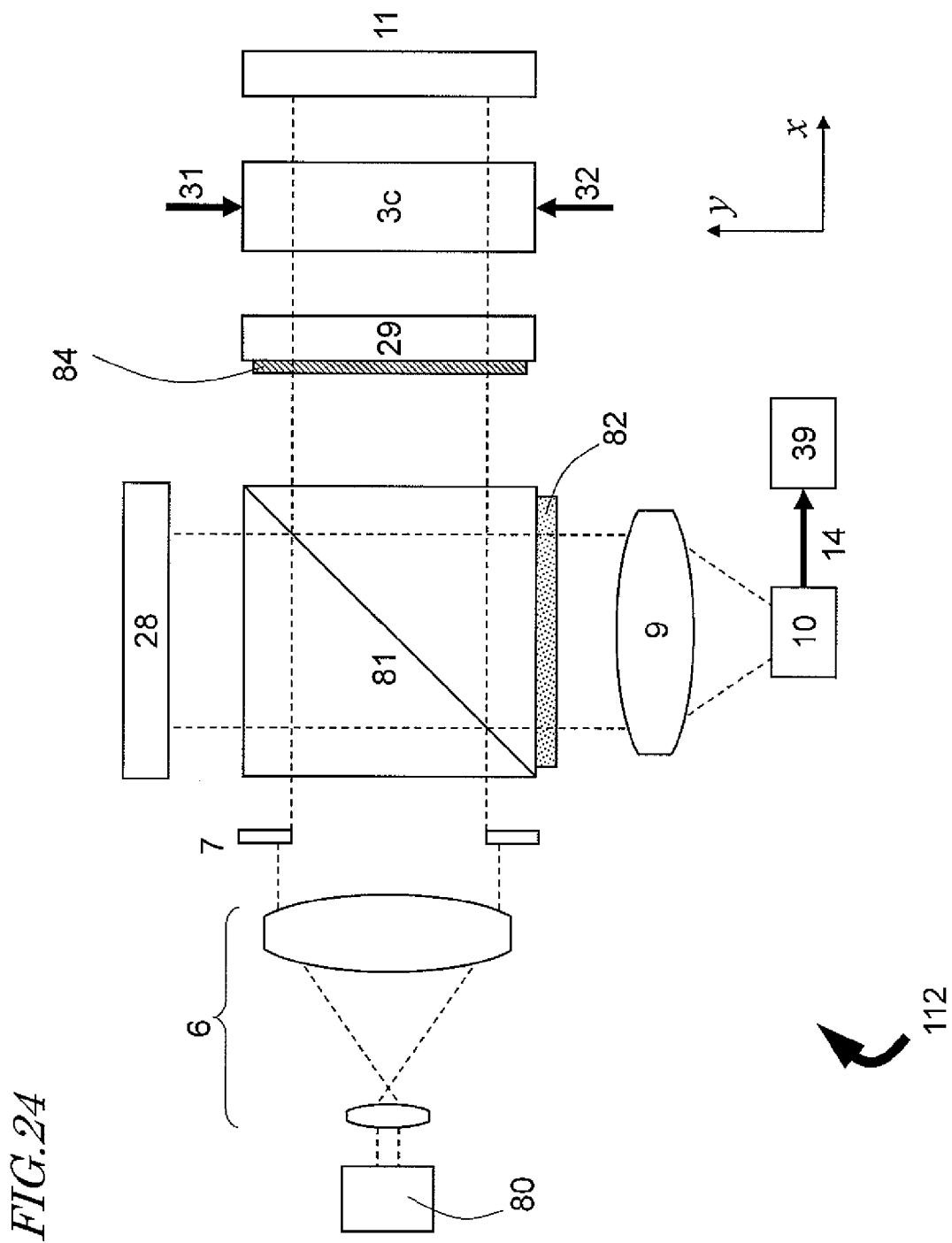

FIG. 24 is a diagram showing a configuration example of an optoacoustic convolver according to Embodiment 5.

Figure 25:
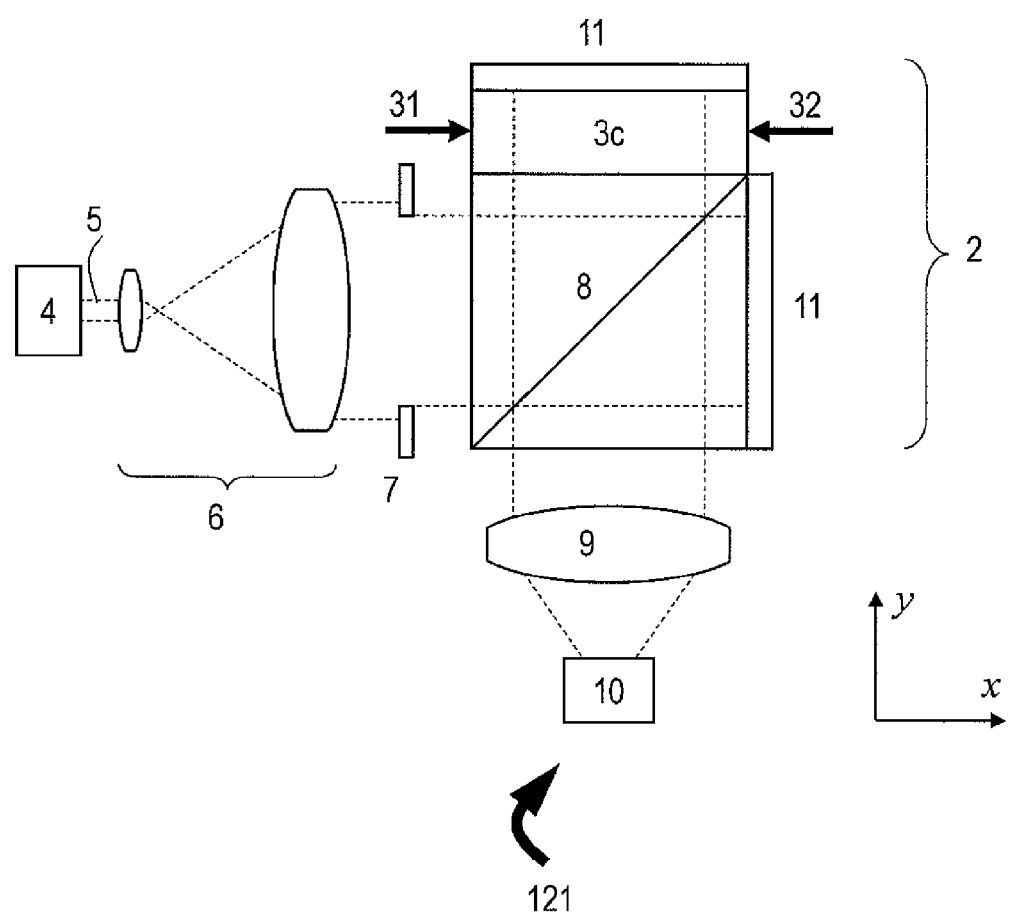

FIG. 25 is a diagram showing a configuration example of an optoacoustic convolver according to Embodiment 6.

Figure 26:
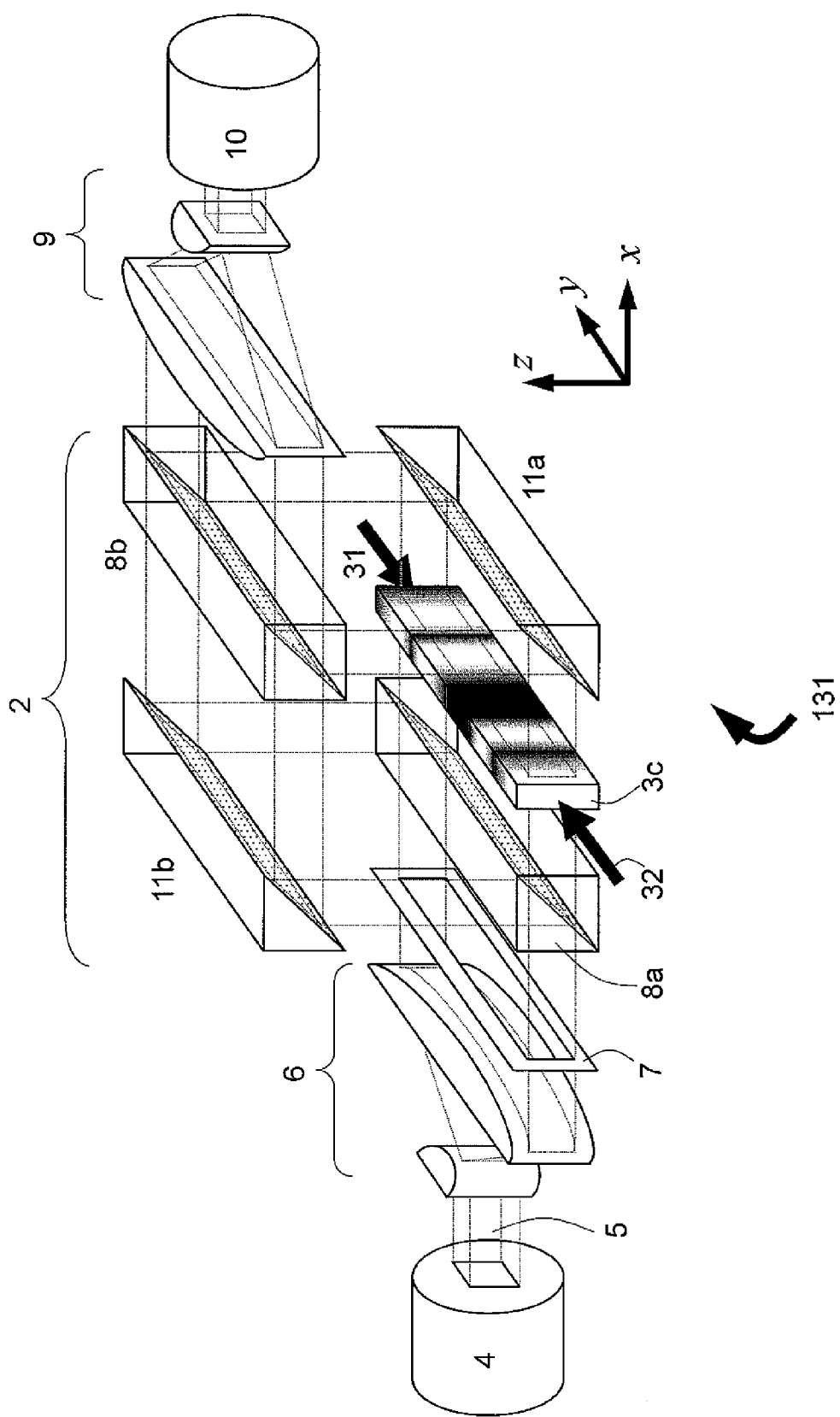

FIG. 26 is a diagram showing a configuration example of an optoacoustic convolver according to Embodiment 7.

Figure 27A:
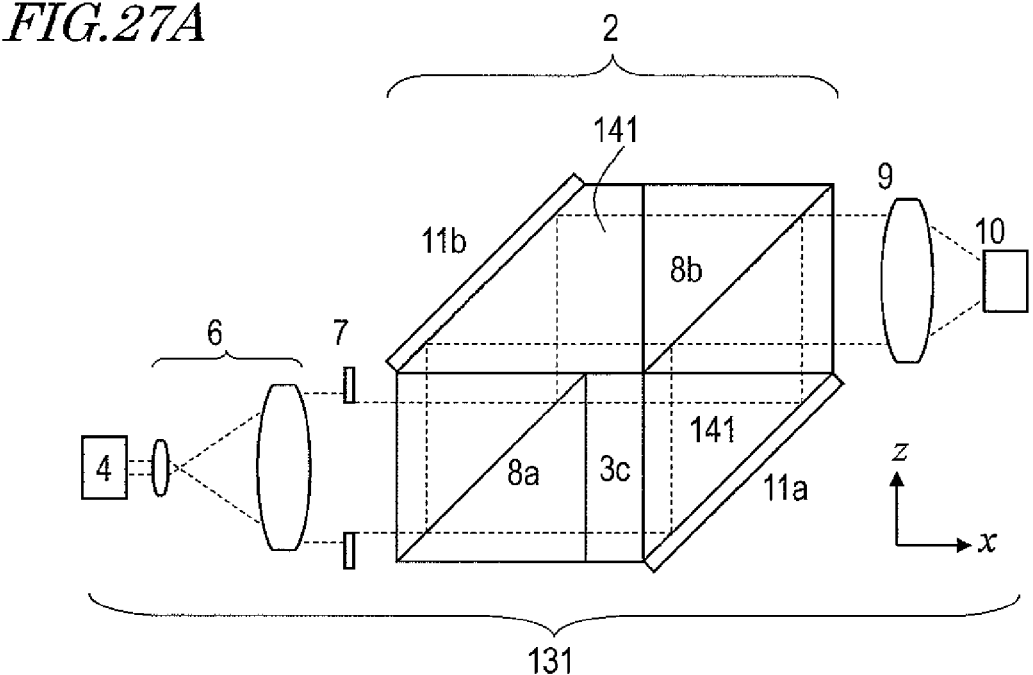

FIG. 27A is a diagram showing a variation of an optoacoustic convolver according to Embodiment 7.

Figure 27B:
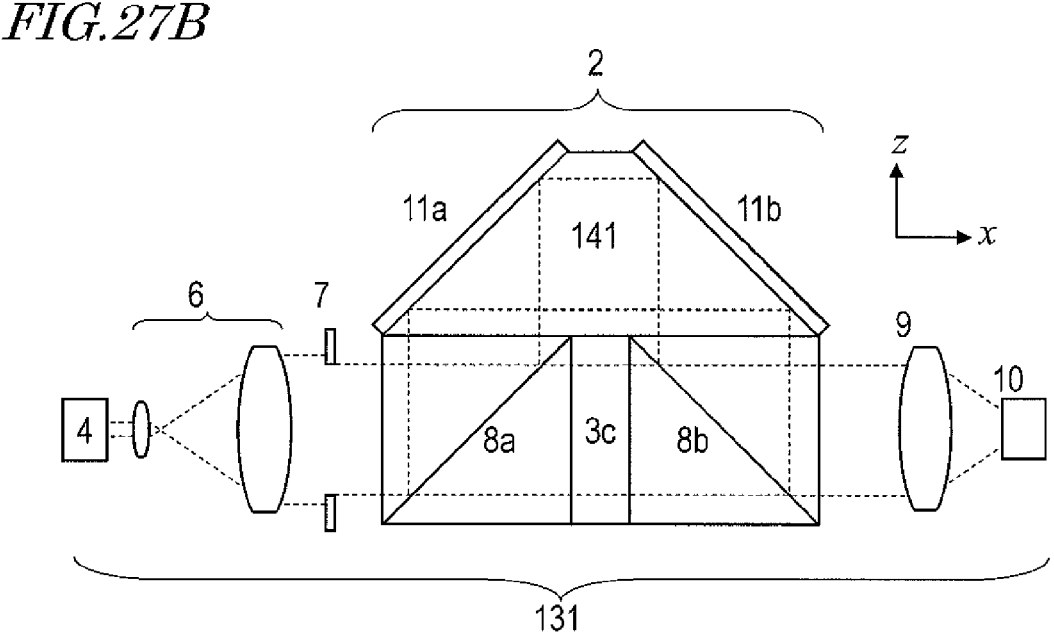

FIG. 27B is a diagram showing another variation of an optoacoustic convolver according to Embodiment 7.

Figure 28:
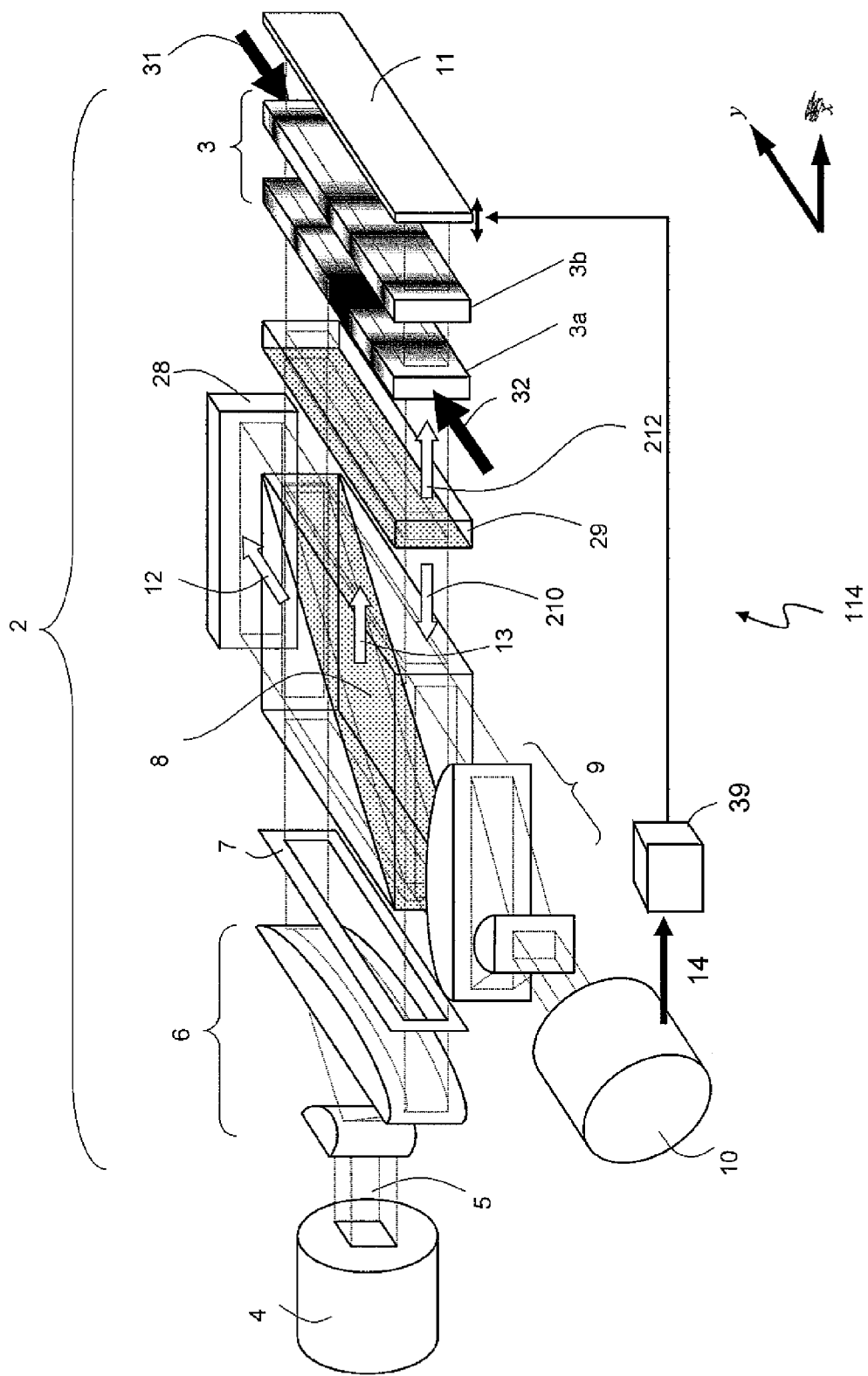

FIG. 28 is a diagram showing a configuration example of an optoacoustic convolver according to Embodiment 8.

Figure 29:
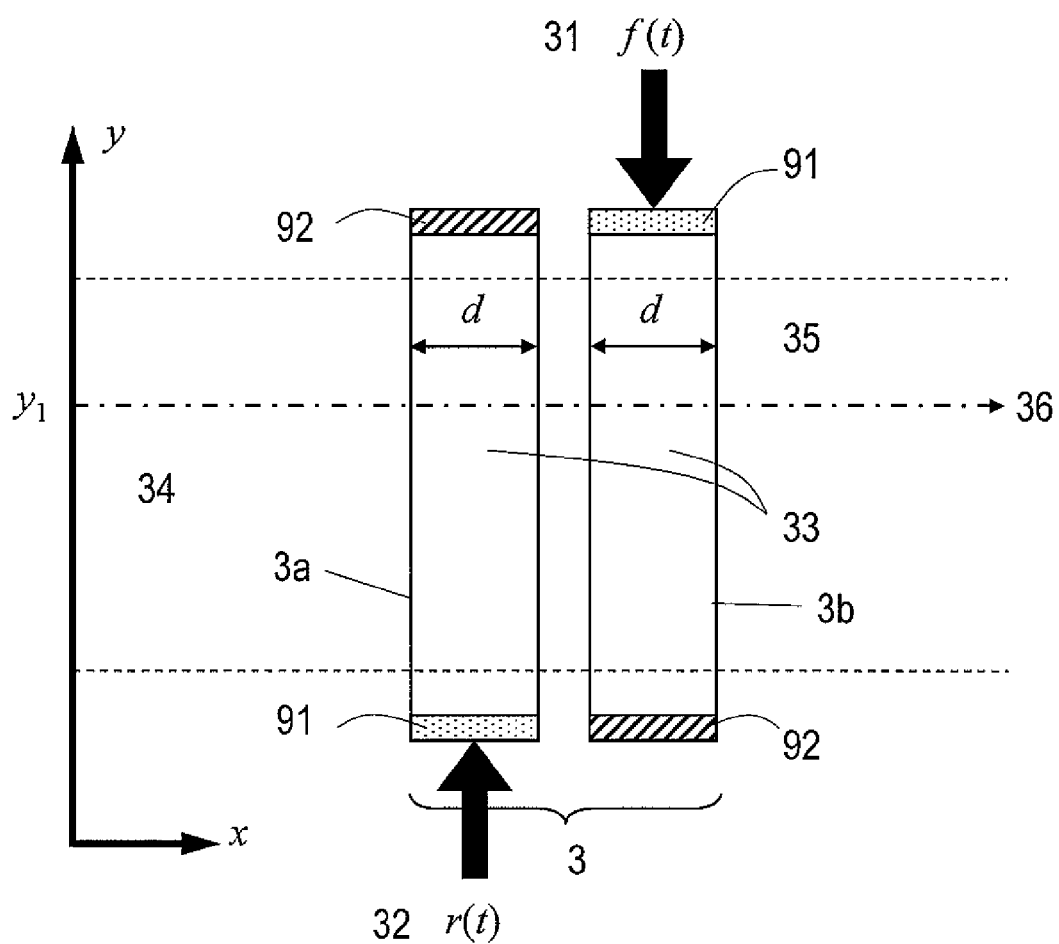

FIG. 29 is a diagram showing a configuration of an acoustic waveguide according to Embodiment 8.

Figure 30A:
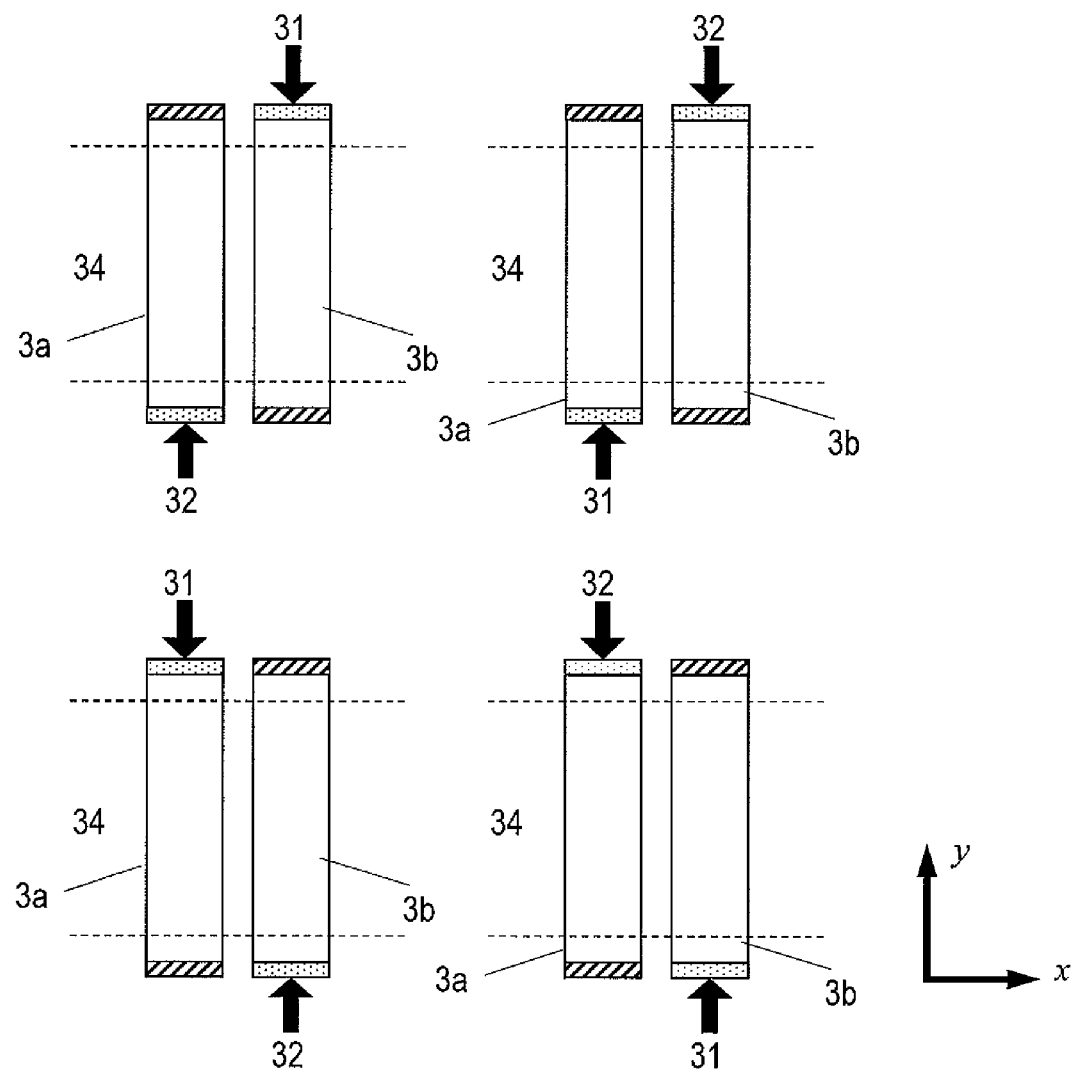

FIG. 30A is a diagram showing possible configuration examples of an acoustic waveguide according to Embodiment 8.

Figure 30B:
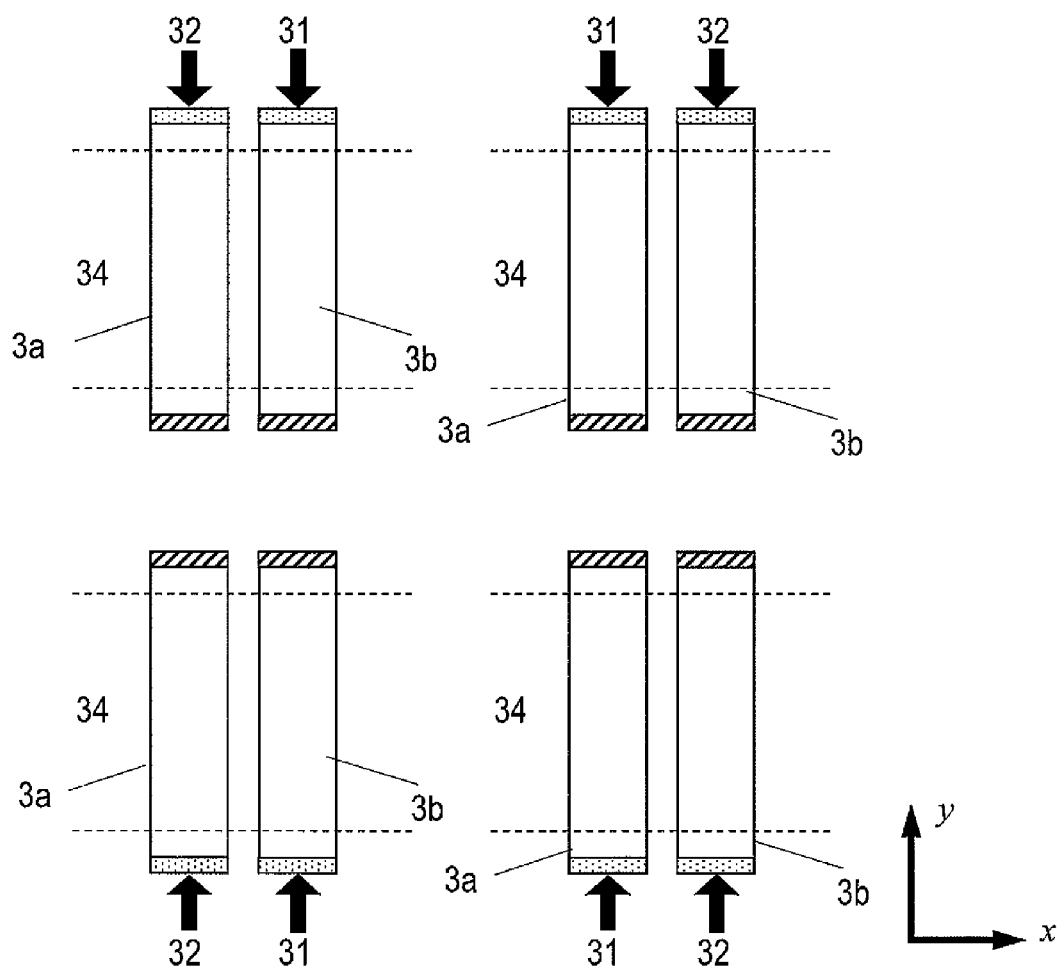

FIG. 30B is a diagram showing other possible configuration examples of an acoustic waveguide according to Embodiment 8.

Figure 31:
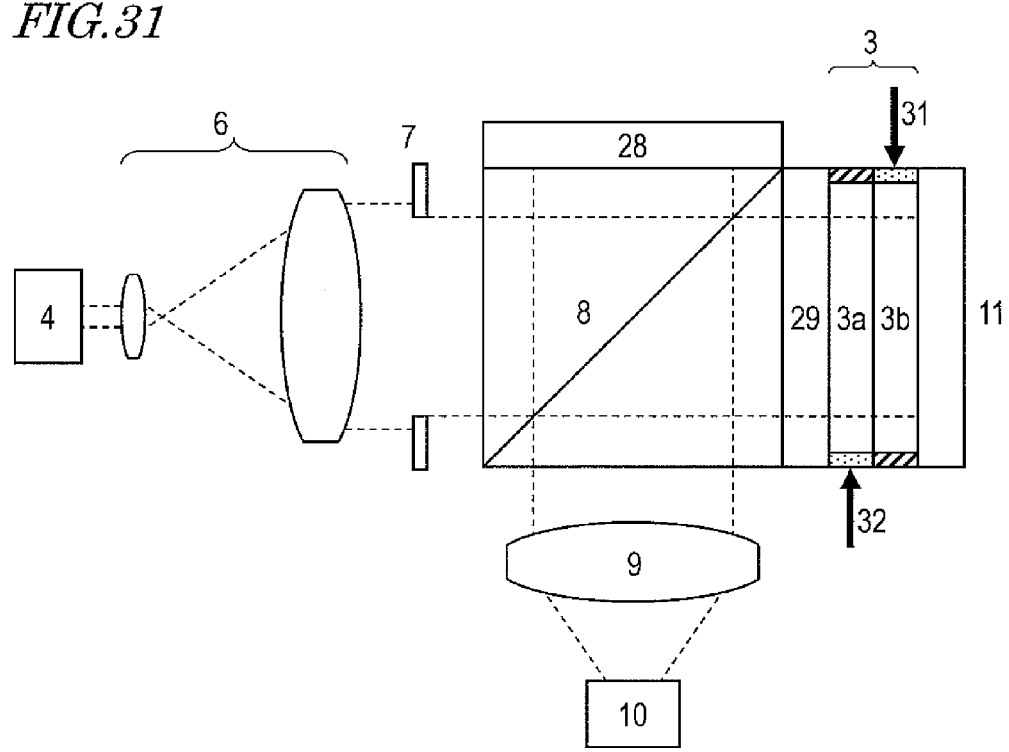

FIG. 31 is a diagram showing a variation of an optoacoustic convolver according to Embodiment 8.

Figure 32:
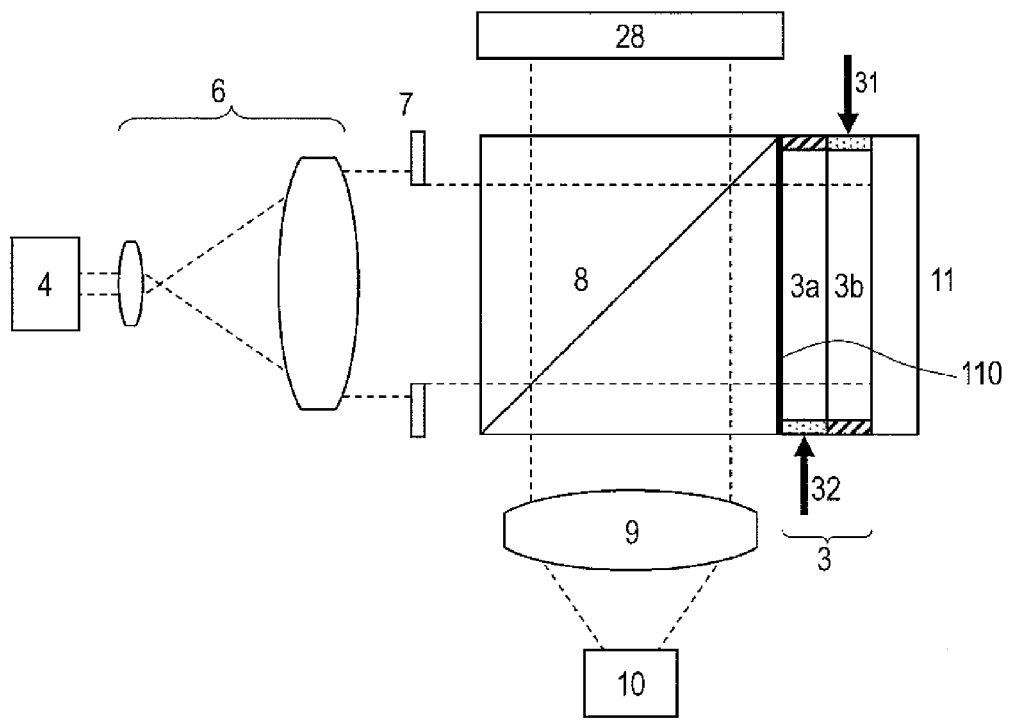

FIG. 32 is a diagram showing another variation of an optoacoustic convolver according to Embodiment 8.

Figure 33:
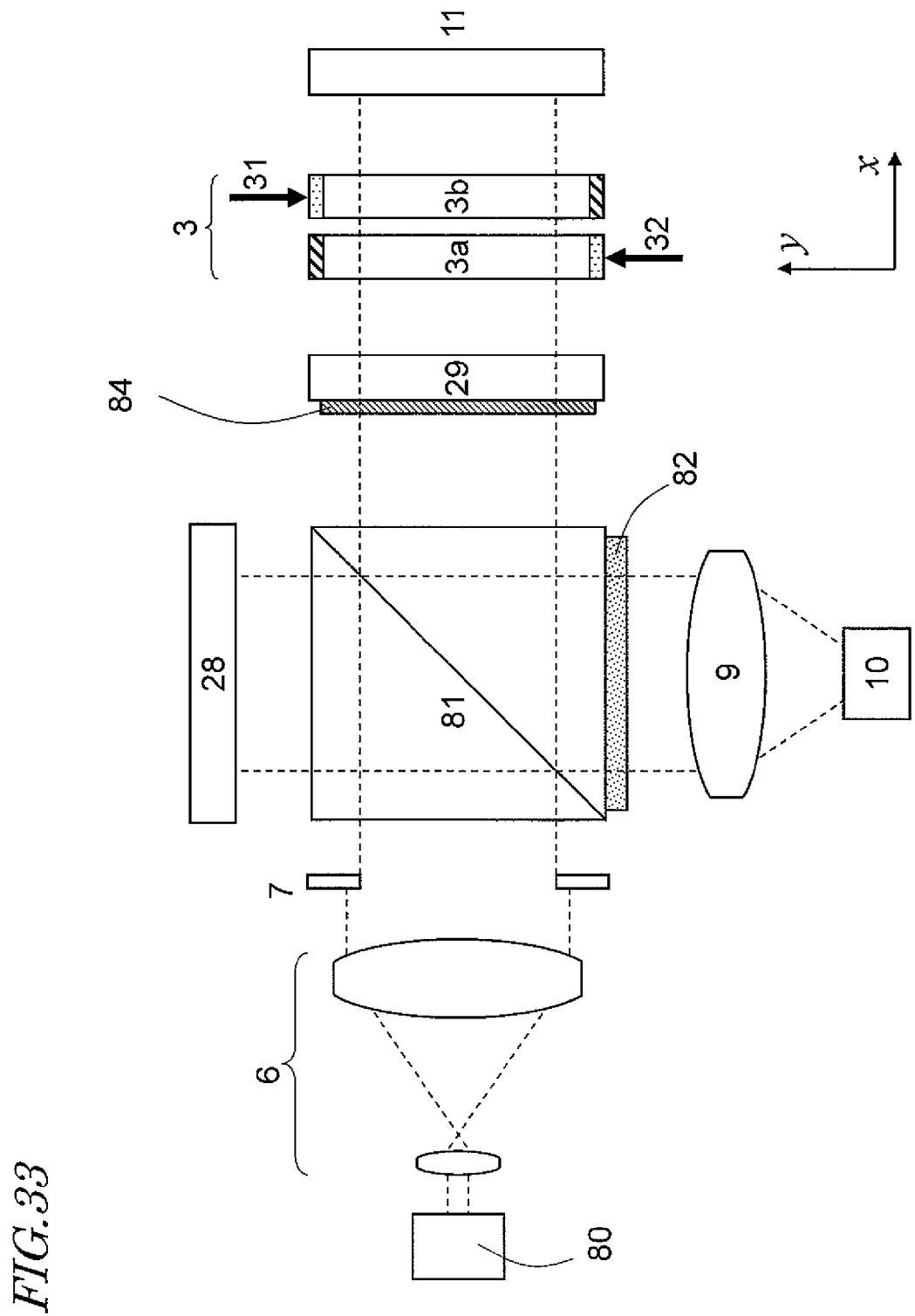

FIG. 33 is a diagram showing a configuration example of an optoacoustic convolver according to Embodiment 9.

Figure 34:
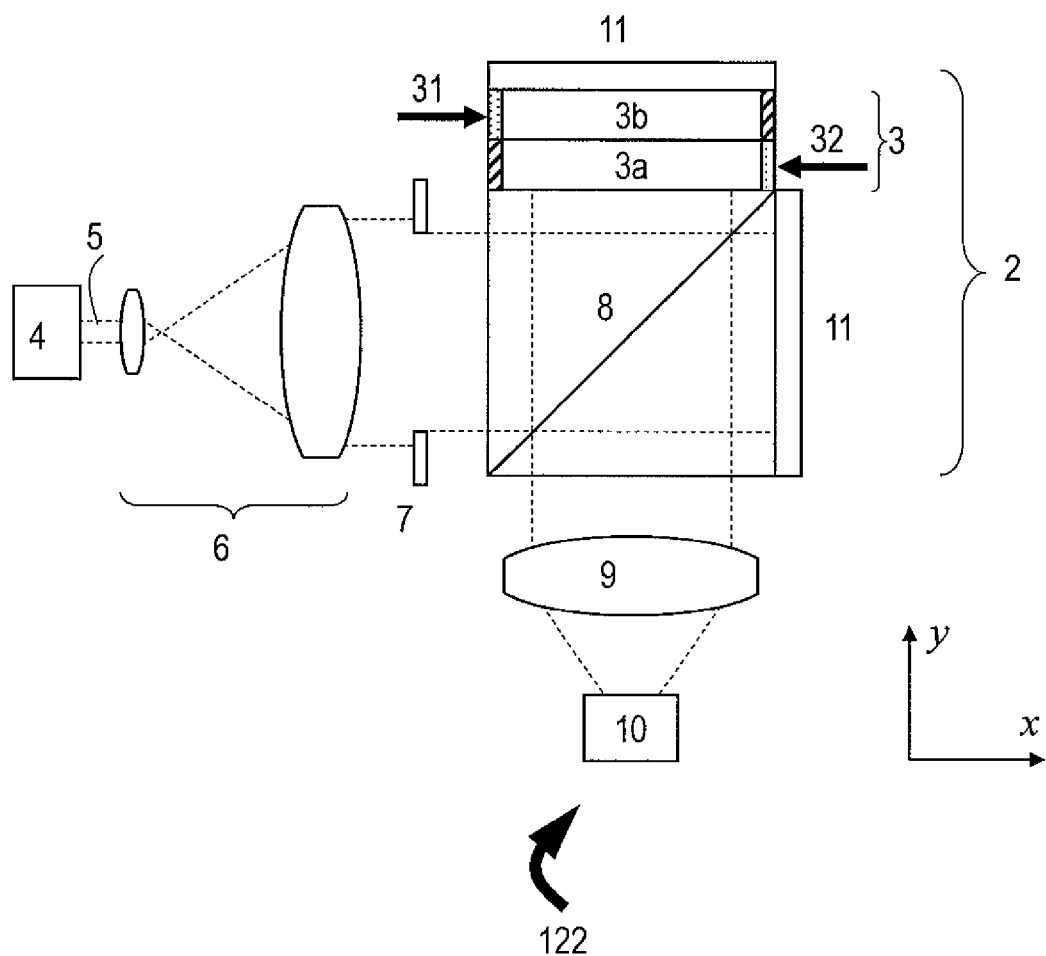

FIG. 34 is a diagram showing a configuration example of an optoacoustic convolver according to Embodiment 10.

Figure 35:
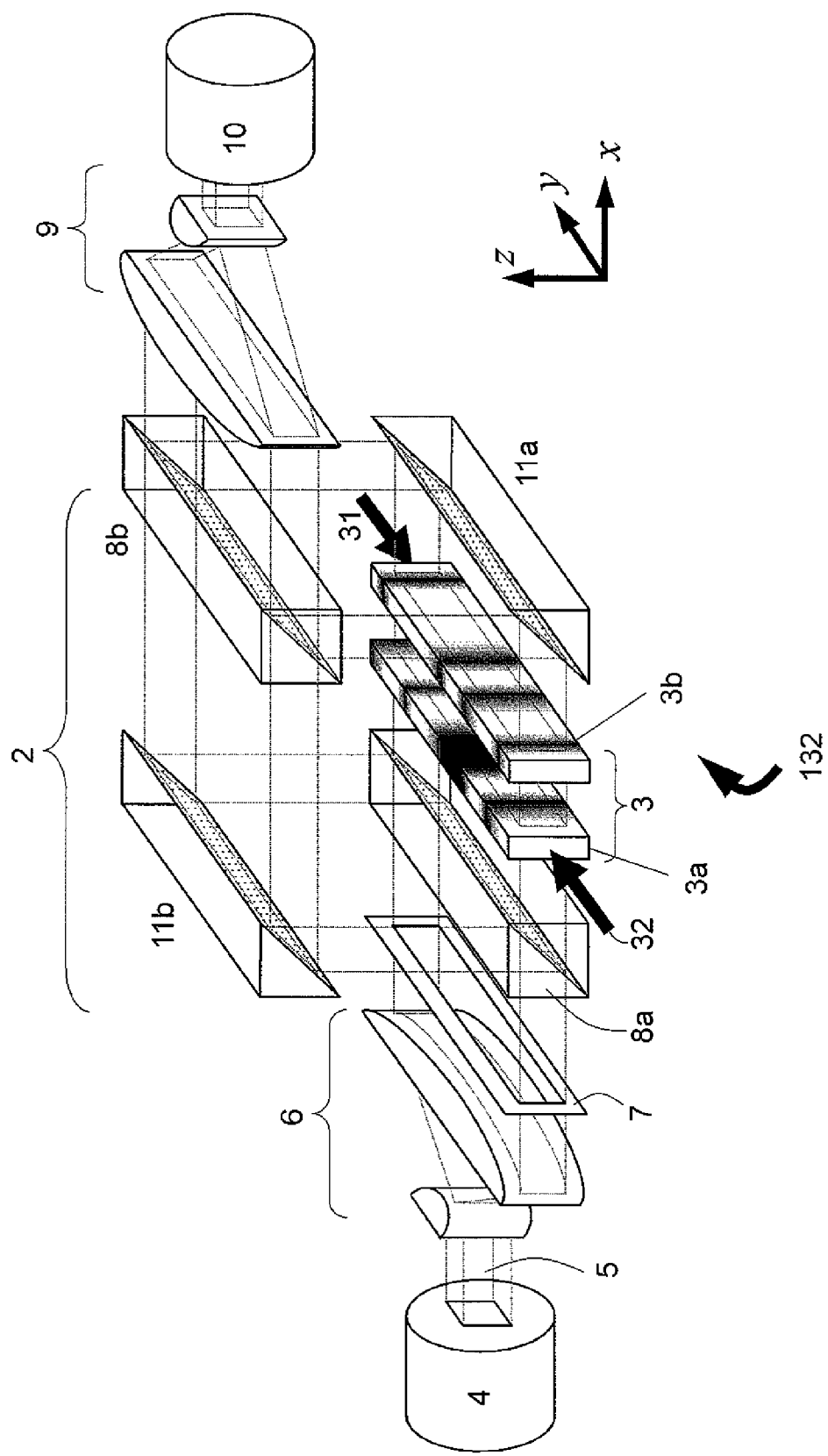

FIG. 35 is a diagram showing a configuration example of an optoacoustic convolver according to Embodiment 11.

Figure 36A:
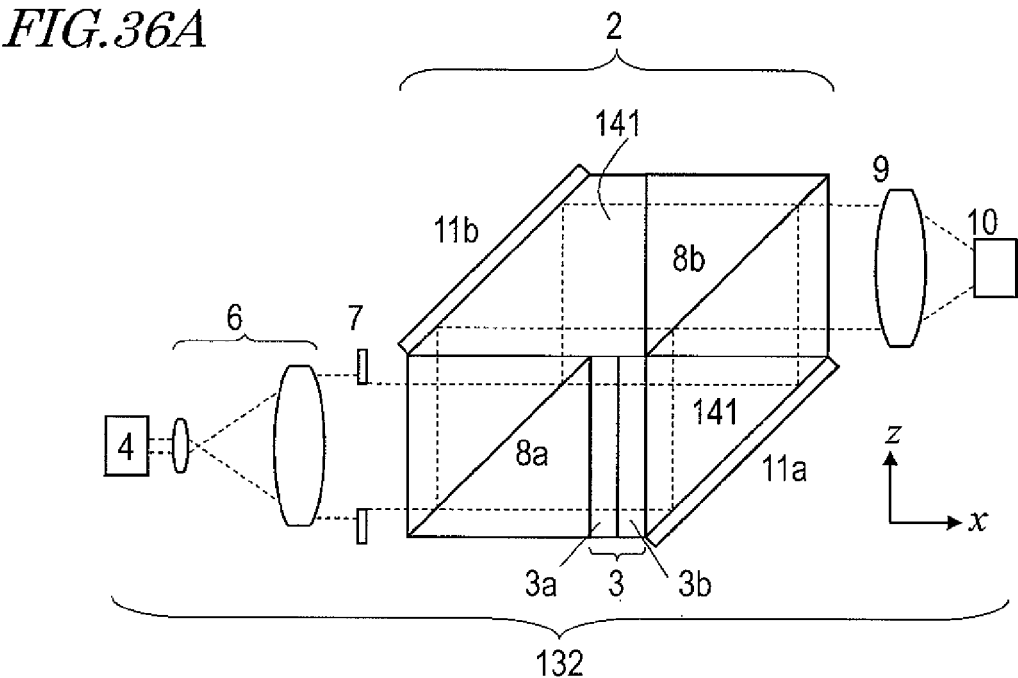

FIG. 36A is a diagram showing a variation of an optoacoustic convolver according to Embodiment 11.

Figure 36B:
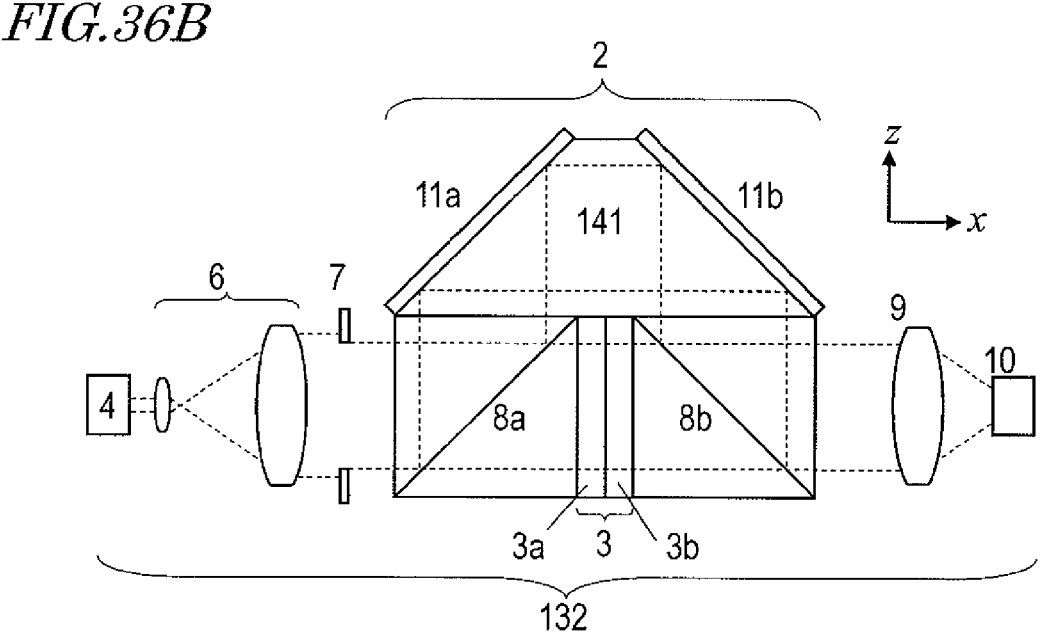

FIG. 36B is a diagram showing another variation of an optoacoustic convolver according to Embodiment 11.

Figure 37:
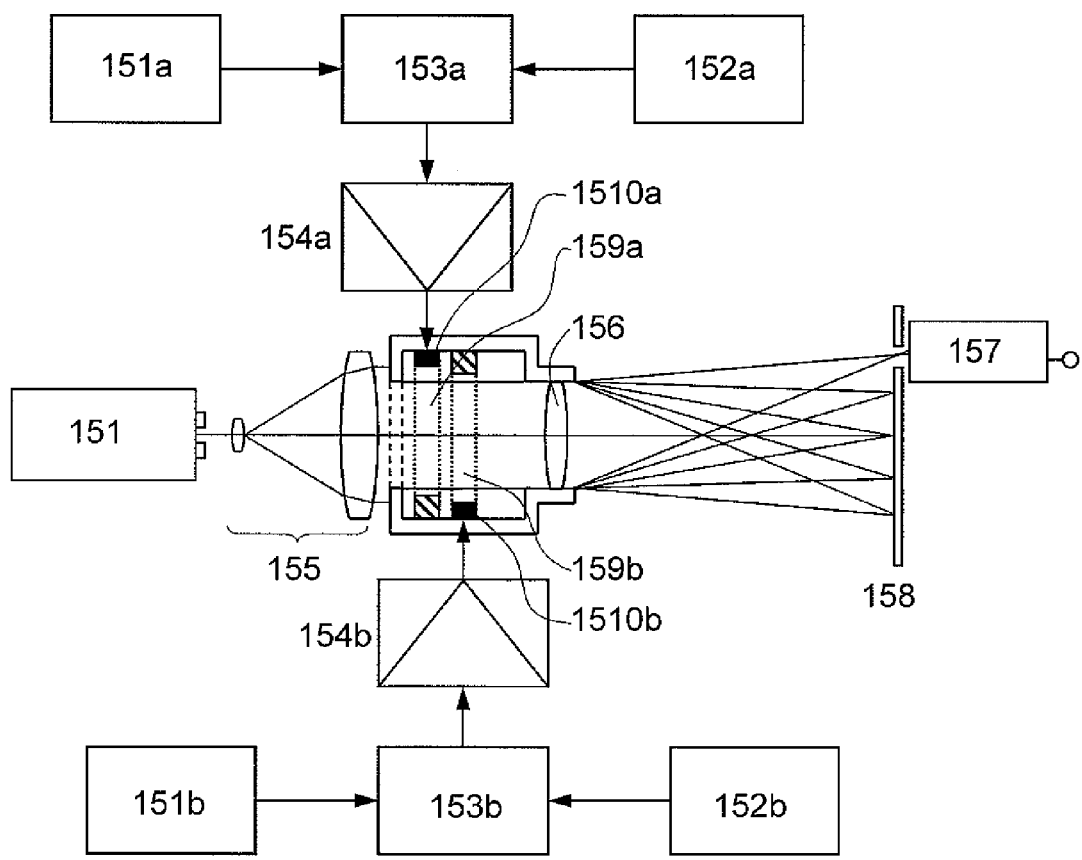

FIG. 37 is a schematic configuration diagram showing a device configuration of a conventional optoacoustic convolver described in Japanese Patent Application Laid-Open Publication No. S59-201020.

DETAILED DESCRIPTION OF PREFERRED EMBODIMENTS

An optoacoustic convolver of the present invention can be used as a part of a receiving system in a wireless/ultrasonic wave communication device such as a mobile telephone or an ultrasonic robot, for example. Before describing embodiments of the optoacoustic convolver of the present invention, an outline of a receiving system incorporating an optoacoustic convolver therein will be first described.

Figure 1A:
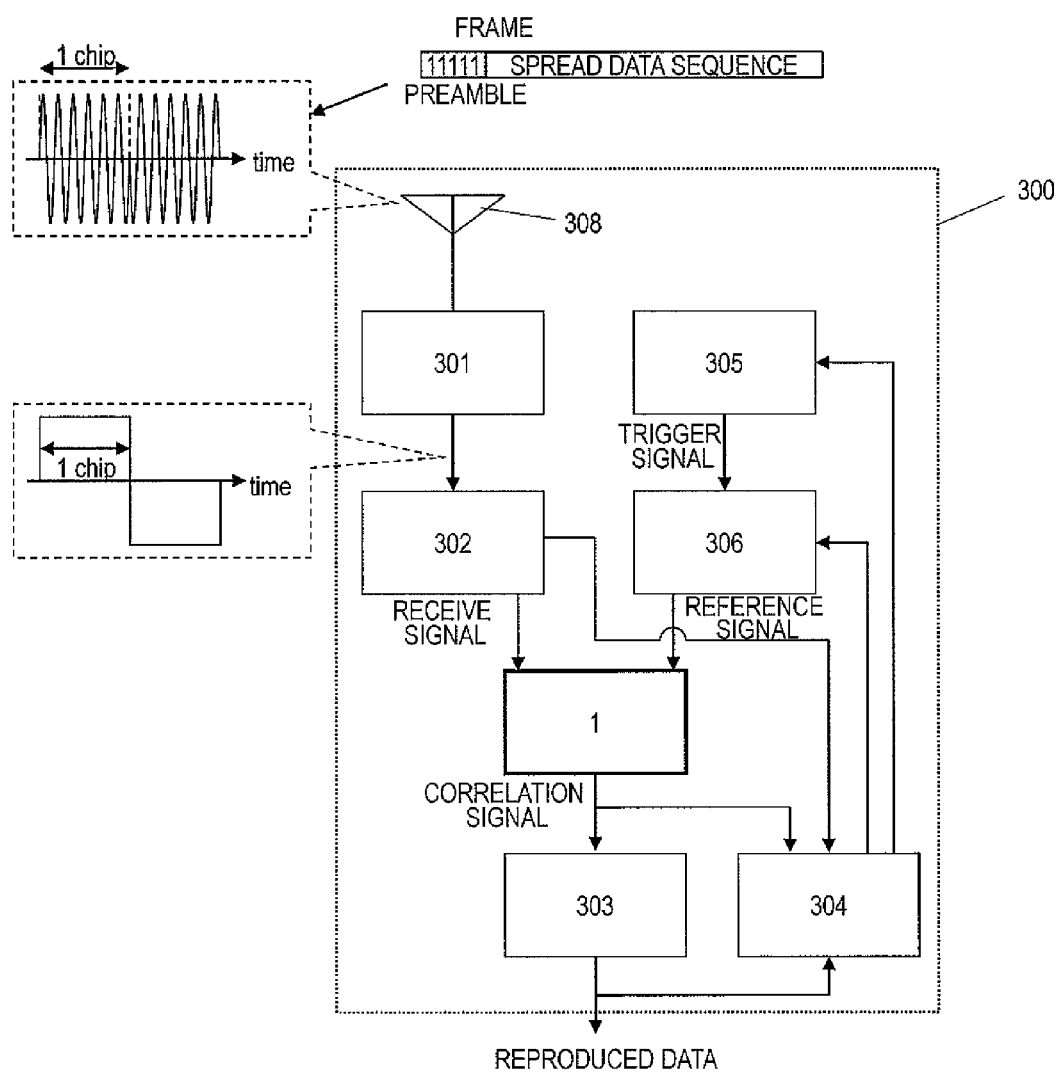
FIG. 1A is a diagram showing an example of a receiving system in which a convolver is used.

FIG. 1A is a diagram showing a configuration example of a receiving system 300 using an optoacoustic convolver 1 (hereinafter referred to as a "convolver") of the present invention. The receiving system 300 shown in FIG. 1A includes an antenna 308, a downconverter 301, an auto gain controller 302, a convolver 1, a data reproduction section 303, a synchronization control section 304, a synchronization circuit 305, and a de-spreading code string generation section 306. The optimal system configuration varies depending on the communication scheme (OFDM, SS spreading, etc.).

For example, with a direct sequence-type spectrum spreading scheme, the transmitting device and the receiving device have a common code string referred to as a "spreading code" stored therein. The transmitting device transmits the transmit data after converting it to a spread signal which is spread over a wide frequency band through an operation using the spreading code. Upon receiving the spread signal from the transmitting device, the receiving device generates a de-spreading code from the spreading code stored therein, and decodes the transmit data through an operation using the de-spreading code.

The antenna 308 shown in FIG. 1A receives the spread signal sent from the transmitter, and sends it to the downconverter 301. In this example, a code string for synchronization detection (preamble) is present at the beginning of the received signal (RF signal). A preamble is represented by a code string of a string of five chips of "1", for example. Bits of spread data are referred to as "chips", and a combination of a preamble and a spread data sequence is referred to as a "frame".

The downconverter 301 removes the carrier from the signal received by the antenna 308, thereby reproducing the digital signal (rectangular wave). This is an operation similar to that of a "front end circuit" in a wireless communication device. The digital signal reproduced by the downconverter 301 is input to the auto gain controller 302. The auto gain controller 302 variably amplifies the digital signal reproduced by the downconverter 301 so that the amplitude of the signal is always constant, and sends it to the convolver 1. The auto gain controller 302 is a circuit necessary for stabilizing the output of the correlation signal output from the convolver 1.

The convolver 1 generates a correlation signal representing the correlation between the signal (received signal) given from the auto gain controller 302 and the signal (reference signal) given from the de-spreading code string generation section 306 to be described below, and sends it to the data reproduction section 303 and the synchronization control section 304. Based on the correlation signal, it is determined whether the received signal and the reference signal are compatible with each other.

The data reproduction section 303 turns the pulse-like correlation signal back into an ordinary digital signal (rectangular wave), and outputs it to the outside as reproduced data. The synchronization control section 304 controls the operation of the synchronization circuit 305 and the de-spreading code string generation section 306 based on the correlation signal output from the convolver. The synchronization circuit 305 synchronizes the received signal and the reference signal with each other by adjusting the timing of the trigger signal sent to the de-spreading code string generation section 306 based on an instruction from the synchronization control section 304. Based on an instruction from the synchronization control section 304, the de-spreading code string generation section 306 generates a spreading code string and sends it to the convolver 1 as the reference signal.

An example of how the received signal and the reference signal are synchronized with each other will now be described. The method of synchronization depends on the communication scheme. First, once the synchronization control section 304 confirms that there is an input exceeding a prescribed value to an auto gain controller 301, i.e., that a signal of a sufficient intensity for establishing communication is input from the antenna 308, the de-spreading code string generation section 306 generates a de-spreading code string whose chips are all "1". Then, the synchronization control section 304 finely adjusts the timing of the trigger signal of the synchronization circuit 305 until the amplitude value of the correlation signal exceeds a predetermined threshold value. Thus, synchronization by chips is achieved. The synchronization control section 304 recognizes a preamble sequence out of the reproduced data given from the data reproduction section 303, and adjusts the timing of the trigger signal output from the synchronization circuit 305. Thus, synchronization by frames (each including a preamble and a spread data sequence) is achieved. Finally, the de-spreading code string generation section 306 generates the original de-spreading code, thereby outputting correct reproduced data.

The receiving system 300 can reproduce data from a received signal by such a process as described above. The convolver 1 of the present invention converts the received signal and the reference signal into acoustic compressional waves to be propagated through acoustic media, and obtains the correlation between the signals by observing interference light between light beams passing through the acoustic media.

An outline of the optoacoustic convolver 1 of the present invention will now be described.

Figure 1B:
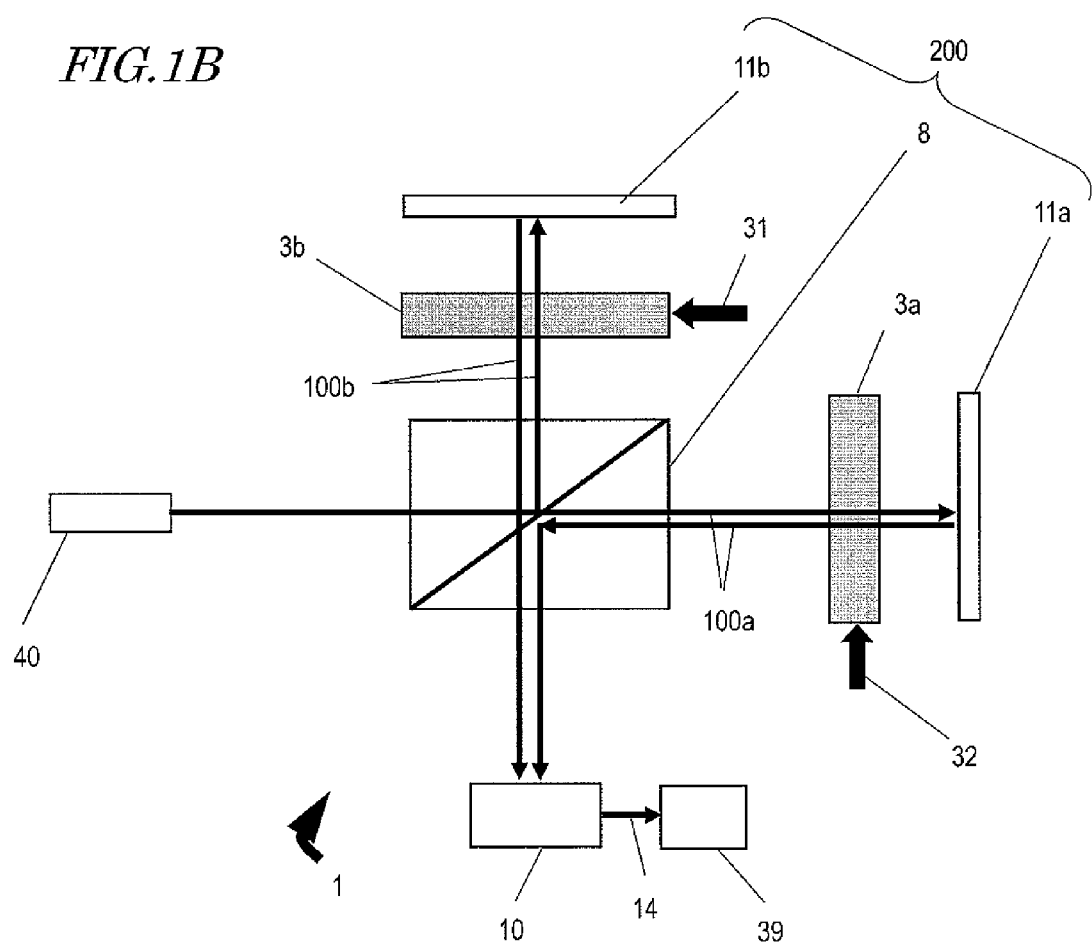
FIG. 1B is a diagram schematically showing an example of an optoacoustic convolver of the present invention.

FIG. 1B is a diagram showing an example of a general configuration of the optoacoustic convolver 1 of the present invention. In the example shown in FIG. 1B, the optoacoustic convolver 1 includes a light source 40, two acoustic waveguides 3a and 3b through which compressional waves based on a predetermined reference signal 32 and the received signal 31 received from outside are propagated, an optical system 200, a light-receiving section (light-receiving element) 10, and a correlation determination section 39 for determining the correlation between the reference signal 32 and the received signal 31.

Each of the acoustic waveguides 3a and 3b is filled with a light-transmissive acoustic medium. The reference signal 32 and the received signal 31 are input to the acoustic waveguides 3a and 3b, respectively, and compressional waves based on the signals are generated in the acoustic mediums. For example, each of the acoustic waveguides 3a and 3b includes a compressional wave generation section such as a piezoelectric oscillator provided at an end thereof so as to generate a plane wave based on the input signal in the acoustic medium. Thus, refractive index distributions based on the signals occur across the acoustic waveguides 3a and 3b. When light beams enter in directions crossing the propagation directions of these compressional waves and pass through the acoustic waveguides 3a and 3b, the wave front shapes change reflecting the refractive index distributions.

The optical system 200 includes a beam splitter 8, and two reflecting mirrors 11a and 11b. The beam splitter 8 splits light emitted from the light source 40 into a first light beam 100a and a second light beam 100b so that the first light beam 100a enters the first acoustic waveguide 3a and the second light beam 100b enters the second acoustic waveguide 3b. The reflecting mirror 11a is provided behind the back of the acoustic waveguide 3a, and reflects light having passed through the acoustic waveguide 3a. Similarly, the reflecting mirror 11b is provided behind the back of the acoustic waveguide 3b, and reflects light having passed through the acoustic waveguide 3b. The two light beams reflected by the reflecting mirrors 11a and 11b reach the beam splitter 8 again, where they are again split into transmitted light and reflected light. Of the first light beam 100a which has twice passed through the acoustic waveguide 3a, a light beam that is reflected by the beam splitter 8 enters the light-receiving section 10. Similarly, of the second light beam 100b which has twice passed through the acoustic waveguide 3b, a light beam that passes through the beam splitter 8 also enters the light-receiving section 10. Although the optical system 200 may further include a condensing lens, a magnifying lens, etc., they are not shown in FIG. 1B.

With the configuration described above, there occurs a difference in the shape of the wave front due to compressional waves generated in the acoustic waveguides between the first light beam 100a having passed through an acoustic waveguide 3a and the second light beam 100b having passed through the acoustic waveguide 3b. The light-receiving section 10 receives interference light between these two light beams having different wave front shapes, and outputs an electric signal 14 based on the intensity of the interference light. The correlation determination section 39 can determine whether the received signal 31 and the reference signal 32 are correlated with each other by observing the electric signal 14 output from the light-receiving section 10. Various methods can be used for the correlation determination. Specific determination methods will be described below.

The configuration of the optical system 200 is not limited to the example shown in FIG. 13, but various configurations may be used as will be described below. The optical system 200 of the present invention may be configured so as to split light emitted from the light source 40 into two light beams so that at least one of the light beams enters either acoustic waveguide, and so that interference light between these light beams enters the light-receiving section 10. While the optoacoustic convolver 1 includes two acoustic waveguides 3a and 3b in the example above, there may be only one acoustic waveguide. For example, two compressional waves corresponding to the reference signal and the received signal may be propagated in opposite directions from opposite sides of one acoustic waveguide, as shown in Embodiment 4 to be described below.

Embodiments of the present invention will now be described with reference to the drawings. In the following description, like reference numerals denote like components.

Embodiment 1

Figure 2:
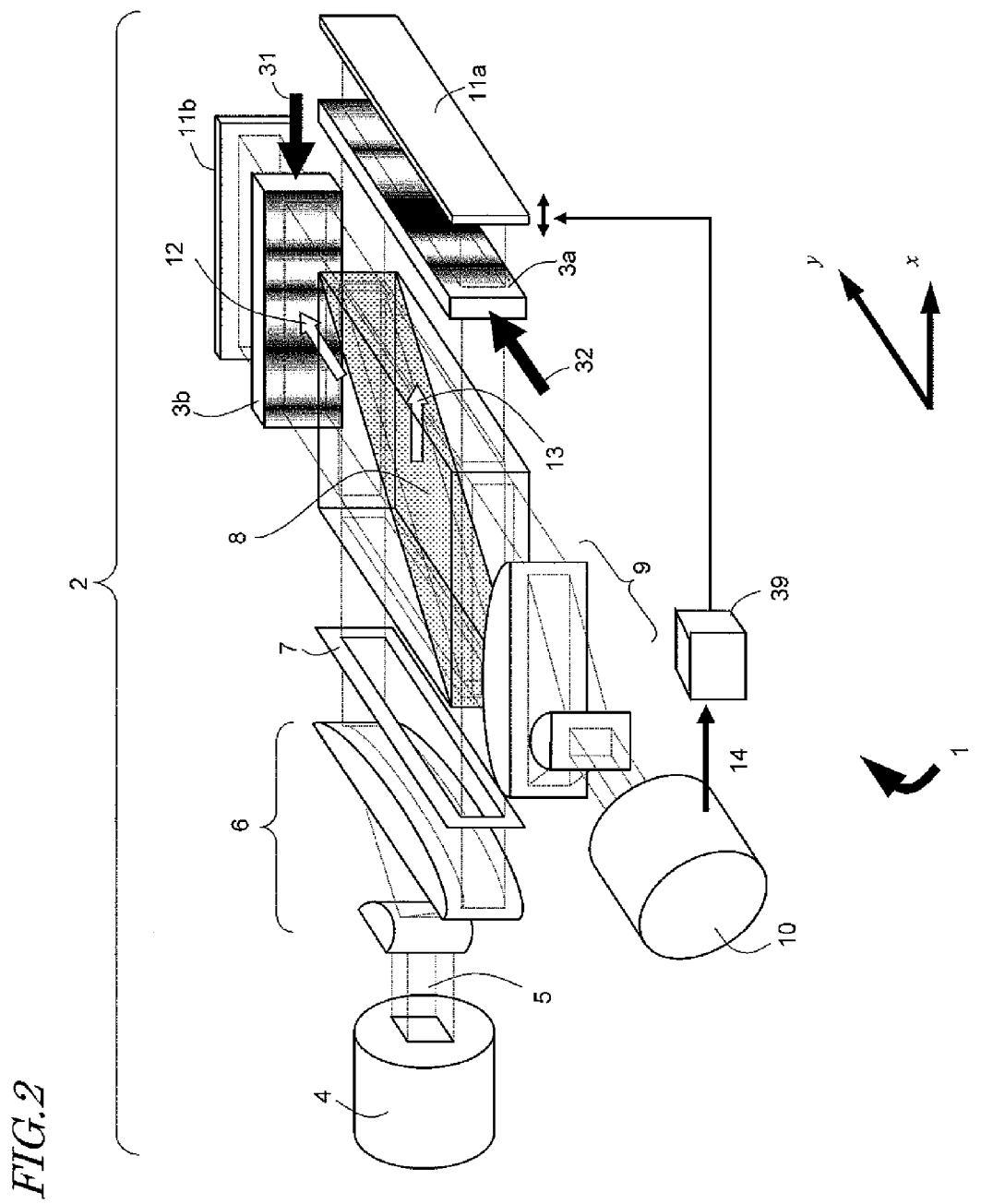
FIG. 2 is a perspective view showing a general device configuration of an optoacoustic convolver according to Embodiment 1.

A first embodiment of the present invention will be first described. FIG. 2 is a perspective view of an optoacoustic convolver of the present embodiment. As shown in FIG. 2, the optoacoustic convolver 1 of the present embodiment includes a wave front interferometer 2, the acoustic waveguides 3a and 3b to which the received signal 31 and the correlation signal 32 are input, respectively, and a contrast observing section 39 for observing the correlation between the two signals based on the output signal of the wave front interferometer 2. The xy coordinate system shown in FIG. 2 is used in the following description.

First, referring to FIG. 2, the configuration and the operation of the wave front interferometer 2 will be described. The wave front interferometer 2 includes a monochromatic light source 4, an enlarging optical system 6, an aperture 7, the beam splitter 8, the two reflecting mirrors 11a and 11b, a condensing optical system 9, and the light-receiving element 10. The wave front interferometer of the present embodiment has such a configuration that it is classified as a Michelson-Morley interferometer. The acoustic waveguides 3a and 3b are provided between the beam splitter 8 and the two reflecting mirrors 11a and 11b, respectively, in the wave front interferometer 2. In the present embodiment, the enlarging optical system 6, the aperture 7, the beam splitter 8, the two reflecting mirrors 11a and 11b and the condensing optical system 9 in the wave front interferometer 2 have the function of the optical system of the present invention.

As shown in FIG. 2, the monochromatic light source generates highly coherent monochromatic light 5 such as laser light, and emits the monochromatic light 5 to the enlarging optical system 6. The enlarging optical system 6 enlarges the cross section of the plane wave front of the monochromatic light 5 passing through the enlarging optical system 6. The monochromatic light 5 having passed through the enlarging optical system 6 propagates to the aperture 7 having a rectangular opening. The aperture 7 shapes the light beam passing through the aperture 7 into a beam shape having an intended light beam cross-sectional shape. Here, the intended light beam cross-sectional shape is a shape corresponding to the shape of the rectangular opening of the aperture 7. By setting the size of the rectangular opening of the aperture 7 to be sufficiently larger than the wavelength of the monochromatic light 5, it is possible to ignore the disturbance of the wave front of the monochromatic light 5 due to the shaping of the light beam cross-sectional shape. The monochromatic light 5 having passed through the aperture 7 propagates to the beam splitter 8.

The beam splitter 8 splits the route of the monochromatic light 5 having passed through the aperture 7 into the A route 12 in which it is reflected in the y-axis positive direction, and the B route 13 in which it is transmitted through the beam splitter 8 in the x-axis positive direction.

The light beam propagating on the A route 12 enters the acoustic waveguide 3b. The acoustic waveguide 3b is formed by a medium that is sufficiently transparent and has little scattering for the monochromatic light 5, and has a columnar shape. The received signal 31 is input to the acoustic waveguide 3b, and a compressional wave based on the received signal 31 propagates therethrough in the x-axis negative direction. The light beam traveling along the A route 12 passes through the acoustic waveguide 3b, is reflected by the reflecting mirror 11b, again passes through the acoustic waveguide 3b, and again arrives at the beam splitter 8. Then, at the beam splitter 8, it is divided into a route (reflected light) on which it is reflected toward the monochromatic light source 4, and a route (transmitted light) on which it is transmitted toward the condensing optical system 9.

Where the monochromatic light source 4 is a laser light source, the former light (reflected light) interferes with the monochromatic light in the light source, and therefore the operation of the monochromatic light source 4 may become unstable if no countermeasures are taken. In such a case, the problem is solved by using, as the monochromatic light source 4, a laser light source with a return light countermeasure (e.g., the insertion of an optical isolator).

In a case in which the monochromatic light source 4 is obtained by narrowing the band of a wide band light source such as an LED (light emitting diode) or an SLD (super luminescence laser diode) by means of a filter, or the like, such unstable operation due to return light does not occur.

The latter light (transmitted light) is guided by the condensing optical system 9 into the light-receiving element 10, and the integral intensity thereof is output as the electric signal 14.

The light beam which is captured by the light-receiving element 10 via the A route 12 has a wave front shape disturbance based on the received signal 31 after passing through the acoustic waveguide 3b. As will be described below in detail, the received signal 31 is input to an acoustic waveguide 3b in the form of a compressional wave. That is, where the received signal 31 is an electric signal, a compressional wave which propagates through the acoustic waveguide 3b in the x-axis negative direction is formed by an electric/mechanical oscillation conversion means such as a piezoelectric oscillator.

Therefore, at a certain moment, there is a density distribution across the constituent medium of the acoustic waveguide 3b. The density distribution is sensed by the passing light beam as a refractive index distribution. A light beam passing through a high-refractive index region lags behind a light beam passing through a low-refractive index region. Therefore, the wave front which is generally planar before the passage through the acoustic waveguide 3b is disturbed by the influence of the refractive index distribution reflecting the received signal 31 after the passage therethrough.

Next, the light beam traveling along the B route 13 will be described. The light beam traveling along the B route 13 enters the acoustic waveguide 3a. The acoustic waveguide 3a is formed by the same material as the acoustic waveguide 3b. The reference signal 32 is input to the acoustic waveguide 3a, and a compressional wave based on the reference signal 32 propagates therethrough in the y-axis positive direction. The light beam traveling along the B route 13 passes through the acoustic waveguide 3a, is reflected by the reflecting mirror 11a, again passes through the acoustic waveguide 3a, and again arrives at the beam splitter 8. The reflecting mirror 11a is configured so as to oscillate in the x direction with an amplitude of about $\lambda/4$, where $\lambda$ is the wavelength of the monochromatic light 5, by the control of the contrast observing section 39 as will be described below.

The light beam having again arrived at the beam splitter 8 is divided into a light beam to pass through the beam splitter 8 toward the monochromatic light source 4 and a light beam to be reflected toward the condensing optical system 9. The light beam which is captured by the light-receiving element 10 via the B route 13 has a wave front shape disturbance based on the reference signal 32 input to the acoustic waveguide 3a.

The light beam via the A route and the light beam via the B route are guided by the condensing optical system 9 into the light-receiving element 10, and the integral intensity thereof is output as the electric signal 14.

With the configuration described above, the various components are arranged so that the light beam coming toward the light-receiving element 10 via the A route 12 and the light beam coming toward the light-receiving element 10 via the B route 13 sufficiently interfere with each other in the absence of the received signal 31 and the reference signal 32. The planar precision of each component is ensured and the optical axes of the components are adjusted so that the optical intensity distribution is sufficiently uniform (i.e., a zero fringe state) across the light beam cross section of the interference light beam immediately before the input-side opening surface of the condensing optical system 9.

Figure 3:
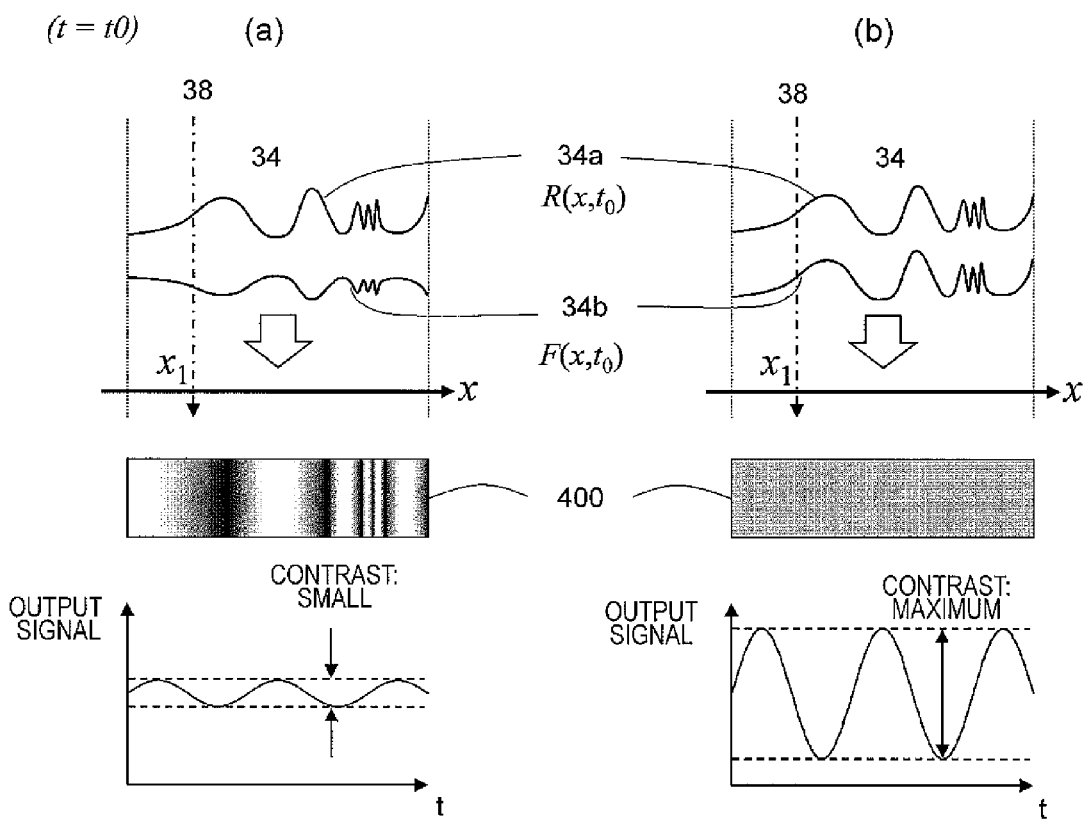
FIG. 3 is a schematic diagram illustrating that the disturbance of wave fronts of light beams appears as an interference fringe.

FIG. 3 is a schematic diagram illustrating that the disturbance of the wave front of a light beam 34a having passed through the acoustic waveguide 3a and that of a light beam 34b having passed through the acoustic waveguide 3b appears as an interference fringe 400. FIG. 3(a) shows an example in which there are disturbances of the wave fronts of the light beams 34a and 34b having passed through the acoustic waveguides 3a and 3b, respectively, and FIG. 3(b) shows an example in which there is no disturbance of the wave fronts of the light beams. The wave fronts of the light beams 34a and 34b shown in FIG. 3 are those in the vicinity of the input-side opening surface of the condensing optical system 9, and the coordinate axes are in conformity to those shown in FIG. 2. The functions representing the wave fronts of the light beams 34a and 34b at a certain point in time t0 are expressed as R(x,t0) and F(x,t0), respectively.

As shown in FIG. 3, if there is a difference between the acoustic signals (the input signal 31 and the reference signal 32) when the acoustic signals are input, a difference between the wave front shapes of the light beams 34a and 34b passing through the acoustic waveguides 3a and 3b. The difference appears as the interference fringe 400 in the light beam cross section at a position immediately before the input-side opening surface of the condensing optical system 9.

Specifically, where there is no difference between the wave front shapes as shown in FIG. 3(b), even if the wave front shapes of the light beams are displaced as compared with a plane, zero fringe is achieved on the input-side opening surface of the condensing optical system 9. This is because portions of the light beams passing through the same point on the input-side opening surface of the condensing optical system 9 are always in phase with each other. In contrast, if there is a difference between the wave front shapes as shown in FIG. 3(a), the uniformity of the phase between portions of the light beams passing through the same point on the opening surface is lost, and therefore many interference fringes are observed on the opening surface.

Since the light-receiving element 10 captures the integral intensity of the interference light (light with wave front disturbance), the electric signal 14 having the highest contrast (=amplitude value of signal/time average value of signal) is output from the light-receiving element 10 when there is no interference fringe at all. On the other hand, as the difference between the wave front shapes of the light beams is more significant, more complicated interference fringes are generated, thereby lowering the contrast of the electric signal 14.

Thus, it is possible to determine the difference between the wave front shapes of the light beams passing through the acoustic waveguides 3a and 3b by observing the contrast of the electric signal 14 output from the light-receiving element 10. Moreover, it is possible to determine the difference between the waveform of the received signal 31 and the waveform of the reference signal 32 based on the difference in wave front shape.

In order to observe the contrast of the electric signal 14, the optoacoustic convolver 1 of the present embodiment has a mechanism (the contrast observing section 39) for oscillating the reflecting mirror 11a in the x direction with an amplitude of about $\lambda/4$, where $\lambda$ is the wavelength of the monochromatic light 5. Thus, the electric signal 14 output from the light-receiving element 10 varies significantly when the received signal 31 and the correlation signal 32 are correlated with each other and does not substantially vary when they are not correlated with each other, as will be described below. Therefore, it is possible to determine whether the received signal 31 and the correlation signal 32 are correlated with each other by observing whether the variation of the contrast of the electric signal 14 exceeds a predetermined threshold value. Similar effects can be obtained when the reflecting mirror 11b is oscillated in the y direction instead of oscillating the reflecting mirror 11a in the x direction. The details of the mechanism for oscillating the reflecting mirror 11a (or the reflecting mirror 11b) will be described later.

The basic operation of the wave front interferometer 2 of the optoacoustic convolver 1 according to the present embodiment is as described above. The specific method for measuring the contrast of the electric signal 14 output from the light-receiving element 10 and the details of the required device configuration will be described later.

Next, referring again to FIG. 2, the method for optically adjusting the various components in order to achieve a high-precision comparison between wave front shapes based on interference fringes will be described. In order to achieve a high-precision comparison between wave front shapes based on interference fringes, it is preferred to apply an anti-reflection film on the four optical surfaces of the beam splitter 8 and the two optical surfaces of each of the acoustic waveguides 3a and 3b. This is to prevent multiply-reflected beams generated by different optical surfaces from being superimposed on and interfering with the interference fringe. In order to reduce the intensity of the multiply reflected beam, each optical surface preferably has a desirable angle so that it is not parallel to the wave front of the light beam passing therethrough. Thus, it is possible to generate desirable interference fringes by lowering the intensity of the multiply reflected beam and reducing the coherence between the light beam intended to be observed and the multiply reflected beam. As a result, a high-precision comparison/measurement of wave front shapes is possible.

Figure 4:
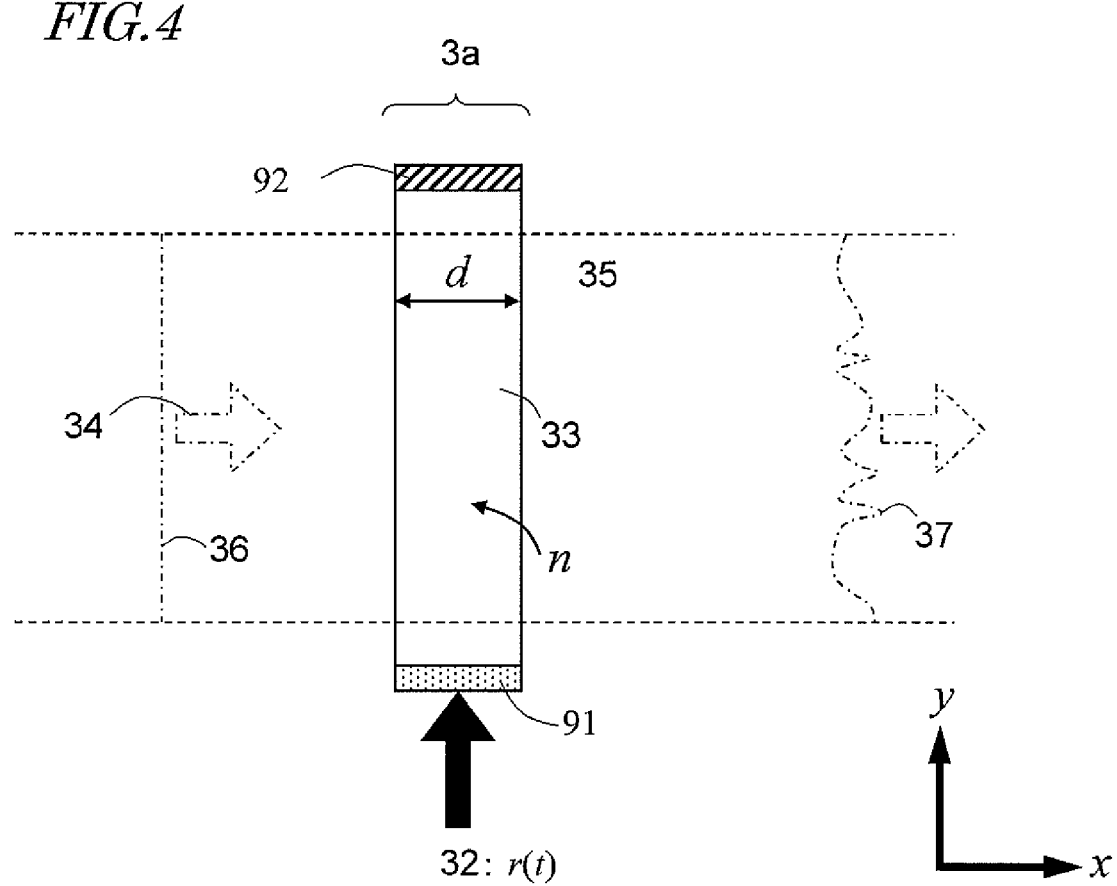
FIG. 4 is a top view showing a general configuration of an acoustic waveguide of an optoacoustic convolver according to Embodiment 1.

Next, the configuration and the operation of the acoustic waveguides 3a and 3b of the optoacoustic convolver 1 according to the present embodiment will be described. FIG. 4 shows a top view of the acoustic waveguide 3a in the present embodiment.

The acoustic waveguide 3a and the acoustic waveguide 3b have the same device configuration, and only the acoustic waveguide 3a will be described below. FIG. 4 is an enlarged view of the acoustic waveguide 3a shown in FIG. 2. The directional relationship is constant between these figures for ease of understanding.

As shown in FIG. 4, the acoustic waveguide 3a includes an acoustic medium 33, a compressional wave generation section 91 provided on an end surface thereof, and a sound absorbing material 92 provided on a surface of the acoustic medium 33 opposite to the end surface where the compressional wave generation section 91 is provided. As the light beam 34 having a planar wave front 36 passes through the acoustic medium 33, the wave front shape changes as indicated by a wave front 37. The acoustic medium 33 is contained in a columnar container having a rectangular cross section, for example.

It is assumed herein that the reference signal 32 is an electric signal having a time waveform r(t). It is also assumed that the received signal 31 is an electric signal having a time waveform f(t). The reference signal 32 is input to the acoustic medium 33 via the compressional wave generation section 91. As described above with reference to FIG. 2, the reference signal 32 is input to the acoustic medium 33 as a compressional wave propagating in the y-axis positive direction which is the longitudinal direction of the acoustic medium 33. The cross-sectional shape of the acoustic medium 33 and the structure of the compressional wave generation section 91 are designed so that the compressional wave is generally a plane wave.

The acoustic medium 33 functions as an optical medium that is sufficiently uniform for the monochromatic light 5. A sufficiently uniform optical medium refers to an optical medium which gives little intensity attenuation and scattering during passage therethrough. For example, an optical medium such as an optical glass, and a non-solid medium such as a gas or a liquid are also applicable.

The compressional wave generated by the compressional wave generation section 91 is absorbed without being reflected by the sound absorbing material 92, after it propagates through the acoustic medium 33. As a result, there is no reverberation in the acoustic medium 33 which may deteriorate the correlation calculation precision.

As will be described below, the time variation of the compressional wave amplitude is approximately rectangular or approximately pulse-like. Since a signal localized in time has a wide range of frequency components in the frequency domain, the sound absorbing material 92 preferably uses such a material/structure that the frequency characteristic of the compressional wave absorbing/attenuating factor is flat (the frequency dependency is small).

In order for the signal correlation process between the received signal 31 and the reference signal 32 to be performed accurately in the optoacoustic convolver 1 of the present embodiment, it is necessary that the dispersion characteristic of the compressional wave in the acoustic medium 33 (the frequency dependency of the compressional wave propagation velocity) is small (flat). If the acoustic medium 33 has a steep dispersion characteristic (i.e., a narrow-band characteristic), the waveforms of the received signal 31 and the reference signal 32 is deformed through the acoustic medium 33, and it is no longer possible to observe an accurate waveform correlation between the received signal 31 and the reference signal 32.

Where there is a sufficient velocity difference between the propagation velocity of the compressional wave propagating through the acoustic medium 33 and the propagation velocity of the compressional wave through the surrounding ambient 35, a small dispersion characteristic (a gentle dispersion characteristic) can be achieved as follows for example. That is, it is preferred that the length of the short side of the rectangular cross section of the acoustic medium 33 is greater than or equal to the wavelength of the compressional wave in the acoustic medium 33 corresponding to the lowest frequency that is included in the received signal 31 and the reference signal 32. In that case, it can be assumed that the compressional wave having a frequency greater than or equal to the lowest frequency propagating through the acoustic medium 33 generally travels through a free space. Then, the compressional wave has a propagation velocity that is determined by the physical values of the material of the acoustic medium 33 without being dependent on the frequency. As a result, wideband waveguide is possible, and it is possible to reduce the deformation of the waveforms of the received signal 31 and the reference signal 32 through waveguide.

While the surface of the acoustic medium 33 is shown to be in direct contact with the ambient 35 in FIG. 4, there may be a medium therebetween which is optically transparent and which has desirable optical characteristics such that the wave front of the light beam 34 is not disturbed. For example, where a gaseous gas, a liquid, or the like, is used as the acoustic medium, it is preferred to use a medium having such characteristics as described above.

Where the acoustic medium 33 is a solid, and the sonic velocity of the compressional wave propagating through the ambient 35 and the sonic velocity of the compressional wave propagating through the acoustic medium 33 are generally equal to each other, it is necessary to provide, between the acoustic medium 33 and the ambient 35, a medium through which the sonic velocity of the compressional wave is significantly different so that the compressional wave does not seep into the ambient 35 from the acoustic medium 33. Such a medium will hereinafter be referred to as a "partitioning structure". In the absence of a partitioning structure, the plane wave generated in the compressional wave generation section 91 attenuates as it seeps into the ambient 35, and the wave front is disturbed. Therefore, a sufficiently uniform sound field is not realized in the acoustic medium 33.

As described above, it is preferred to shield the acoustic medium 33 from the ambient 35 not only for the purpose of providing a container of an indeterminate form for the acoustic medium 33 but also for the purpose of making the acoustic medium 33 act as a straight "waveguide" with little attenuation of the compressional wave.

The structure and the operation of the compressional wave generation section 91 for inputting the received signal 31 and the reference signal 32 which are electric signals to the acoustic medium 33 will be described below.

Next, referring again to FIG. 2, the principle of the correlation process between the received signal 31 and the reference signal 32 by means of the acoustic waveguides 3a and 3b and the light-receiving element 10 will be described in detail.

The compressional waves propagating through the acoustic media 33 of the acoustic waveguides 3a and 3b generate compressive stress distributions based on the amplitude/ phase of the received signal 31 and those of the reference signal 32 in the acoustic media 33. A compressive stress distribution being generated is equivalent to a density distribution being generated in a constituent substance of the acoustic medium 33. Therefore, the compressive stress distribution is sensed by a passing light beam as changes in phase caused by the refractive index distribution variation. This can be understood for example by the fact that as compared with a monochromatic light beam traveling along an arbitrary optical path with an optical path length L which is present in an isotropic optical medium whose refractive index is n, the phase of a monochromatic light beam following the same optical path which is present in an isotropic optical medium whose refractive index is n+Δn lags behind by kΔnL (k=2π/λ; λ is the wavelength of the light beam).

Based on the concept described above, the acoustic waveguides 3a and 3b and the light-receiving element 10 perform a correlation process between the received signal 31 and the reference signal 32. In order to illustrate this specifically, the amounts of change of the refractive index distributions formed on the acoustic media 33 at a certain point in time t0 by the compressional wave of the received signal 31 having the time waveform f(t) and the compressional wave of the reference signal 32 having the time waveform r(t) are denoted as F(x,t0) and R(x,t0), respectively, in the following description. The amount of change of the refractive index distribution is obtained by subtracting the refractive index distribution when there is no compressional wave (a constant) from the refractive index distribution when there is a compressional wave, i.e., Δn in the above description.

A light beam 38 passing through the position x1 on the input-side opening surface of the condensing optical system 9 at time t0 is interference light generated by superimposing two light beams on each other, wherein the two light beams are a light beam (amplitude Ar) having undergone phase changes based on the amount of change of refractive index distribution R(x1,t0) passing through the acoustic waveguide 3a, and a light beam (amplitude Af) having undergone phase changes based on the amount of change of refractive index distribution F(x1,t0) passing through the acoustic waveguide 3b. Therefore, the light intensity of the light beam 38 is in proportion to the square of the absolute value of the sum therebetween, Ar^2+Af^2+2·Ar·Af·cos(k{2d[F(x1,t0)−R(x1,t0)]+nL}). As shown in FIG. 4, the thickness of the acoustic waveguide 3a (and the acoustic waveguide 3b) in the light beam traveling direction of the acoustic medium 33 thereof is denoted as d, the optical path length difference between the A route 12 and the B route 13 in FIG. 2 as L, the average refractive index of the acoustic medium 33 as n, and the number of waves as k=2π/λ (λ is the wavelength of the monochromatic light 5). Since the light intensity is a function of the position x, the non-uniform interference fringe 400 as shown in FIG. 3(a) is typically generated on the input-side opening surface of the condensing optical system 9.

Since the electric signal 14 output from the light-receiving element 10 is in proportion to the integral intensity of the light beam 34, the electric signal 14 is in proportion to Ar^2+Af^2+2·Ar·Af·∫cos(k{2d[F(x,t0)−R(x,t0)]+nL})dx/S, where S is the cross-sectional area of the light beam 34, under the above-described circumstances/settings. Next, consider a circumstance where Expression 1 below holds, for the refractive index distribution.

$$F(x,t0)=R(x,t0) \quad \text{[Expression 1]}$$

As can be seen from the expression of the output signal of the electric signal 14 described above, at the moment of time t0, even if the amounts of change of refractive index distribution R(x,t0) and F(x,t0) vary with respect to the x-axis direction, there is no optical intensity distribution at all on the cross section of the light beam 34 on the input-side opening surface of the condensing optical system 9 after interference as shown in FIG. 3(b). The electric signal 14 at this point is in proportion to (Ar)^2+(Af)^2+2·Ar·Af·cos(knL). Therefore, the optical path length difference L is varied so that |knL|>2π by means of the contrast observing section 39 to be described below in detail. Then, the intensity of the electric signal 14 varies from (Ar−Af)^2 to (Ar+Af)^2. The intensity of the electric signal 14 can be varied from (Ar−Af)^2 to (Ar+Af)^2 by varying the optical path length difference L over the range of |knL|≦π. In the present embodiment, L is varied over a range of variation that is twice larger, taking into consideration the alignment errors among optical elements.

The ratio of the amplitude of the electric signal 14 with respect to the DC component is referred to as the contrast. Assuming that Ar=Af, the contrast C (max) is expressed as shown in Expression 2 below when Expression 1 holds (a state of FIG. 3(b)).

$$C(\max)=\{(A_r+A_f)^2-(A_r-A_f)^2\}/\{(A_r+A_f)^2+(A_r-A_f)^2\}=1 \quad \text{[Expression 2]}$$

In a state shown in FIG. 2(a), which is a common state where Expression 1 does not hold, F(x,t0)≈R(x,t0), and therefore Expression 3 below holds.

$$\int \cos(k\{2d\{F(x,t0)-R(x,t0)\}+nL\})dx/S < \cos(knL) \quad \text{[Expression 3]}$$

It is easy to understand that Expression 3 holds assuming a case where L=0 in the above expression. Therefore, Δ<1, assuming that Δ is the maximum value of ∫cos(k{2d[F(x,t0)−R(x,t0)]+nL})dx/S when the optical path length difference L is varied. The contrast C of the electric signal 14 in this case is expressed as shown in Expression 4 below.

$$C=\Delta < C(\max) \quad \text{[Expression 4]}$$

Thus, the contrast of the electric signal 14 is at maximum when Expression 1 holds. Conversely, at any point in time t, the contrast of the electric signal 14 lowers as the difference between F(x,t) and R(x,t) is more significant.

As described above, it is possible to determine the difference between the waveform of the received signal 31 and the waveform of the reference signal 32 by observing the magnitude of the contrast of the electric signal 14 output from the light-receiving element 10, by means of the contrast observing section 39. The principle of the correlation process between the received signal 31 and the reference signal 32 by means of the acoustic waveguides 3a and 3b and the light-receiving element 10 is as described above.

The general configuration and the operation of each of the wave front interferometer 2 and the acoustic waveguides 3a and 3b of the optoacoustic convolver 1 of the present embodiment have been described above. How the present device having such a configuration functions as a convolver for de-spreading provided on the receiver side of the communication system using code-spread acoustic waves will be described below as an example.

Also in a communication system using acoustic signals propagating through a free space, as in a wireless communication system using radio waves, a code-spread binary signal may be used as the transmit signal in order to realize both a high communication quality and a high data transfer rate.

Figure 5:
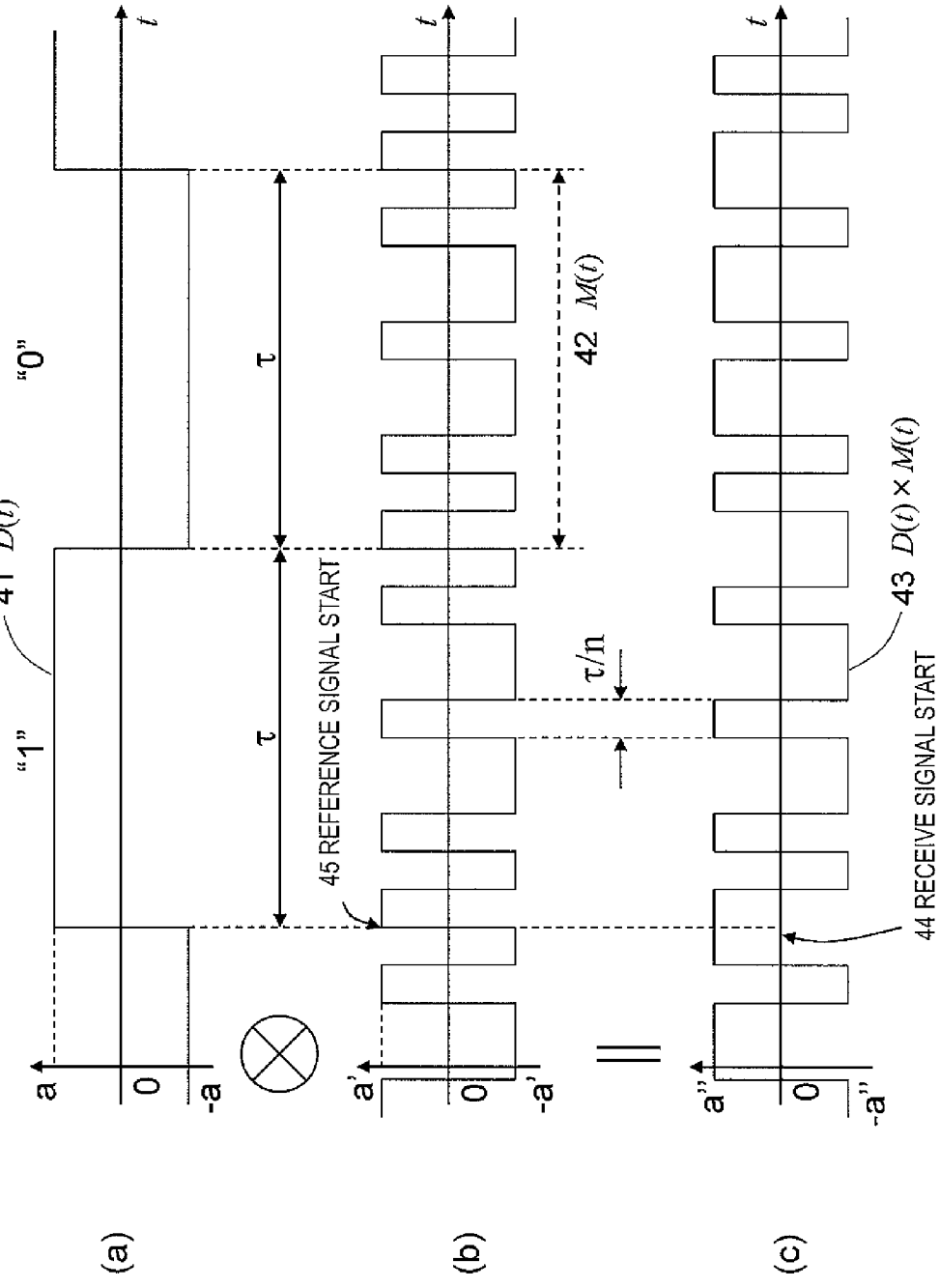
FIG. 5 is a schematic diagram showing how input data (binary signal) is converted to a code-spread transmit signal by the application of a spreading code.

FIG. 5 is a schematic diagram showing how input data (binary signal) 41 is converted to a code-spread transmit signal 43 by the application of a spreading code. As shown in FIG. 5, the code-spread signal 43 is generated by multiplying the binary input data 41 (the time waveform D(t)) by a binary spreading code 42 (time waveform M(t)) having a time length τ which is equal to the 1-bit length of the input data 41. That is, the code-spread signal 43 has a time waveform D(t)×M(t). In this example, the spreading code 42 shown in FIG. 5(b) corresponds to the reference signal 32, and the code-spread signal 43 shown in FIG. 5(c) corresponds to the received signal 31.

Although it depends on the type of the code string of the spreading code 42, a binary n-bit code having the same chip length τ/n is normally used as the spreading code 42, as represented by the M-sequence. Therefore, as shown in FIG. 5, the data 41 corresponding to "1" in the code-spread signal 43 is expressed as the same time waveform as the spreading code 42, and "0" of the data 41 is expressed as the spreading code 42 with an inverted amplitude value.

As described above, the code-spread signal 43 generated by the transmitter is transmitted into the free space as an acoustic signal, and is received by the receiver. In order to reproduce the unspread data from the received signal, it is necessary to perform a demodulation process called "de-spreading". How the de-spreading is done by the optoacoustic convolver 1 of the present embodiment will be described below.

In order to perform the de-spreading process, first, the following two signal processes (A) and (B) are performed by the receiver.

(A) A timing adjustment process between the received signal 31 and the reference signal 32.

(B) An amplitude adjustment process between the received signal 31 and the reference signal 32.

First, the signal process (A) will be described. The receiver includes therein a means for generating the same code as the spreading code 42 used on the transmitter side. The signal process (A) is a process of adjusting the timing with which the reference signal 32 is generated in the receiver so that it matches with the timing with which the code of the received signal 31 starts. Specifically, the timing with which the reference signal 32 is generated in the receiver is adjusted so that when a signal indicating the start of the code of the reference signal 32 (indicated as reference signal start 45 in FIG. 5) is input to an end surface of the acoustic waveguide 3a closer to the compressional wave generation section 91 shown in FIG. 3, a signal indicating the start of the code of the received signal 31 (indicated as received signal start 44 in FIG. 5) is input at the same point in time to an end surface of the other acoustic waveguide 3b closer to the compressional wave generation section 91. Such a timing adjustment can be implemented by applying any of a wide variety of signal synchronization methods (e.g., transmitting/receiving synchronization adjustment signals) used in wireless communication systems such as, for example, the CDMA (Code Division Multiple Access) scheme.

Next, the signal process (B) will be described. Although the received signal 31 and the reference signal 32 are binary signals, it is not guaranteed that the signals generally have the same amplitude value at a point in time when they are input to the acoustic medium 33. Therefore, in the signal process (B), feedback compensation is done on the amplitude of the received signal 31 so that the signals have the same amplitude value. Since an acoustic wave having propagated through a free space is weak, it is preferably amplified immediately after it is received so as to minimize the deterioration of sensitivity due to noise. The method for keeping the signal intensity of the amplified received signal at a constant value may be a method using an "auto gain controller circuit" which is widely used in communication devices using radio waves. This method can be used not only with communication systems using radio waves, but also with communication systems using acoustic signals, for example.

Assume that the signal processes (A) and (B) are completed. In the present embodiment, the length of the acoustic medium 33 in the y-axis direction is adjusted so that one bit's worth of the code-spread signal 43 is propagated as a compressional wave over a 1-bit transfer period τ of the data 41. That is, the length of the acoustic medium 33 is equal to the propagation velocity of the compressional wave multiplied by τ.

FIG. 6(a) is a schematic diagram showing how "1" is reproduced by de-spreading a code string in the code-spread signal 43 that corresponds to "1". Assuming that a code string in the code-spread signal 43 that corresponds to "1" propagates through the entire acoustic medium 33 of the acoustic waveguide 3b at a certain point in time t1 as shown in FIG. 6(a), a refractive index distribution 61 by the received signal 31 is generated accordingly in the acoustic medium 33.

At the same point in time, the reference signal 32 generates the same refractive index distribution as the received signal 31 (a refractive index distribution 62 by the reference signal 32 in FIG. 6) in the acoustic medium 33 of the acoustic waveguide 3a. Therefore, since the conditions of Expression 1 are satisfied, the contrast of the electric signal 14 output from the light-receiving element 10 is at maximum. As can be inferred from the above description, before and after time t1, Expression 1 is not satisfied, and the contrast is lower. Therefore, since the time variation of the contrast gives the maximum value in a pulsed manner (the pulse width is τ/(2n)) at time t1, and the correlation between the signals is deteriorated before and after time t1, resulting in noise-like, irregular time variations.

FIG. 6(b) is a schematic diagram showing how "0" is reproduced by de-spreading a code string in the code-spread signal 43 that corresponds to "0". Assuming that a code string in the code-spread signal 43 (the received signal 31) that corresponds to "0" propagates through the entire acoustic medium 33 of the acoustic waveguide 3b as shown in FIG. 6(b), since Expression 1 is not satisfied, there is no increase in the contrast. The process of de-spreading the received signal 31 by the optoacoustic convolver 1 of the present embodiment is performed by the method described above.

FIG. 6(c) is a diagram showing an example of a time waveform of the signal 14 which is four bits' worth of the received signal 31 output from the light-receiving element 10 as a demodulated signal. By the de-spreading process, the received signal 31 appears in the output signal 14 from the light-receiving element 10 as a pulse signal having a bit length τ. In the output signal 14 from the light-receiving element 10, data which has been spread across the received signal 31 appears as a pulse-like waveform at the end of bits. "1" in the transmitted wave appears as "pulse present" in the demodulated signal, and "0" in the transmitted wave appears as "pulse absent" in the demodulated signal. The actual data reproduction is performed by setting an appropriate threshold value, and determining the presence/absence of a pulse-like waveform in the output signal 14 from the light-receiving element 10.

Next, specific configurations of various sections of the optoacoustic convolver 1 of the present embodiment will be described. First, the general size of the optoacoustic convolver 1 will be described. When a 3rd-degree M-sequence having a chip length of 10 μsec (assuming that one wavelength of an ultrasonic wave whose center frequency is 100 kHz is used as one chip) is used as the spreading code 42 (thus including an ultrasonic signal of up to 100 kHz), the bit length is $(2^3-1) \times 10$ μsec=0.07 msec. Therefore, if a substance whose sonic velocity for a compressional wave is 50 m/s (e.g., a nanoporous silica) is used as the acoustic medium 33, the total length of the acoustic medium 33 required for de-spreading is 3.5 mm. Therefore, the size of the entire optoacoustic convolver 1, excluding the monochromatic light source 4, is several centimeters at most. Thus, a communication device using the optoacoustic convolver 1 of the present embodiment can be made in a significantly reduced size, as compared with conventional techniques.

Next, a method for observing the contrast of the electric signal 14 output from the light-receiving element 10, and a specific observing means therefor (the contrast observing section 39) will be described. FIG. 7 is a diagram showing a general device configuration for oscillating the reflecting mirror 11a (or the reflecting mirror 11b) in a direction parallel to the light beam traveling direction. As shown in FIG. 7, the reflecting mirror 11a is fixed to a fixed platform 71 with a piezoelectric oscillator 72 interposed therebetween in the present embodiment. When a sinusoidal signal having an angular frequency ω is applied from the contrast observing section 39, the piezoelectric oscillator 72 gives a thickness-wise oscillation whose amplitude is about ¼ the wavelength of the monochromatic light 5 with the same angular frequency. With this thickness-wise oscillation, it is possible to achieve a time variation of the optical path length difference between the optical paths along which the two light beams split by the beam splitter 8 travel via the A route 12 and the B route 13 to interfere with each other. Since the optical path length difference varies by about one wavelength with the angular frequency ω, the interference fringe on the input-side opening surface of the condensing optical system 9 blinks with the angular frequency ω as a whole. Thus, the electric signal output from the light-receiving element 10 is a signal that varies over time with the angular frequency ω. The contrast observing section 39 can measure the contrast by filtering the signal through a high-pass filter.

Next, the device configuration of the compressional wave generation section 91 for inputting the received signal 31 and the reference signal 32 to the acoustic media 33 of the acoustic waveguides 3a and 3b as compressional waves will be described. FIG. 8 is a cross-sectional view showing a detailed structure of the compressional wave generation section 91 provided at an end of the acoustic waveguides 3a and 3b. As shown in FIG. 8, the acoustic medium 33 is firmly fixed to a fixed platform 94 with a plate-shaped piezoelectric oscillator 93 interposed therebetween. The plate-shaped piezoelectric oscillator 93 is particularly firmly fixed to the fixed platform 94, and when an electric signal (the received signal 31 or the reference signal 32) is input to the plate-shaped piezoelectric oscillator 93, the plate-shaped piezoelectric oscillator 93 expands and contracts only in the thickness direction (the left/right direction of FIG. 8).

Thus, the received signal 31 and the reference signal 32 are input to the plate-shaped piezoelectric oscillators 93 provided on the acoustic waveguides 3a and 3b, respectively, to generate compressional waves based on the signals in the acoustic media 33. In order for those signal waveforms to be properly reproduced as waveforms of the compressional waves through the acoustic media 33, it is necessary to ensure, over a wide frequency range, the linearity between the input signal voltage and the amount of displacement of the plate-shaped piezoelectric oscillator 93. Therefore, the thickness of the plate-shaped piezoelectric oscillator 93 is set so that the lowest resonance frequency inherent to the plate-shaped piezoelectric oscillator 93 is at least several times the highest frequency among the frequency components included in these signals. The area where the plate-shaped piezoelectric oscillator 93 is to be placed is provided so as to sufficiently cover the end surface of the acoustic medium 33 so that the compressional wave induced in the acoustic medium 33 is properly a plane wave.

The configuration and the operation of the optoacoustic convolver 1 of the present embodiment have been described above. With such a configuration, the reference signal 32 and the received signal 31, which is in synchronism with the reference signal 32 and which is auto-gain-controlled so as to have the same amplitude value as the reference signal 32, are input to the acoustic waveguides 3a and 3b, respectively, as compressional waves. As a result, refractive index distributions are generated depending on the respective signals in the two acoustic media 33 of the acoustic waveguides 3a and 3b. The refractive index distributions are captured as wave front shapes of two independent light beams. By allowing the light beams to interfere with each other in wave front interference, interference fringes appear on the light beam cross section. The integral intensity of the interference fringe is converted to the electric signal 14 in the light-receiving element 10, and the contrast of the electric signal 14 is observed. Thus, it is possible to implement an optoacoustic convolver as a small passive element.

Although the reference signal 32 is input to the acoustic waveguide 3a and the received signal 31 is input to the acoustic waveguide 3b in FIG. 2 in the above description, it is understood that a similar function is achieved even if the inputs are switched around. That is, the advantageous effects of the present embodiment are not changed even if the received signal 31 is input to the acoustic waveguide 3a and the reference signal 32 is input to the acoustic waveguide 3b. Although with the configuration shown in FIG. 2, a compressional wave based on the reference signal 31 propagates in the y-axis positive direction through the acoustic waveguide 3a and a compressional wave based on the received signal 31 propagates in the x-axis negative direction through the acoustic waveguide 3b, it is understood that a similar function is achieved even if the directions of propagation of these compressional waves are switched around. Thus, there are four possible configurations as shown in FIG. 9A for the acoustic waveguides 3a and 3b of the present embodiment.

Further four configurations are possible as shown in FIG. 9B for the acoustic waveguides 3a and 3b. With the device configuration shown in FIG. 9A, a description has been given with reference to FIG. 6(c) of the fact that a localized pulse-like (total pulse width is τ/(2n)) correlation signal appears on the electric signal 14 output from the light-receiving element 10 over a period including τ/(4n) before and after the moment at which the waveforms of the compressional waves of the received signal 31 and the reference signal 32 in the acoustic media 33 match each other.

However, with the device configuration shown in FIG. 9B, when the waveforms of compressional waves of the received signal 31 and the reference signal 32 through the acoustic medium 33 match each other, the total pulse width of the pulse-like correlation signal appearing on the electric signal 14 output from the light-receiving element 10 is τ/2, and the total pulse width is increased n-fold as compared with the configuration of FIG. 9A. Since n is the number of chips of the spreading code 42, the present configuration is advantageous in a case in which the chip width of the spreading code 42 is short and it is not possible to obtain a correlation signal with a sufficient pulse width.

Although the beam splitter 8, the acoustic waveguides 3a and 3b and the reflecting mirrors 11a and 11b are shown in FIG. 2 to be arranged with air layers interposed therebetween, these components may be arranged all in contact with one another as shown in FIG. 10.

The influence of the fluctuation of an air layer appears on the input-side opening surface of the condensing optical system 9 as an interference fringe, and may be superimposed on the interference fringe which is generated only from the received signal 31 and the reference signal 32. Thus, in view of reducing noise of de-spread (demodulated) signals, eliminating these air layers is advantageous. It is understood that the present configuration is advantageous also for reducing the size of the device as a whole. If the seepage of a compressional wave through the acoustic medium 33 into other components due to the contact between components is a problem as described with reference to FIG. 4, it is necessary to surround the acoustic medium 33 with an optical medium that has a compressional wave propagation velocity significantly different from the propagation velocity through the acoustic medium 33 so as to prevent the seepage of the compressional wave.

Embodiment 2

Next, a second embodiment of the present invention will be described. The optoacoustic convolver of the present embodiment is different from the optoacoustic convolver of Embodiment 1 in that optical heterodyne detection is performed using a dual-frequency linear polarization laser 80 such as a dual-frequency Zeeman laser, instead of using the monochromatic light source 4 and the oscillation of the reflecting mirror. Differences from Embodiment 1 will be described below, and redundant descriptions will be omitted.

FIG. 11 is a schematic configuration diagram of an optoacoustic convolver 101 of the present embodiment. As shown in FIG. 8, three optical elements are newly added to the configuration of Embodiment 1 in addition to replacing the monochromatic light source 4 in the device configuration of the optoacoustic convolver 1 shown in FIG. 2 with the dual-frequency linear polarization laser 80. In the present embodiment, the contrast observing section 39 only observes the contrast of the light-receiving signal 14 without oscillating the reflecting mirror 11a or the reflecting mirror 11b.

The dual-frequency linear polarization laser 80 generates two linear polarization light beams having slightly different frequencies. The angular frequency difference between these two linear polarization light beams is denoted as $\omega$. These planes of polarization are orthogonal to each other in the emitted light beams.

In the present embodiment, a polarizing beam splitter 81 is provided instead of the beam splitter 8 of FIG. 2, as shown in FIG. 11. The polarization axis of the polarizing beam splitter 81 is set to be equal to the plane of polarization of one of the two linear polarization light beams. Then, one of the two linear polarization light beams is reflected by the polarizing beam splitter 81 to travel along the A route 12, while the other is transmitted therethrough to travel along the B route 13. A ¼ wave plate 83 is inserted in each of the routes 12 and 13. The light beams traveling along the routes pass the ¼ wave plate 83 twice as they pass through the acoustic waveguides 3a and 3b, respectively, to be reflected by the reflecting mirrors 11a and 11b and to again arrive at the polarizing beam splitter 81. Therefore, the planes of polarization of the linear polarization light beams traveling along the routes 12 and 13 rotate by 90°.

Therefore, the light beam coming back to the polarizing beam splitter 81 via the A route 12 passes through the polarizing beam splitter 81, and the light beam coming back to the polarizing beam splitter 81 via the B route 13 is reflected by the polarizing beam splitter 81. Thus, the light beams are combined into a single light beam traveling toward the condensing optical system 9. The combined light beams still have planes of polarization orthogonal to each other and do not interfere with each other. In the present embodiment, a polarization plate 82 having a polarization axis that is 45° with respect to the planes of polarization of the combined two light beams is inserted on an optical surface of the polarizing beam splitter 81 that is facing the condensing optical system 9. Thus, the two light beams entering the polarization plate 82 interfere with each other after passing through the polarization plate 82. Then, the two light beams generate interference fringes in the light beam cross section after passing through the polarization plate 82. Since they have the frequency difference $\omega$, the interference fringe blinks with the frequency $\omega$ as a whole without varying the intensity distribution.

Therefore, the electric signal 14 output from the light-receiving element 10 is a sinusoidal wave-like signal that fluctuates with the frequency $\omega$, and it is possible to measure the contrast by using a signal detection method as described above in Embodiment 1. Thus, in the present embodiment, it is possible to measure the contrast of the electric signal 14 without oscillating one of the two reflecting mirrors 11a and 11b. By observing the contrast by means of the contrast observing section 39, it is possible to detect the correlation between the received signal 31 and the correlation signal 32. Although the polarization plate 82 is provided between the polarizing beam splitter 81 and the condensing optical system 9 in FIG. 11, it is understood that in a case in which the optical characteristic of the condensing optical system 9 does not have polarization dependency, the polarization plate 82 may be inserted between the condensing optical system 9 and the light-receiving element 10.

Embodiment 3

Next, a third embodiment of the present invention will be described. An optoacoustic convolver 131 of the present embodiment is different from the optoacoustic convolver 1 of Embodiment 1 in the arrangement of the optical system of the wave front interferometer 2. Differences from Embodiment 1 will be mainly described below, and redundant descriptions will be omitted.

FIG. 12 is a diagram showing a general device configuration of an optoacoustic convolver of the present embodiment. In FIG. 12, like reference numerals denote like components to those of FIG. 1. The xyz coordinate system shown in FIG. 12 will be used in the following description. While the wave front interferometer 2 of Embodiment 1 has an optical system configuration which is classified as a Michelson-Morley interferometer, the wave front interferometer 2 of the present embodiment has an optical system configuration which is classified as a Mach-Zehnder interferometer.

Also in the present embodiment, the monochromatic light 5 emitted from the monochromatic light source 4 undergoes wave front interference based on a similar operation principle to that of Embodiment 1, thereby generating an interference fringe which is dependent on the signal correlation between the received signal 31 and the reference signal 32 on the light beam cross section in the vicinity of the input-side opening surface of the condensing optical system 9. Then, the integral intensity of the interference light by the condensing optical system 9 is output by the light-receiving element 10 as the electric signal 14. Moreover, as in Embodiment 1, the contrast of the electric signal 14 is measured by the contrast observing section 39 (see FIGS. 6 and 7). The optoacoustic convolver 113 of the present embodiment operates similar to the optoacoustic convolver 1 of Embodiment 1 in that the signal correlation process between the received signal 31 and the reference signal 32 is performed by the operation described above.

As described in detail in Embodiment 1, the wave front interferometer 2 operates as a converter which copies the refractive index distributions formed in the two acoustic media 33 of the acoustic waveguides 3a and 3b onto the wave front shapes of individual light beams, and expresses the difference between the wave front shapes of the light beams as an interference fringe. This operation is similar also with the wave front interferometer 2 of the present embodiment.

In the present embodiment, a light beam having passed through a beam splitter 8a immediately after the aperture 7 passes through the acoustic waveguide 3a, and is reflected in the z-axis positive direction by the reflecting mirror 11a immediately after the acoustic waveguide 3a, after which it is reflected by a beam splitter 8b. On the other hand, a light beam having been reflected by the beam splitter 8a is further reflected by the reflecting mirror 11b, and passes through the acoustic waveguide 3b and through the other beam splitter 8b. These two light beams are condensed onto the light-receiving element 10 through the condensing optical system 9. These condensed light beams correspond to light beam components that transmit the refractive index distributions formed in the acoustic waveguides 3a and 3b as wave front disturbances.

How a contrast observing means of the present embodiment is implemented will be described below. Also in the present embodiment, it is possible to use the method of oscillating one of the two reflecting mirrors 11a and 11b shown in FIG. 7 in a parallel direction. One of the reflecting mirrors 11a and 11b may be oscillated in a direction parallel to the x axis, for example. More generally, the oscillation direction is an out-of-plane direction of the reflection surface of the reflecting mirror to be oscillated, and it may be oscillated so that the reflection surface translates. With the configuration shown in FIG. 12, the reflecting mirror 11a is oscillated by the contrast observing section 39 in the x direction as an example.

As a contrast observing means of the present embodiment, one may use a method with heterodyne detection using the dual-frequency linear polarization laser of Embodiment 2 (FIG. 11). When implementing the configuration of FIG. 11, the monochromatic light source 4 may be replaced with the dual-frequency linear polarization laser 80, while replacing the two beam splitters 8a and 8b with the two polarizing beam splitters 81. Moreover, the polarization axes of the two polarizing beam splitters 81 may be set to be orthogonal to each other, and the dual-frequency linear polarization laser 80 may be rotated about the optical axis as the axis of rotation so that the polarization axes coincident with the plane of polarization of the light beam emitted from the dual-frequency linear polarization laser 80, thereby adjusting the plane of polarization. Since the polarization directions of the light beams having passed through the acoustic waveguides 3a and 3b are orthogonal to each other and will not interfere with each other as they are, the polarization plate 82 whose polarization axis is at an angle of 45° with respect to the plane of polarization of the light beams is inserted immediately before the condensing optical system 9. With this configuration, since the electric signal 14 is beat signal having a difference frequency of the dual-frequency light included in the dual-frequency linear polarization laser 80, it is possible to observe the contrast without oscillating one of the reflecting mirrors 11a and 11b. The polarization plate 82 similarly functions even if it is inserted between the condensing optical system 9 and the light-receiving element 10.

With the configuration described above, it is possible with the configuration of the present embodiment to reduce the size of the beam splitter 8 which physically requires a large volume with the device configurations of Embodiments 1 and 2. Therefore, it is possible to provide an optoacoustic convolver which is even smaller and of which optical elements can be adjusted easily.

Although the two beam splitters 8a and 8b, the acoustic waveguides 3a and 3b and the plane mirrors 11a and 11b are shown in FIG. 12 to be spatially independent of one another, the configuration is not limited to this. These components may be arranged in contact with one another as shown in FIG. 13A.

These components can be arranged completely in close contact with one another by bringing the reflecting mirrors 11a and 11b, which function as optical connection elements between the two beam splitters 8a and 8b, into contact with intended end surfaces of a newly-introduced prism 141, as shown in FIG. 13A. A similar configuration may be implemented by applying reflective coats on intended end surfaces of the prism 141.

As stated in the description of Embodiment 1, the configuration shown in FIG. 13A is advantageous in view of the stability of the electric signal 14 output from the light-receiving element 10 and the reduction in the size of the device. With the configuration shown in FIG. 13A, the optical path lengths of the optical paths for the light beams passing through the two acoustic waveguides 3a and 3b can be made generally equal to each other, and it is therefore possible to use a wide band light source (e.g., semiconductor laser or a light emitting diode) as the monochromatic light source 4. Therefore, it is advantageous also in view of the reduction in the cost of the optoacoustic convolver. Note however that where a wide band light source is used, the configuration illustrated in Embodiment 1 may be used for the contrast observing means since it is technically difficult to implement a wide-band dual-frequency linear polarization light source.

The configuration shown in FIG. 13B may be used as an alternative possible optical system configuration of a Mach-Zehnder interferometer which is used as the wave front interferometer 2 of the present embodiment. Also with the configuration of FIG. 13B, as with the optical system configuration of FIG. 13A, it is preferred that the reflecting mirrors 11a and 11b are brought into contact with end surfaces of the prism 141 so that the optical paths in the wave front interferometer 2 are all present within the optical media, in view of the stability of the electric signal 14 output from the light-receiving element 10 and the reduction in the size of the device. Alternatively, reflective coats may be applied on intended end surfaces of the prism 141. The optical system configuration of FIG. 13B is advantageous also in that optical adjustment among different elements is made easier since a light beam having a wave front shape which reflects the refractive index distribution of the acoustic waveguide 3a travels along a straight route.

Also in the present embodiment, as in Embodiment 1, the order and direction in which the received signal 31 and the reference signal 32 are input to the acoustic waveguides 3a and 3b are not limited to any particular order and direction. It is understood that the configurations of FIGS. 14 and 15 are both applicable. Note however that with the configurations of FIGS. 14 and 15, there is a difference between the total pulse widths of pulse-like correlation signals appearing in the electric signal 14 output from the light-receiving element 10, as described in Embodiment 1.

Embodiment 4

Next, a fourth embodiment of the present invention will be described. An optoacoustic convolver 111 of the present embodiment is different from Embodiment 1 in that the acoustic waveguide 3c is provided instead of the acoustic waveguides 3a and 3b and in that the configuration of the wave front interferometer 2 is different. Differences from Embodiment 1 will be mainly described below, and redundant descriptions will be omitted.

FIG. 16 is a perspective view of an optoacoustic convolver of the present embodiment. As shown in FIG. 16, the optoacoustic convolver 1 of the present embodiment includes two primary components of the wave front interferometer 2 and the acoustic waveguide 3c. The xy coordinate system shown in FIG. 16 will be used in the following description.

In the present embodiment, instead of the acoustic waveguide 3a of Embodiment 1, the acoustic waveguide 3c made of a similar material is provided, and the acoustic waveguide 3b is not provided. Moreover, the wave front interferometer of the present embodiment includes a beam stopper 28 instead of the reflecting mirror 11b of Embodiment 1, and has a reference plane 29 between the beam splitter 8 and the acoustic waveguide 3c. In the present embodiment, the reference signal 32 is input in the y-axis positive direction from a side surface of the acoustic waveguide 3c, and the received signal 31 is input in the y-axis negative direction from the opposite side surface.

The A route 12 on which a light beam of the monochromatic light 5 emitted from the light source 4 that is reflected by the beam splitter 8 propagates and the B route 13 on which a light beam thereof that is transmitted through the beam splitter 8 propagates will now be described.

First, the light beam traveling along the A route 12 is desirably absorbed by the beam stopper 28 without generating stray light or scattered light which may cause signal noise.

On the other hand, the light beam traveling along the B route 13 is further divided into the Bre route 210 on which light is reflected by the reference plane 29 toward the beam splitter 8 and the Btrans route 212 on which light is transmitted through the reference plane 29 toward the acoustic waveguide 3c. The optical surface on the x-axis negative side of the reference plane 29 has a sufficient planar precision in terms of the wavelength of the monochromatic light 5 (at least a ⅛ wavelength or more).

Next, the behavior of the light beams traveling along two routes of the Bre route 210 and the Btrans route 212 will be described.

First, the Bre route 210 will be described. The light beam reflected by the reference plane 29 and traveling along the Bre route 210 is split into two components by the beam splitter 8. The component reflected by the beam splitter 8 is condensed onto the light-receiving element 10 through the condensing optical system 9, and the integrated light intensity is converted to the electric signal 14. For example, the condensing optical system 9 is provided at a position that is reached when the traveling direction of the light beam on the Bre route 210 is reflected by an angle of 90° by the beam splitter 8. The beam stopper 28 and the condensing optical system 9 are provided so as to oppose each other with the beam splitter 8 interposed therebetween.

The component of the light beam traveling along the Bre route 210 that passes through the beam splitter 8 returns to the monochromatic light source 4. The monochromatic light source 4 is provided with return light countermeasures so that the monochromatic light source 4 does not influence on the operation of emitting the monochromatic light 5 by, for example, blocking light returning to the monochromatic light source 4.

Next, the Btrans route 212 will be described. The light beam traveling along the Btrans route 212 passes through the acoustic waveguide 3c and is reflected by a reflecting mirror 215. The reflected light passes again through the acoustic waveguide 3c.

The received signal 31 and the reference signal 32 are input to the acoustic waveguide 3c, and compressional waves based on the input signals are formed therein. In the acoustic waveguide 3c shown in FIG. 16, the gradations correspond to the compressional waves. The wave front of a light beam before entering the acoustic waveguide 3c is in a plane. The wave front of the light beam having passed through the acoustic waveguide 3c twice is shifted from a plane based on the correlation between the waveforms of the received signal 31 and the reference signal 32 input to the acoustic waveguide 3c as compressional waves. This will be described in detail in the description of the acoustic waveguide 3c below.

Of the light beams which reflects, in its wave front shape, the information of the waveform correlation as a result of passing through the acoustic waveguide 3c twice, the light beam that passes through the reference plane 29 travels along the same route as the light beam traveling along the Bre route 210 described above. A portion of the light beam is reflected by the beam splitter 8, and is condensed onto the light-receiving element 10 through the condensing optical system 9. The integral intensity of the condensed light beam is converted to the electric signal 14 by the light-receiving element 10.

With the configuration above, the components are arranged so that a light beam on the Btrans route which passes through the acoustic waveguide 3c toward the light-receiving element 10 and a light beam on the Bre route which is reflected by the reference plane 29 toward the light-receiving element 10 sufficiently interfere with each other in a state where the received signal 31 and the reference signal 32 are not input to the acoustic waveguide 3c. Moreover, The planar precision of each component is ensured and the optical axes of the components are sufficiently adjusted so that the optical intensity distribution on the light beam cross section of the interference light beam is sufficiently uniform (i.e., a zero fringe state) immediately before the input-side opening surface of the condensing optical system 9.

FIG. 17 is a schematic diagram illustrating that a disturbance of the wave front of a light beam appears as an interference fringe. FIG. 17(a) shows an example in which there is a disturbance in the wave front of an acoustic waveguide 3c, and FIG. 17(b) shows an example in which there is no disturbance in the wave front.

As shown in FIG. 17(a), when an acoustic signal (compressional wave) is input to the acoustic waveguide 3c, a wave front disturbance is generated in the light beam passing through the acoustic waveguide 3c. It is possible to observe the wave front disturbance as it appears as the interference fringe 400 in the light beam cross section immediately before the opening surface through which light enters the condensing optical system 9.

Since the light-receiving element 10 captures the integral intensity of interference light (light with a wave front disturbance), an electric signal having the highest contrast (=signal amplitude value/time average value of signal) is output from the light-receiving element 10 when there is no interference fringe at all. On the other hand, as the wave front disturbance is more significant, more complicated interference fringes are generated, thereby lowering the contrast of the electric signal output from the light-receiving element 10.

That is, it is possible to determine the magnitude of the wave front disturbance of the light beam having passed through the acoustic waveguide 3c by observing the contrast of the electric signal output from the light-receiving element 10. A specific method for measuring the contrast of the electric signal output from the light-receiving element 10 will be described in detail below.

Next, referring again to FIG. 16, the method for optically adjusting the various components will be described. It is preferred that an anti-reflection film is formed on the four optical surfaces of the beam splitter 8, the optical surface on the x-axis positive side of the reference plane 29, and the two optical surfaces of the acoustic waveguide 3c. This is to prevent multiply reflected beams generated by different optical surfaces from being superimposed on and interfering with the interference fringe. In order to reduce the intensity of the multiply reflected beam, it is preferred that each of these optical surfaces has a desirable angle so that it is not parallel to the wave front of a light beam passing through the surface. An anti-reflection film coat may be applied on the optical surface present on the x-axis negative side of the reference plane 29 so as to achieve an intended reflectivity.

Next, the configuration of the acoustic waveguide 3c of the optoacoustic convolver 111 of the present embodiment will be described. FIG. 18 is a top view showing the acoustic waveguide 3c of the optoacoustic convolver 111 of the present embodiment. FIG. 18 is an enlarged view of the acoustic waveguide 3c shown in FIG. 1, and the directional relationship is constant between these figures. That is, the reflecting mirror 11 is present on the right side of FIG. 18.

The acoustic waveguide 3c shown in FIG. 18 includes the acoustic medium 33 and the compressional wave generation sections 91 provided at opposite ends of the acoustic medium 33. The acoustic medium 33 is contained in a columnar container having a rectangular cross section, for example.

Two electric signals, i.e., the received signal 31 having the time waveform f(t) and the reference signal 32 having the time waveform r(t) are input to the acoustic waveguide 3c via the compressional wave generation section 91. These electric signals input to the acoustic medium 33 are converted to compressional waves which propagate in the longitudinal direction through the acoustic medium 33. The compressional wave is a plane wave traveling in parallel to the y axis which is the longitudinal direction of the acoustic medium 33 of FIG. 18. The cross-sectional shape of the acoustic medium 33 and the structure of the compressional wave generation section 91 are designed so that the compressional wave is generally a plane wave.

Next, the operation of the acoustic waveguide 3c will be described.

The compressional wave propagating through the acoustic medium 33 generates a compressive stress distribution across the acoustic medium 33. The compressive stress distribution corresponds to the density distribution of the substance of the acoustic medium 33. Therefore, the compressive stress distribution corresponds to the refractive index distribution for the light beam passing through the acoustic medium 33.

The refractive index distributions formed on the acoustic medium 33 by the compressional waves of the received signal 31 having the time waveform f(t) and the reference signal 32 having the time waveform r(t) at a certain point in time t0 are denoted as $F(x,t0)$ and $R(x,t0)$, respectively. Next, assume a circumstance where the refractive index distribution satisfies Expression 5 below.

$$F(x,t0) = -R(x,t0) \quad \text{[Expression 5]}$$

Under such a circumstance, the refractive index distribution in the acoustic medium 33 at the moment of time t0 is uniform, irrespective of the location. Therefore, there is no disturbance in the wave front shape of the light beam passing through the acoustic waveguide 3c as if there were no signal (no compressional wave propagating), even though the compressional wave is propagating. This state corresponds to the state shown in FIG. 17(b).

Therefore, the contrast of the electric signal output from the light-receiving element 10 shown in FIG. 16 is at maximum when Expression 5 holds. Conversely, at any point in time t, the contrast of the electric signal output from the light-receiving element 10 lowers as the distribution difference between $F(x,t)$ and $-R(x,t)$ is more significant.

As described above, the acoustic waveguide 3c operates as an element for determining the difference between the shape of the waveform of the received signal 31 and the shape of the waveform of the reference signal 32 based on the magnitude of the contrast of the electric signal output from the light-receiving element 10.

An example in which the optoacoustic convolver 1 of the present embodiment is used as a de-spreading convolver provided on the receiver side of a communication system using code-spread acoustic waves will now be described.

Also in the present embodiment, a code spreading scheme shown in FIG. 5 is used. As in Embodiment 1, two signal processes (A) and (B) are performed on the receiver for performing the de-spreading process.

(A) A timing adjustment process between the received signal 31 and the reference signal 32.

(B) An amplitude adjustment process between the received signal 31 and the reference signal 32.

First, the signal process (A) will be described. FIG. 19 is a schematic diagram showing how the reference signal 32 is generated from the spreading code 42 on the receiver. The receiver pre-includes a means for generating the same code as the spreading code 42 used on the transmitter side. As shown in FIG. 5, a signal obtained by time-inverting the spreading code 42 and further multiplying it by −1 is supplied as the reference signal 32.

The signal process (A) is a process of adjusting the timing with which the reference signal 32 is generated in the receiver so that it matches with the timing with which the code of the received signal 31 starts. Specifically, the timing with which the reference signal 32 is generated in the receiver is adjusted so that when the start of the code of the reference signal 32 (indicated as reference signal start 51 in FIG. 19) is input to an end surface of the acoustic medium 33 in FIG. 18, the start of the code of the received signal 31 (indicated as received signal start 44 in FIG. 5) is input at the same point in time to the other end surface of the acoustic medium 33. Such a timing adjustment can be implemented by applying any of a wide variety of signal synchronization methods (e.g., transmitting/receiving synchronization adjustment signals) used in wireless communication systems such as, for example, the CDMA (Code Division Multiple Access) scheme.

The detailed description of the signal process (B) will be omitted since the process is similar to that of Embodiment 1.

Also in the present embodiment, the length of the acoustic medium 33 in the y-axis direction in FIG. 18 is adjusted so that one bit's worth of the code-spread signal 43 is propagated as a compressional wave over a 1-bit length time of the data 41 in FIG. 5.

FIG. 20(a) is a schematic diagram showing how "1" is reproduced by de-spreading a code string in the code-spread signal 43 that corresponds to "1". Assuming that a code string in the code-spread signal 43 that corresponds to "1" propagates through the entire acoustic medium 33 a certain point in time t1 as shown in FIG. 20(a), the refractive index distribution 61 by the received signal 31 is generated accordingly in the acoustic medium 33.

At the same point in time, the reference signal 32 generates the refractive index distribution 62 by the reference signal 32 which is the opposite refractive index distribution from the received signal 31. Since the conditions of Expression 5 are satisfied, the contrast of the electric signal output from the light-receiving element 10 in FIG. 16 is at maximum. As can be inferred from the above description, before and after time t1, Expression 5 is not satisfied, and the contrast is lower. Therefore, the time variation of the contrast gives the maximum value in a pulsed manner (the pulse width is $\tau/(2n)$) at time t1, and the contrast gives a noise-like, irregular time variation before and after time t1.

FIG. 20(b) is a schematic diagram showing how "0" is reproduced by de-spreading a code string in the code-spread signal 43 that corresponds to "0". Assuming that a code string in the code-spread signal 43 that corresponds to "0" propagates through the entire acoustic medium 33 as shown in FIG. 20(b), since Expression 5 is not satisfied, there is no increase in the contrast. The process of de-spreading the received signal 32 by the optoacoustic convolver 111 of the present embodiment is performed as described above.

FIG. 20(c) is a diagram showing an example of a time waveform of the signal 14 which is four bits' worth of the received signal 31 output from the light-receiving element 10 as a demodulated signal. As in Embodiment 1, by the de-spreading process, the received signal 31 appears in the output signal 14 from the light-receiving element 10 as a pulse signal having a bit length $\tau$. In the output signal 14 from the light-receiving element 10, data which has been spread across the received signal 31 appears as a pulse-like waveform at the end of bits. "1" in the transmitted wave appears as "pulse present" in the demodulated signal, and "0" in the transmitted wave appears as "pulse absent" in the demodulated signal. The actual data reproduction is performed by setting an appropriate threshold value, and determining the presence/absence of a pulse-like waveform in the output signal 14 from the light-receiving element 10.

Thus, with the optoacoustic convolver 111 of the present embodiment, it is possible to determine whether the received signal 31 and the reference signal 32 are correlated with each other by observing the contrast of the output signal 14 output from the light-receiving element 10, as in Embodiment 1. Also in the present embodiment, the contrast observing section 39 shown in FIG. 16 oscillates the reflecting mirror 11 to observe the contrast. Specifically, when the sinusoidal wave signal of the frequency $\omega$ is input, the contrast observing section 39 oscillates the piezoelectric oscillator 72 with an amplitude of about $\lambda/4$, where $\lambda$ is the wavelength of the monochromatic light 5.

Next, a device configuration for inputting the received signal 31 and the reference signal 32 as compressional waves to the acoustic medium 33 will be described.

FIG. 21 is a perspective view showing a detailed structure of a compressional wave generation section provided at an end of the acoustic waveguide 3c. As shown in FIG. 21, the compressional wave generation section 91 provided at an end portion of the acoustic waveguide 3c has a matrix structure including the sound absorbing material 92 and many piezoelectric oscillators 93.

In order for the compressional wave propagating through the acoustic medium 33 to be a compression plane wave having a sufficiently flat wave front, it is preferred that the interval between the piezoelectric oscillators 93 is at least ½ or less of the minimum waveform of the compressional wave to be generated in the acoustic medium 33.

The received signal 31 or the reference signal 32 is input in phase as an electric signal to each of the piezoelectric oscillator 93. In response to this, each piezoelectric oscillator 93 expands in the direction indicated by the arrow shown in the figure. Therefore, although each piezoelectric oscillator 93 alone operates as a point compressional wave source, the compressional waves generated by the piezoelectric oscillators 93 are eventually superimposed together into a desirable compression plane wave.

The sound absorbing material 92 is necessary for the following reason. The received signal 31 and the reference signal 32 are input from opposite end surfaces of the acoustic waveguide 3c of the present embodiment. Therefore, if desirable acoustic absorption of compressional waves is not realized at the end surfaces, reflected waves are generated, and refractive index distributions due to the reflected waves are mixed as noise into the output signal from the light-receiving element 10, thereby lowering the contrast. The provision of the sound absorbing material 92 is necessary for avoiding this problem.

The configuration and the operation of the optoacoustic convolver 111 of the present embodiment are as described above. With such a configuration, the reference signal 32 which is in synchronism with the received signal 31, and the received signal which is auto-gain-controlled so as to have the same amplitude value as the reference signal 32, are input to the acoustic waveguide 3c as compression acoustic waves so as to interfere with each other, thereby generating a refractive index distribution across the acoustic medium 33. The refractive index distribution is expressed as an interference fringe via the wave front shape of the light beam, and the integral intensity thereof is converted to an electric signal by the light-receiving element 10 so as to observe the contrast thereof. Thus, it is possible to implement an optoacoustic signal convolver as a small passive element.

Although the received signal 31 and the reference signal 32 are input in the y-axis positive/negative direction from the opposite end surfaces of the acoustic waveguide 3c in the present embodiment as shown in FIG. 16, it is understood that this positional relationship may be reversed.

Although the beam splitter 8, the beam stopper 28, the reference plane 29, the acoustic waveguide 3c and the reflecting mirror 11 are illustrated to be arranged with air layers interposed therebetween, these components may be arranged all in contact with one another as shown in FIG. 22. The influence of the fluctuation of the air layer present between the reference plane 29 and the acoustic waveguide 3c and the air layer present between the acoustic waveguide 3c and the reflecting mirror 11 appears as an interference fringe, and eliminating these air layers is advantageous in view of reducing noise of de-spread (demodulated) signals. It is understood that the present configuration is advantageous also for reducing the size of the device as a whole.

Although the reference plane 29 is illustrated in the above description to be a separate optical element, it may be substituted by an optical surface 110 of the beam splitter 8 (or an optical surface of the acoustic waveguide 3c that is closer to the beam splitter 8) as shown in FIG. 11. This reduces the number of optical elements, and is advantageous for reducing the size of the device and making it easier to adjust the optical axes of the elements.

Embodiment 5

Next, a fifth embodiment of the present invention will be described. As compared with Embodiment 4, the optoacoustic convolver of the present embodiment is different in that the optical heterodyne detection is performed by using the dual-frequency linear polarization laser 80 such as a dual-frequency Zeeman laser, instead of using the monochromatic light source 4 and the oscillation of the reflecting mirror 11. Differences from Embodiment 4 will be described below, and redundant descriptions will be omitted.

FIG. 24 is a diagram showing a general configuration of an optoacoustic convolver 112 of the present embodiment. In FIG. 24, as compared with the configuration shown in FIG. 16, the monochromatic light source 4 is replaced by the dual-frequency linear polarization laser 80, and two optical elements are newly added. In the present embodiment, the contrast observing section 39 only observes the contrast of the light-receiving signal 14 without oscillating the reflecting mirror 11.

The dual-frequency linear polarization laser generates two linear polarization light beams having slightly different frequencies. The angular frequency difference between these two linear polarization light beams is denoted as co. These planes of polarization are orthogonal to each other in the emitted light beams. In the present embodiment, a polarization-selective reflective coat 84 is applied to an optical surface of the reference plane 29 on the x-axis negative side as shown in FIG. 24. The polarization selectivity of the reflective coat 84 is designed so that one of the two linear polarization light beams is reflected by the surface while the other is transmitted therethrough. The polarization plate 82 having a polarization axis that is 45° with respect to the planes of polarization of two linear polarization light beams is inserted on an optical surface of the polarized beam splitter 81 closer to the condensing optical system 9.

The reflected light beam from the reference plane 29 and the light beam whose wave front shape is modulated through the acoustic waveguide 3*c* interfere with each other, passing through the polarization plate 82, thereby generating an interference fringe. Since the light beams have the frequency difference ω, the interference fringe blinks with the frequency ω as a whole without varying the intensity distribution.

Therefore, the electric signal 14 output from the light-receiving element 10 is a sinusoidal wave-like signal that fluctuates with the frequency ω, and it is possible to measure the contrast by using a signal detection method as described above in Embodiment 4. Thus, in the present embodiment, it is possible to measure the contrast of the electric signal 14 without oscillating the reflecting mirror 11. By observing the contrast by means of the contrast observing section 39, it is possible to detect the correlation between the received signal 31 and the correlation signal 32. Although the polarization plate 82 is provided between the polarized beam splitter 81 and the condensing optical system 9 in FIG. 24, it is understood that in a case in which the optical characteristic of the condensing optical system 9 does not have polarization dependency, the polarization plate 82 may be provided between the condensing optical system 9 and the light-receiving element 10.

Embodiment 6

Next, a sixth embodiment of the present invention will be described. An optoacoustic convolver 121 of the present embodiment is different from the optoacoustic convolver 111 of Embodiment 4 in the arrangement of the optical system of the wave front interferometer 2. Differences from Embodiment 4 will be mainly described below, and redundant descriptions will be omitted.

FIG. 25 is a top view showing a device configuration of the optoacoustic convolver 121 of the present embodiment. In FIG. 25, like reference numerals denote like components to those of FIG. 16. While the wave front interferometer 2 of Embodiment 4 is classified as a Fizeau interferometer, the wave front interferometer 2 of the present embodiment is classified as a Michelson-Morley interferometer.

The monochromatic light 5 emitted from the monochromatic light source 4 undergoes wave front interference based on a similar operation principle to that of Embodiment 4, and the integral intensity thereof is output as an electric signal from the light-receiving element 10. As in Embodiment 4, the contrast of the electric signal is then measured, thereby performing a signal correlation between the received signal 31 and the reference signal 32. The wave front interferometer 2 operates as a converter for converting a refractive index distribution formed in the acoustic waveguide 3*c* to a form of an interference fringe as a disturbance of a wave front shape with respect to a plane, as described above in Embodiment 4. In the present embodiment, the light beam which passes through the acoustic waveguide 3*c* twice as it is reflected in the y-axis positive direction by the beam splitter 8 and reflected by the reflecting mirror 11 to be condensed onto the light-receiving element 10 corresponds to a light beam component which transmits the refractive index distribution formed in the acoustic waveguide 3*c* as a disturbance of the wave front. The light beam component which passes through the beam splitter 8 and is reflected by the beam splitter 8 after being reflected by the reflecting mirror 11 in the x-axis positive direction so as to be captured by the light-receiving element 10 corresponds to the reference plane wave for the wave front interference of the light beam above. Thus, the configuration of the present embodiment operates similarly to the configuration of Embodiment 4.

In the present embodiment, since the reference plane 29 is no longer needed, it is possible to provide an optoacoustic convolver which is smaller in size and with which it is easy to adjust the optical elements.

Although the beam splitter 8, the acoustic waveguide 30 and the plane mirrors 11 are shown in FIG. 25 to be in contact with one another, it is understood that these components may be provided independently of one another. However, as described above, it is preferred to employ a configuration shown in FIG. 25 in view of the stability of the electric signal from the light-receiving element 10 and the reduction in the size of the device. It is understood that the directions in which the received signal 31 and the reference signal 32 are input to the end portions of the acoustic waveguide 3*c* may be reversed from those shown in FIG. 25.

Moreover, as a contrast measuring means, it is possible to employ a method of oscillating one of the two plane mirrors 11 shown in FIG. 25 in a direction parallel to the light beam traveling direction, as in Embodiment 4. Alternatively, as in Embodiment 5, it may be implemented by heterodyne detection using a dual-frequency linear polarization laser shown in FIG. 24. When the latter configuration is employed, the beam splitter 8 may be changed to a polarizing beam splitter, a ⅛ wave plate may be inserted between the polarizing beam splitter and the reflecting mirror 11 in the x-axis positive direction, and between the polarizing beam splitter and the acoustic waveguide 3*c* or between the acoustic waveguide 3*c* and the reflecting mirror 11, and a polarization plate may be inserted between the polarizing beam splitter and the condensing optical system 9. With such a configuration, it is possible to generate a beat light, as in Embodiment 5. The polarization axis of the polarizing beam splitter may be set to coincide with the plane of polarization of one of two linear polarization light beams emitted from the dual-frequency linear polarization laser, and the polarization axis of the polarization plate may be arranged at an angle of 45° with respect to the planes of polarization of the linear polarization light beams.

Embodiment 7

Next, a seventh embodiment of the present invention will be described. The optoacoustic convolver 131 of the present embodiment is different from Embodiment 4 in the configuration of the wave front interferometer 2. Differences from Embodiment 4 will be mainly described below, and redundant descriptions will be omitted.

FIG. 26 is a perspective view showing a device configuration of the optoacoustic convolver 131 of the present embodiment. The wave front interferometer 2 of Embodiment 4 has an optical system configuration which is classified as a Fizeau interferometer and the wave front interferometer 2 of Embodiment 6 has an optical system configuration which is classified as a Michelson-Morley interferometer, whereas the wave front interferometer 2 of the present embodiment has an optical system configuration which is classified as a Mach-Zehnder interferometer.

The monochromatic light 5 emitted from the monochromatic light source 4 undergoes wave front interference based on a similar operation principle to that of Embodiment 4, and the integral intensity of the interference light is output as an electric signal from the light-receiving element 10. As in Embodiments 4 and 6, the contrast of the electric signal is then measured, thereby performing a signal correlation between the received signal 31 and the reference signal 32.

As described in detail in Embodiment 4, the wave front interferometer 2 operates as a converter for converting a refractive index distribution formed in the acoustic waveguide 3c to an interference fringe as a disturbance of the wave front shape with respect to a plane wave. In the present embodiment, the light beam which passes through the acoustic waveguide 3c after passing through the beam splitter 8a immediately after the aperture 7 and is reflected in the z-axis positive direction by the reflecting mirror 11a immediately after and which is also reflected by the other beam splitter 8b so as to be condensed onto the light-receiving element 10 corresponds to the light beam component which transmits the refractive index distribution formed in the acoustic waveguide 3c as a disturbance of the wave front. The light beam component which is reflected in the z-axis positive direction by the beam splitter 8a immediately after the aperture 7, reflected in the x-axis positive direction by the reflecting mirror 11b and passes through the other beam splitter 8b so as to be captured by the light-receiving element 10 corresponds to the reference plane wave for the wave front interference of the light beam above. As described above, the optoacoustic convolver 131 of the present embodiment operates similar to Embodiments 4 and 6 described above.

With such a configuration, the reference plane 29 can be omitted as in Embodiment 6, and it is possible to provide an optoacoustic convolver which is small and with which it is easy to adjust the optical elements.

The two beam splitters 8a and 8b, the acoustic waveguide 3c and the two plane mirrors 11a and 11b are shown in FIG. 26 to be spatially independent of one another, these components may be arranged in contact with one another as shown in FIG. 27A. These components can be arranged completely in close contact with one another by bringing the reflecting mirrors 11a and 11b, which function as optical connection elements between the two beam splitters 8a and 8b, into contact with intended end surfaces of the newly-introduced prism 141, as shown in FIG. 27A. The same configuration may be implemented by applying reflective coats on intended end surfaces of the prism 141. As described above in Embodiments 4 and 6, it is preferred to employ the configuration shown in FIG. 27A in view of the stability of the electric signal output from the light-receiving element 10 and the reduction in the size of the device.

A configuration shown in FIG. 27B may be used for the configuration of a Mach-Zehnder interferometer as the wave front interferometer 2 of the present embodiment. Also with the configuration of FIG. 27B as with the optical system configuration of FIG. 27A, it is preferred that the reflecting mirrors 11a and 11b are brought into contact with end surfaces of the prism 141 so that the optical paths in the wave front interferometer 2 are all present within the optical medium, in view of the stability of the electric signal output from the light-receiving element 10 and the reduction in the size of the device. The optical system configuration of FIG. 27B is advantageous also in that optical adjustment among different elements is made easier since a light beam having a wave front shape which reflects the refractive index distribution of the acoustic waveguide 3c travels along a straight route.

Also in the present embodiment, the order in which the received signal 31 and the reference signal 32 are input to the two end portions of the acoustic waveguide 3c is not limited to any particular order, and it is understood that the configuration functions similarly with either order.

Moreover, as a contrast measuring means, it is possible to employ a method of oscillating one of the two plane mirrors 11a and 11b in a direction parallel to the light beam traveling direction, as in Embodiments 4 and 6. Alternatively, as in Embodiment 5, it may be implemented by heterodyne detection using the dual-frequency linear polarization laser 80 shown in FIG. 24.

For example, in order to perform heterodyne detection with the configuration of FIG. 27A, the beam splitter 8a immediately after the aperture 7 may be changed to a polarizing beam splitter, with a polarization plate inserted between the other beam splitter 8b and the condensing optical system 9. With such a configuration, it is possible to generate beat light. It is possible to generate desirable beat light by placing the polarization axis of the polarizing beam splitter so as to coincide with the polarization plane direction of one of the two linear polarization light beams emitted from the dual-frequency linear polarization laser and placing the polarization axis of the polarization plate at an angle of 45° with respect to the planes of polarization of the linear polarization light beams.

Embodiment 8

Next, an eighth embodiment of the present invention will be described. As compared with the configuration of Embodiment 4, the optoacoustic convolver 111 of the present embodiment is different in that it includes the two acoustic waveguides 3a and 3b arranged parallel to each other, and the received signal 31 is input to one of them while the reference signal 32 is input to the other. Differences from Embodiment 4 will be mainly described below, and redundant descriptions will be omitted.

FIG. 28 is a perspective view of an optoacoustic convolver 114 of the present embodiment. As shown in FIG. 28, the optoacoustic convolver 114 of the present embodiment includes the wave front interferometer 2 and the acoustic waveguides 3a and 3b. The xy coordinate system shown in FIG. 28 will be used in the following description.

While the propagation route of the light beam of the present embodiment is the same as the route in Embodiment 4, the point at which the light beam propagating along the Btrans route 212 passes through the two acoustic waveguides 3a and 3b is different from that of Embodiment 4. The reference signal 32 is input in the y-axis positive direction to one of the two acoustic waveguides 3a and 3b, and the received signal 31 is input in the y-axis negative direction to the other.

FIG. 29 is a top view of the acoustic waveguides 3a and 3b of the present embodiment. FIG. 29 is an enlarged view of the acoustic waveguides 3a and 3b shown in FIG. 28, and the directional relationship is constant between these figures.

Each of the acoustic waveguides 3a and 3b shown in FIG. 29 includes the acoustic medium 33, and the compressional wave generation section 91 and the sound absorbing material 92 provided at end surfaces of the acoustic medium 33. The two acoustic media 33 are arranged so as to be generally parallel to each other. The acoustic media 33 are each in a columnar shape having a rectangular cross section, for example. The compressional wave generation section 91 and the sound absorbing material 92 are arranged on opposite surfaces of the acoustic medium 33. Thus, the acoustic waveguides 3a and 3b of the present embodiment have a similar configuration to that of the acoustic waveguides 3a and 3b of Embodiment 1.

The two electric signals of the received signal 31 having the time waveform f(t) and the reference signal 32 having time waveform r(t) are input to the acoustic media 33 via the compressional wave generation section 91. That is, the compressional wave generation section 91 is provided at an end surface of the acoustic medium 33 to which the electric signal is input. In the present embodiment, the received signal 31 and the reference signal 32 are input from opposite directions as shown in FIG. 29.

The electric signals input to these acoustic media 33 are compressional waves propagating in longitudinal direction through the acoustic media 33. The compressional wave is a plane wave traveling in parallel to the y axis which is the longitudinal direction of the acoustic medium 33 shown in FIG. 29. The cross-sectional shape of the acoustic medium 33 and the structure of the compressional wave generation section 91 are designed so that the compressional wave is a plane wave.

With the configuration described above, the optoacoustic convolver 114 of the present embodiment performs the same operation as that of the optoacoustic convolver (FIG. 16) of Embodiment 4. The discussion made above with reference to FIG. 20 similarly holds also in the present embodiment. The interference light between the light beam on the Btrans route 212 and the light beam on the Bre route is detected by the light-receiving element 10, and the contrast of the output signal 14 is observed by the contrast observing section 39, thereby determining the correlation between the two signals. Therefore, also in the present embodiment, the contrast observing section 39 oscillates the reflecting mirror 11 in the x direction.

As described above, in the present embodiment, as in Embodiment 4, the reference signal 32 which is in synchronism with the received signal 31, and the received signal 31 which is auto-gain-controlled so as to have the same amplitude value as the reference signal 32, are input to the acoustic waveguides 3a and 3b as compression acoustic waves. Refractive index distributions depending on the respective signals are generated in the two acoustic media 33 of the acoustic waveguides 3a and 3b, and the sum of the refractive index distributions is expressed as an interference fringe via the wave front shape of the light beam. The integral intensity is converted to an electric signal by the light-receiving element 10, and the contrast thereof is observed by the contrast observing section 39. With such an operation, it is possible to implement an optoacoustic signal convolver as a small passive element.

In the present embodiment, as the received signal 31 and the reference signal 32 are input to the acoustic waveguides 3a and 3b, the compressional waves propagating through the acoustic media 33 travel in the y-axis negative/positive direction, as shown in FIG. 29, but it is understood that this positional relationship may be reversed. That is, the four configurations of the acoustic waveguides 3a and 3b shown in FIG. 30A all operate similarly.

Moreover, the four configurations shown in FIG. 30B are possible for the acoustic waveguides 3a and 3b. With the device configuration of FIG. 30A, a localized pulse-like (total pulse width is $\tau/(2n)$) correlation signal appears on the output signal 14 output from the light-receiving element 10 over a period including $\tau/(4n)$ before and after the moment at which the received signal 31 and the reference signal 32 are reversed. With the device configuration shown in FIG. 30B, the total pulse width of the pulse-like correlation signal appearing in the output signal 14 output from the light-receiving element 10 when the received signal 31 and the reference signal 32 are reversed is $\tau/2$. Therefore, with the configuration of FIG. 30B, the total pulse width is increased n-fold as compared with the configuration of FIG. 30A. The present configuration is advantageous in a case in which the chip width of the spreading code 42 is short and it is not possible to obtain a correlation signal with a sufficient pulse width.

The beam splitter 8, the beam stopper 28, the reference plane 29, the acoustic waveguides 3a and 3b and the reflecting mirror 11 are shown in FIG. 28 to be arranged with air layers interposed therebetween. However, these components may be arranged all in contact with one another as shown in FIG. 31. The influence of the fluctuation of the air layer present between the reference plane 29 and the acoustic waveguides 3a and 3b and the air layer present between the acoustic waveguides 3a and 3b and the reflecting mirror 11 appears as an interference fringe, and eliminating these air layers is advantageous in view of reducing noise of de-spread (demodulated) signals. It is understood that the present configuration is advantageous also for reducing the size of the device as a whole. In order to prevent the received signal 31 and the reference signal 32 from being mixed with each other, an optical medium whose compressional wave propagation velocity is significantly different from that of the acoustic medium 33 is preferably inserted between the two acoustic media 33.

Although the reference plane 29 is illustrated in the above description to be a separate optical element from other optical systems, it may be substituted by the optical surface 110 of the beam splitter 8 (or an optical surface of the acoustic waveguides 3a and 3b that is closer to the beam splitter 8) as shown in FIG. 32. This reduces the number of optical elements, and is advantageous for reducing the size of the device and making it easier to adjust the optical axis adjustment of the elements.

Embodiment 9

Next, a ninth embodiment of the present invention will be described. As compared with Embodiment 8, the optoacoustic convolver of the present embodiment is different in that the optical heterodyne detection is performed by using the dual-frequency linear polarization laser 80 such as a dual-frequency Zeeman laser, instead of using the monochromatic light source 8 and the oscillation of the reflecting mirror 4.

Differences from Embodiment 8 will be described below, and redundant descriptions will be omitted.

FIG. 33 is a diagram showing a general configuration of an optoacoustic convolver of the present embodiment. In FIG. 33, as compared with the configuration shown in FIG. 28, the monochromatic light source 4 is replaced by the dual-frequency linear polarization laser 80, and two optical elements are newly added. In the present embodiment, the contrast observing section 39 only observes the contrast of the light-receiving signal 14 without oscillating the reflecting mirror 11.

The dual-frequency linear polarization laser generates two linear polarization light beams having slightly different frequencies. The frequency difference between these two linear polarization light beams is denoted as ω. These planes of polarization are orthogonal to each other in the emitted light beams. In the present embodiment, the polarization-selective reflective coat 84 is applied to an optical surface of the reference plane 29 on the x-axis negative side as shown in FIG. 33. The polarization selectivity of the reflective coat 84 is designed so that one of the two linear polarization light beams is reflected by the surface while the other is transmitted therethrough. The polarization plate 82 having a polarization axis that is 45° with respect to the planes of polarization of two linear polarization light beams is inserted on an optical surface of the polarized beam splitter 81 closer to the condensing optical system 9.

The reflected light beam from the reference plane 29 and the light beam whose wave front shape is modulated through the acoustic waveguides 3a and 3b interfere with each other, passing through the polarization plate 82, thereby generating an interference fringe. Since the light beams have the frequency difference ω, the interference fringe blinks with the frequency ω as a whole without varying the intensity distribution.

Therefore, the electric signal 14 output from the light-receiving element 10 is a sinusoidal wave-like signal that fluctuates with the frequency ω, and it is possible to measure the contrast by using a signal detection method as described above in Embodiment 8. Thus, in the present embodiment, it is possible to measure the contrast of the electric signal 14 without oscillating the reflecting mirror 11. By observing the contrast by means of the contrast observing section 39, it is possible to detect the correlation between the received signal 31 and the correlation signal 32. Although the polarization plate 82 is provided between the polarized beam splitter 81 and the condensing optical system 9 in FIG. 33, it is understood that in a case in which the optical characteristic of the condensing optical system 9 does not have polarization dependency, the polarization plate 82 may be provided between the condensing optical system 9 and the light-receiving element 10.

Embodiment 10

Next, a tenth embodiment of the present invention will be described. An optoacoustic convolver 122 of the present embodiment is different from the optoacoustic convolver 111 of Embodiment 8 in the arrangement of the optical system of the wave front interferometer 2. Differences from Embodiment 8 will be mainly described below, and redundant descriptions will be omitted.

FIG. 34 is a top view showing a device configuration of the optoacoustic convolver 122 of the present embodiment. In FIG. 34, like reference numerals denote like components to those of FIG. 28. While the wave front interferometer 2 of Embodiment 8 is classified as a Fizeau interferometer, the wave front interferometer 2 of the present embodiment is classified as a Michelson-Morley interferometer.

The monochromatic light 5 emitted from the monochromatic light source 4 undergoes wave front interference based on a similar operation principle to that of Embodiment 8, and the integral intensity thereof is output as an electric signal from the light-receiving element 10. As in Embodiment 8, the contrast of the electric signal is then measured, thereby performing a signal correlation between the received signal 31 and the reference signal 32. The wave front interferometer 2 operates as a converter for converting a refractive index distribution formed in the acoustic waveguides 3a and 3b to a form of an interference fringe as a disturbance of a wave front shape with respect to a plane, as described above in Embodiment 8. In the present embodiment, the light beam which passes through the acoustic waveguides 3a and 3b twice as it is reflected in the y-axis positive direction by the beam splitter 8 and reflected by the reflecting mirror 11 to be condensed onto the light-receiving element 10 corresponds to a light beam component which transmits the disturbance of the wave front formed by the acoustic waveguides 3a and 3b. The light beam component which passes through the beam splitter 8 and is reflected by the beam splitter 8 after being reflected by the reflecting mirror 11 in the x-axis positive direction so as to be captured by the light-receiving element 10 corresponds to the reference plane wave for the wave front interference of the light beam above. Thus, the configuration of the present embodiment operates similarly to the configuration of Embodiment 8.

In the present embodiment, since the reference plane 29 is no longer needed, it is possible to provide an optoacoustic convolver which is smaller in size and with which it is easy to adjust the optical elements.

Although the beam splitter 8, the beam splitter 8, the acoustic waveguides 3a and 3b and the plane mirrors 11 are shown in FIG. 34 to be in contact with one another, it is understood that these components may be provided independently of one another. However, as described above, it is preferred to employ a configuration shown in FIG. 34 in view of the stability of the electric signal from the light-receiving element 10 and the reduction in the size of the device. It is understood that the directions in which the received signal 31 and the reference signal 32 are input to end portions of the acoustic waveguides 3a and 3b are not limited the directions shown in FIG. 34, but may also be the directions shown in FIGS. 30A and 30B. Note however that as described above in Embodiment 8, the configuration of FIG. 30A and the configuration of FIG. 30B are different from each other in the total pulse width of the pulse-like correlation signal appearing in the output signal 14 from the light-receiving element 10.

Moreover, as a contrast measuring means, it is possible to employ a method of oscillating one of the tow reflecting mirrors 11 shown in FIG. 34 in a direction parallel to the light beam traveling direction, as in Embodiment 8. Alternatively, as in Embodiment 9, it may be implemented by heterodyne detection using the dual-frequency linear polarization laser 80 shown in FIG. 33. When the latter is employed, the beam splitter 8 may be changed to a polarizing beam splitter, a ⅛ wave plate may be inserted between the polarizing beam splitter and the reflecting mirror 11 in the x-axis positive direction, and between the polarizing beam splitter and the acoustic waveguides 3a and 3b or between the acoustic waveguides 3a and 3b and the reflecting mirror 11, and a polarization plate may be inserted between the polarizing beam splitter and the condensing optical system 9. With such a configuration, it is possible to generate a beat light, as in Embodiment 9. The polarization axis of the polarizing beam splitter may be set to coincide with the plane of polarization of one of two linear polarization light beams emitted from the dual-frequency linear polarization laser, and the polarization axis of the polarization plate may be arranged at an angle of 45° with respect to the planes of polarization of the linear polarization light beams.

Embodiment 11

Next, an eleventh embodiment of the present invention will be described. An optoacoustic convolver 132 of the present embodiment is different from Embodiment 8 in the configuration of the wave front interferometer 2. Differences from Embodiment 8 will be mainly described below, and redundant descriptions will be omitted.

FIG. 35 is a perspective view showing a device configuration of the optoacoustic convolver 132 of the present embodiment. The wave front interferometer 2 of Embodiment 4 has an optical system configuration which is classified as a Fizeau interferometer and the wave front interferometer 2 of Embodiment 6 has an optical system configuration which is classified as a Michelson-Morley interferometer, whereas the wave front interferometer 2 of the present embodiment has an optical system configuration which is classified as a Mach-Zehnder interferometer.

The monochromatic light 5 emitted from the monochromatic light source 4 undergoes wave front interference based on a similar operation principle to that of Embodiment 4, and the integral intensity of the interference light is output as an electric signal from the light-receiving element 10. As in Embodiments 8 and 10, the contrast of the electric signal is then measured, thereby performing a signal correlation between the received signal 31 and the reference signal 32.

As described in detail in Embodiment 8, the wave front interferometer 2 operates as a converter for converting a refractive index distribution formed in the two acoustic media 33 of the acoustic waveguides 3a and 3b to an interference fringe as a disturbance of the wave front shape with respect to a plane wave. In the present embodiment, the light beam which passes through the acoustic waveguides 3a and 3b after passing through the beam splitter 8a immediately after the aperture 7 and is reflected in the z-axis positive direction by the reflecting mirror 11a immediately after and which is also reflected by the other beam splitter 8b so as to be condensed onto the light-receiving element 10 corresponds to the light beam component which transmits the refractive index distribution formed in the acoustic waveguides 3a and 3b as a disturbance of the wave front. The light beam component which is reflected in the z-axis positive direction by the beam splitter ea immediately after the aperture 7, reflected in the x-axis positive direction by the reflecting mirror 11b and passes through the other beam splitter 8b so as to be captured by the light-receiving element 10 corresponds to the reference plane wave for the wave front interference of the light beam above. As described above, the optoacoustic convolver 132 of the present embodiment operates similar to the optoacoustic convolvers of Embodiments 8 and 10.

With such a configuration, the reference plane 29 can be omitted as in Embodiment 10, and it is possible to provide an optoacoustic convolver which is small and with which it is easy to adjust the optical elements.

Although the two beam splitters 8a and 8b, the acoustic waveguides 3a and 3b and the two plane mirrors 11a and 11b are shown in FIG. 35 to be spatially independent of one another, these components may be arranged so as to be in contact with one another as shown in FIG. 36A. These components can be arranged completely in close contact with one another by bringing the reflecting mirrors 11a and 11b, which function as optical connection elements between the two beam splitters 8a and 8b, into contact with intended end surfaces of the newly-introduced prism 141, as shown in FIG. 36A. The same configuration may be implemented by applying reflective coats on intended end surfaces of the prism 141. As described above in Embodiments 8 and 10, it is preferred to employ the configuration shown in FIG. 36A in view of the stability of the electric signal output from the light-receiving element 10 and the reduction in the size of the device.

A configuration shown in FIG. 36B may be used for the configuration of a Mach-Zehnder interferometer as the wave front interferometer 2 of the present embodiment. Also with the configuration of FIG. 36B as with the optical system configuration of FIG. 36A, it is preferred that the reflecting mirrors 11a and 11b are brought into contact with end surfaces of the prism 141 so that the optical paths in the wave front interferometer 2 are all present within the optical medium, in view of the stability of the electric signal output from the light-receiving element 10 and the reduction in the size of the device. The optical system configuration of FIG. 36B is advantageous also in that optical adjustment among different elements is made easier since a light beam having a wave front shape which reflects the refractive index distribution of the acoustic waveguides 3a and 3b travels along a straight route.

It is understood that in the present embodiment, as in Embodiments 8 and 10, the direction in which the received signal 31 and the reference signal 32 are input to two end portions of the acoustic waveguides 3a and 3b are not limited to any particular directions, but any of the configurations shown in FIGS. 30A and 30B may be used. Note however that as described above in Embodiment 8, the configuration of FIG. 30A and the configuration of FIG. 30B are different from each other in the total pulse width of the pulse-like correlation signal appearing in the output signal 14 from the light-receiving element 10.

Moreover, as a contrast measuring means, it is possible to employ a method of oscillating one of the two plane mirrors 11a and 11b in a direction parallel to the light beam traveling direction, as in Embodiments 8 and 10. Alternatively, as in Embodiment 9 (FIG. 33), it may be implemented by heterodyne detection using a dual-frequency linear polarization laser.

For example, in order to perform heterodyne detection with the configuration of FIG. 36A, the beam splitter 8a immediately after the aperture 7 may be changed to a polarizing beam splitter, with a polarization plate inserted between the other beam splitter 8b and the condensing optical system 9. With such a configuration, it is possible to generate beat light. It is possible to generate desirable beat light by placing the polarization axis of the polarizing beam splitter so as to coincide with the polarization plane direction of one of the two linear polarization light beams emitted from the dual-frequency linear polarization laser and placing the polarization axis of the polarization plate at an angle of 45° with respect to the planes of polarization of the linear polarization light beams.

With the optoacoustic convolver of the present invention, it is possible to optically detect the similarity between two signals having time waveforms of independent shapes, and the present invention is therefore applicable to a passive convolver for processing a plurality of signals. Since the correlation signal output from the optoacoustic convolver of the present invention is a timing-controlled pulse-like signal, the present invention is also applicable to a pulse wave generation device, a device for generating a pulse signal which can be timing-controlled, etc.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optoacoustic convolver comprising:
a light source;
a first acoustic waveguide filled with a light-transmissive first acoustic medium through which a first compressional wave based on a received signal is propagated;
a second acoustic waveguide filled with a light-transmissive second acoustic medium through which a second compressional wave based on a predetermined reference signal is propagated;
an optical system whereby light emitted from the light source is split into a first light beam and a second light beam, the first light beam entering the first acoustic waveguide in a direction crossing a direction of propagation of the first compressional wave, and the second light beam entering the second acoustic waveguide in a direction crossing a direction of propagation of the second compressional wave, thereby generating interference light between the first light beam having passed through the first acoustic waveguide and the second light beam having passed through the second acoustic waveguide;
a light-receiving section for receiving the interference light and outputting an electric signal based on an intensity of the received light; and
a correlation determination section for determining whether the received signal is correlated with the reference signal by observing the electric signal based on the interference light between the first light beam and the second light beam output from the light-receiving section.

2. The optoacoustic convolver according to claim 1, wherein the correlation determination section determines that the received signal and the reference signal are correlated with each other when the intensity of the interference light is greater than or equal to a predetermined threshold value.

3. The optoacoustic convolver according to claim 1, wherein
the optical system is configured so that the intensity of the interference light is at maximum at time $t=t0$ at which $F(x,t0)=R(x,t0)$ holds,
where $F(x,t)$ is a refractive index distribution of the first compressional wave, and $R(x,t)$ is a refractive index distribution of the second compressional wave,
where a coordinate whose origin is a point where the first compressional wave is generated and whose positive direction is the direction of propagation of the first compressional wave, and a coordinate whose origin is a point where the second compressional wave is generated and whose positive direction is the direction of propagation of the second compressional wave, are both denoted as x, and time is denoted as t.

4. The optoacoustic convolver according to claim 1, wherein the optical system includes a beam splitter for splitting the light emitted from the light source into the first light beam and the second light beam, and a reflecting mirror for reflecting at least one of the first light beam and the second light beam split by the beam splitter.

5. The optoacoustic convolver according to claim 4, wherein:
the light source emits monochromatic light; and
the correlation determination section varies an optical path length over which at least one of the first light beam and the second light beam travels to reach the light-receiving section by oscillating the reflecting mirror, and determines whether the electric signal has exceeded a predetermined threshold value, thereby determining whether the received signal is correlated with the reference signal.

6. The optoacoustic convolver according to claim 5, wherein the correlation determination section oscillates the reflecting mirror with an amplitude that is ½ or more of a wavelength of the monochromatic light.

7. The optoacoustic convolver according to claim 1, wherein:
the light source emits two light beams whose planes of polarization are orthogonal to each other and which have different frequencies from each other; and
the optical system includes a polarizing beam splitter for splitting the two light beams into the first light beam and the second light beam based on the respective planes of polarization, and a polarization plate for making a plane of polarization of the first light beam and a plane of polarization of the second light beam coincide with each other.

8. The optoacoustic convolver according to claim 1, wherein wave front shapes of the first light beam and the second light beam change as the first light beam and the second light beam pass through the first acoustic waveguide and the second acoustic waveguide, respectively, and the correlation determination section determines whether the received signal is correlated with the reference signal based on the electric signal generated based on a difference between the wave front shape of the first light beam and the wave front shape of the second light beam.

9. The optoacoustic convolver according to claim 1, wherein the optical system has a configuration of an interferometer of a Michelson-Morley type.

10. The optoacoustic convolver according to claim 1, wherein the optical system has a configuration of an interferometer of a Mach-Zehnder type.

11. The optoacoustic convolver according to claim 1, wherein the directions of propagation of the first compressional wave and the second compressional wave are parallel to each other.

12. The optoacoustic convolver according to claim 11, wherein the directions of propagation of the first compressional wave and the second compressional wave are parallel to each other and are facing the same direction.

13. The optoacoustic convolver according to claim 1, wherein the first light beam and the second light beam do not pass through an atmospheric air before the first light beam and the second light beam interfere with each other.

* * * * *